US012455290B2

(12) United States Patent
Arrevillaga Boni et al.

(10) Patent No.: US 12,455,290 B2
(45) Date of Patent: Oct. 28, 2025

(54) METHODS FOR DETECTING METEORIN-β ACTIVITY

(71) Applicant: BIOLEGEND, INC., San Diego, CA (US)

(72) Inventors: Gerardo Arrevillaga Boni, San Diego, CA (US); Marcela Hernandez Ruiz, San Diego, CA (US); David Michael Soper, San Diego, CA (US)

(73) Assignee: Biolegend, Inc., San Diego, CA (US)

( * ) Notice: Subject to any disclaimer, the term of this patent is extended or adjusted under 35 U.S.C. 154(b) by 727 days.

(21) Appl. No.: 17/394,238

(22) Filed: Aug. 4, 2021

(65) Prior Publication Data

US 2022/0034906 A1 Feb. 3, 2022

Related U.S. Application Data

(63) Continuation of application No. PCT/US2020/016780, filed on Feb. 5, 2020.

(60) Provisional application No. 62/803,047, filed on Feb. 8, 2019.

(51) Int. Cl.
*G01N 33/68* (2006.01)

(52) U.S. Cl.
CPC ..... *G01N 33/6869* (2013.01); *G01N 2333/54* (2013.01)

(58) Field of Classification Search
None
See application file for complete search history.

(56) References Cited

FOREIGN PATENT DOCUMENTS

| CN | 108079279 A | 5/2018 |
|---|---|---|
| DE | 102016204700 A1 | 9/2017 |
| WO | 2017214609 | 12/2017 |

OTHER PUBLICATIONS

Murray et al. (1985, J. Immunol. 134(3):1619-1622).*
Tokuriki et al., 2009, Curr. Opin. Struc. Biol. 19:596-604).*
Fenton et al. (2020, Medicinal Chemistry Research 29:1133-1146).*
Bhattacharya et al. (2017, PLoS ONE 12(3): e0171355, https://doi.org/10.1371/journal.pone.0171355).*
Alaoui-Ismaili (2009, Cytokine Growth Factor Rev. 20(5-6):501-7).*
Guo et al. (2004, PNAS USA 101(25):9205-10).*
Chinese Application No. CN202080026266.7, Office Action mailed on Sep. 29, 2023, 13 pages. (7 pages of Original Document and 6 pages of English Translation).
International Application No. PCT/US2020/016780, International Preliminary Report on Patentability mailed on Aug. 19, 2021, 13 pages.
International Application No. PCT/US2020/016780, International Search Report and Written Opinion mailed on Sep. 14, 2020, 18 pages.
International Application No. PCT/US2020/016780, Invitation to Pay Additional Fees and, Where Applicable, Protest Fee mailed on Jul. 13, 2020, 12 pages.
Ushach et al., Meteorin-like is a Cytokine Associated With Barrier Tissues And Alternatively Activated Macrophages, Clinical Immunology, vol. 156, No. 2, Feb. 28, 2015, pp. 119-127.
International Application No. PCT/US2020/016780, International Search Report and Written Opinion mailed on Sep. 15, 2020, 20 pages.
Rao et al., Meteorin-like is a Hormone that Regulates Immune-Adipose Interactions to Increase Beige Fat Thermogenesis, Cell, Elsevier, vol. 157, No. 6, Jun. 5, 2014, pp. 1279-1291.
Ushach et al., Meteorin-Like/Meteorin-β is a Novel Immunoregulatory Cytokine Associated with Inflammation, The Journal of Immunology, vol. 201, No. 12, Nov. 21, 2018, pp. 3669-3676.

* cited by examiner

*Primary Examiner* — Elizabeth C. Kemmerer
(74) *Attorney, Agent, or Firm* — Kilpatrick Townsend & Stockton LLP

(57) ABSTRACT

The technology relates in part to methods for detecting the activity of Meteorin-β and modified versions thereof.

15 Claims, 9 Drawing Sheets

Specification includes a Sequence Listing.

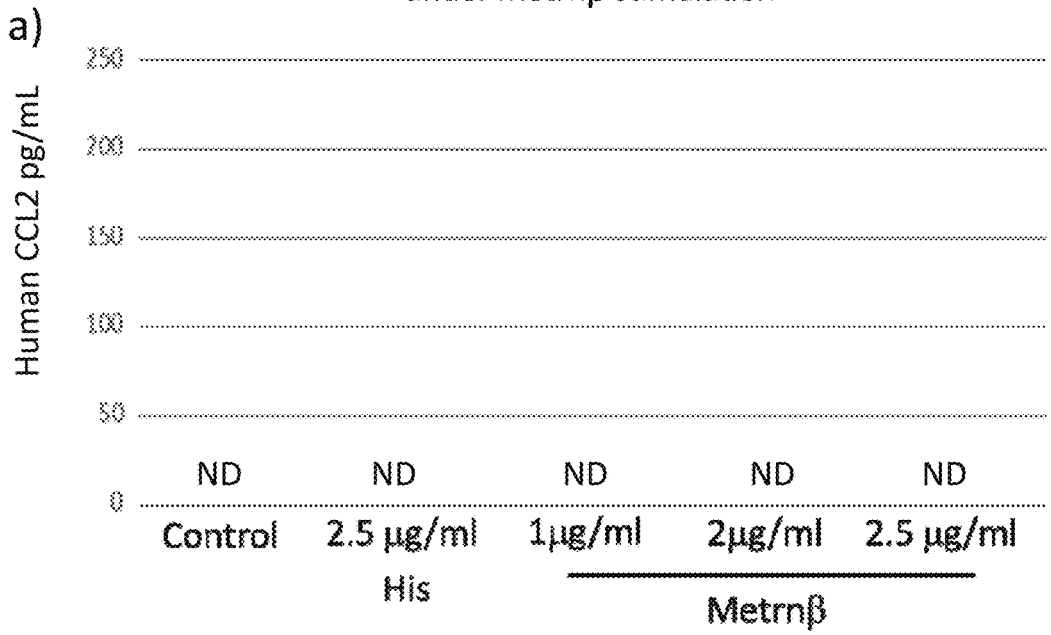
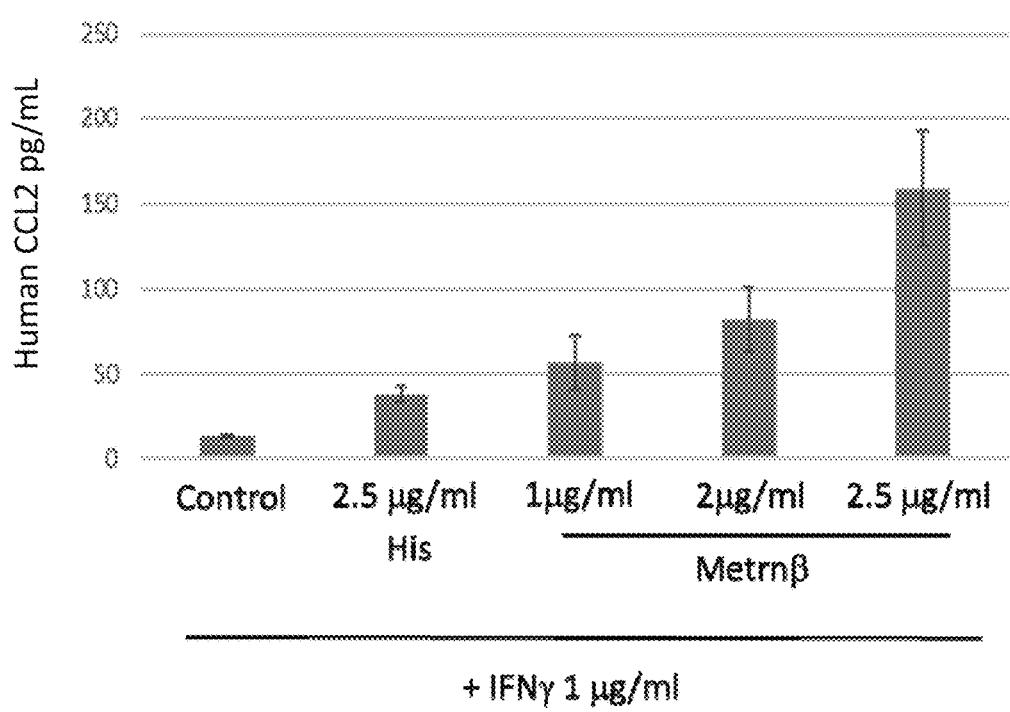
Fig. 1

| Cytokine | Activity | Control vs meteorin-β 2.5 µg/ml | IFNγ 1 µg/ml | | | |
|---|---|---|---|---|---|---|
| | | | Control vs 6XHis 2.5 µg/ml | Control vs meteorin-β 1 µg/ml | Control vs meteorin-β 2 µg/ml | Control vs meteorin-β 2.5 µg/ml |
| CCL-2 | Chemoattractant/ Proinflammatory | (-) | (+) | (++) | (+++) | (+++) |
| CXCL10 | Chemoattractant/ Modulation of adhesion molecules expression | (-) | (-) | (+) | (+++) | (+++) |
| IL-6 | Inflammation/ Differentiation | (-) | (+) | (+) | (++) | (++) |
| IL1RA | Antagonism of IL-1, Immunoregulator | (-) | (-) | (-) | (++) | (++) |
| ARGINASE | Tissue repair responses convert L-arginine into L-ornithine | (-) | (-) | (-) | (-) | (-) |
| IL12p70 | Development, maintenance and support of some immune cells | (-) | (-) | (-) | (-) | (-) |
| TNFα | Regulation of immune cells, pyrogen, apoptosis | (-) | (-) | (-) | (-) | (-) |
| IL-4 | Role on inflammation activation differentiation, wound repair | (-) | (-) | (-) | (-) | (-) |
| IL-10 | Immunosuppressive effect | (-) | (-) | (-) | (-) | (-) |
| IL-1β | Induction of proinflammatory proteins, hematopoiesis, differentiation | (-) | (-) | (-) | (-) | (-) |
| TARC | Chemoattractant, antimicrobial, activation and maturation of T cells | (-) | (-) | (-) | (-) | (-) |
| IL12p40 | Subunit of IL-12 and IL-23 | (-) | (-) | (-) | (-) | (-) |
| IL-23 | Induction of proinflammatory response, proliferation, activation and regulation | (-) | (-) | (-) | (-) | (-) |

Fig. 3A

| Cytokine | Activity | Control vs meteorin-β | IFNγ vs IFNγ meteorin-β | TGFβ vs TGFβ meteorin-β | IL-4 vs IL-4 meteorin-β | IL-10 vs IL-10 meteorin-β |
|---|---|---|---|---|---|---|
| CXCL8 | Neutrophil trafficking | (=) | (=) | (=) | (=) | (- -) |
| CCL11 | Eosinophil and basophil migration | (=) | (=) | (=) | (=) | (=) |
| CCL17 | T cell chemotaxis, Th2 immune response | (=) | (=) | (=) | (=) | (=) |
| CCL2 | Inflammatory monocyte trafficking | (=) | (+++) | (=) | (+++) | (=) |
| CCL5 | Macrophage and NK cell migration; T cell–DC interactions | (=) | (+++) | (=) | (+++) | (+++) |
| CCL3 | Monocyte/macrophage and T cell trafficking | (=) | (=) | (=) | (=) | (=) |
| CXCL9 | Growth, movement, activation, Th1 response | (=) | (+++) | (=) | (=) | (=) |
| CXCL5 | Neutrophil trafficking | (=) | (=) | (=) | (=) | (=) |
| CCL20 | B and dendritic cell Homing Recruitment to inflammatory or infection sites, TH17 response | (=) | (=) | (=) | (=) | (=) |
| CXCL1 | Neutrophil trafficking, mitogenic activity | (=) | (- -) | (=) | (=) | (=) |
| CXCL11 | TH2 immune response | (=) | (=) | (=) | (=) | (=) |
| CCL4 | Inflammatory chemoattractant for NK cells and monocytes | (=) | (=) | (=) | (=) | (=) |

Fig. 3B

```
                        SEQUENCE LISTING

<160> NUMBER OF SEQ ID NOS: 30

<210> SEQ ID NO 1
    <211> LENGTH: 311
    <212> TYPE: PRT
    <213> ORGANISM: Homo sapiens

<400> SEQUENCE: 1

Met Arg Gly Ala Ala Arg Ala Ala Trp Gly Arg Ala Gly Gln Pro Trp
    1               5                   10                  15

Pro Arg Pro Pro Ala Pro Gly Pro Pro Pro Pro Leu Pro Leu Leu
                    20                  25                  30

Leu Leu Leu Leu Ala Gly Leu Leu Gly Gly Ala Gly Ala Gln Tyr Ser
                35                  40                  45

Ser Asp Arg Cys Ser Trp Lys Gly Ser Gly Leu Thr His Glu Ala His
        50                  55                  60

Arg Lys Glu Val Glu Gln Val Tyr Leu Arg Cys Ala Ala Gly Ala Val
    65                  70                  75                  80

Glu Trp Met Tyr Pro Thr Gly Ala Leu Ile Val Asn Leu Arg Pro Asn
                    85                  90                  95

Thr Phe Ser Pro Ala Arg His Leu Thr Val Cys Ile Arg Ser Phe Thr
                    100                 105                 110

Asp Ser Ser Gly Ala Asn Ile Tyr Leu Glu Lys Thr Gly Glu Leu Arg
                115                 120                 125

Leu Leu Val Pro Asp Gly Asp Gly Arg Pro Gly Arg Val Gln Cys Phe
                130                 135                 140

Gly Leu Glu Gln Gly Gly Leu Phe Val Glu Ala Thr Pro Gln Gln Asp
    145                 150                 155                 160

Ile Gly Arg Arg Thr Thr Gly Phe Gln Tyr Glu Leu Val Arg Arg His
                    165                 170                 175

Arg Ala Ser Asp Leu His Glu Leu Ser Ala Pro Cys Arg Pro Cys Ser
                180                 185                 190

Asp Thr Glu Val Leu Leu Ala Val Cys Thr Ser Asp Phe Ala Val Arg
                195                 200                 205

Gly Ser Ile Gln Gln Val Thr His Glu Pro Glu Arg Gln Asp Ser Ala
                210                 215                 220

Ile His Leu Arg Val Ser Arg Leu Tyr Arg Gln Lys Ser Arg Val Phe
    225                 230                 235                 240

Glu Pro Val Pro Glu Gly Asp Gly His Trp Gln Gly Arg Val Arg Thr
                    245                 250                 255
```

```
Leu Leu Glu Cys Gly Val Arg Pro Gly His Gly Asp Phe Leu Phe Thr
            260                 265                 270

Gly His Met His Phe Gly Glu Ala Arg Leu Gly Cys Ala Pro Arg Phe
        275                 280                 285

Lys Asp Phe Gln Arg Met Tyr Arg Asp Ala Gln Glu Arg Gly Leu Asn
    290                 295                 300

Pro Cys Glu Val Gly Thr Asp
305                 310

<210> SEQ ID NO 2
<211> LENGTH: 1690
<212> TYPE: DNA
<213> ORGANISM: Homo sapiens

<400> SEQUENCE: 2
agaggctcgg cggcggcggc gggcgcggag ctctgcgcgc ggctccagcg ggccgggatg      60
ggcgggcggc cgcgcggagg acgcgggggg cgcgcgacgt gaccacccgg actcgaagcc     120
cgccccgccc ccgccggct cgccggctcc ggggtctgct ccggggtcg cggacgcggg       180 gccgggcggc ggagccggcg ccagagcatg cggggcgcgg cgcgggcggc ctggggggcgc    240 gcggggcagc cgtggccgcg acccccgcc ccgggcccgc cccgccgcc gctcccgctg       300 ctgctcctgc tcctggccgg gctgctgggc ggcgcgggcg cgcagtactc cagcgaccgg     360
tgcagctgga aggggagcgg gctgacgcac gaggcacaca ggaaggaggt ggagcaggtg     420
tatctgcgct gtgcgcgggg tgccgtggag tggatgtacc caacaggtgc tctcatcgtt     480
aacctgcggc ccaacacctt ctcgcctgcc cggcacctga ccgtgtgcat caggtccttc     540
acggactcct cggggccaa tatttatttg gaaaaactg gagaactgag actgctggta      600
ccagacgggg acggcaggcc cggccgggtg cagtgttttg gcctggagca gggcggcctg     660
ttcgtggagg ccacgccgca gcaggatatc ggccggagga ccacaggctt ccagtacgag     720
ctggttagga ggcacagggc gtcggacctg cacgagctgt ctgcgccgtg ccgtccctgc     780
agtgacaccg aggtgctcct agccgtctgc accagcgact cgccgttcg aggctccatc     840 cagcaagtta cccacgagcc tgagcggcag gactcagcca tccacctgcg cgtgagcaga     900
ctctatcggc agaaaagcag ggtcttcgag ccggtgcccg agggtgacgg ccactggcag     960
gggcgcgtca ggacgctgct ggagtgtggc gtgcggccgg gcatggcga cttcctcttc    1020 actggccaca tgcacttcgg ggaggcgcgg ctcggctgtg ccccacgctt caaggacttc    1080
cagaggatgt acaggatgc caggagagg gggctgaacc cttgtgaggt tggcacggac      1140
tgactccgtg ggccgctgcc cttcctctcc tgatgagtca caggctgcgg tgggcgctgc    1200
ggtcctggtg gggccgtgcg gtgagggccg cgcgctggga ccgcatgcc ctgggcccag    1260 gcctgaccct ggtaccgaag ctgtggacgt tctcgccaca ctcaacccca tgagcttcca    1320
gccaaggatg ccctggccga ttggaaatgc tgtaaaatgc aaactaagtt attatatttt    1380
tttttggtaa aaagaaatg tccataggaa acaaattccc gtgtcttaaa acgccttggt     1440
gtgccgtctg atactgttct ctaaagacgt taggagtcac ggcatctggc ctgcggttgg    1500
gtgaagcact ggccgttggg cacagtggat gtgtgaaaag gtgccattca gagttgttat    1560
tctcatgacg gaagttttgg agccaaataa tacgtttttt atttcatttt tatttttaaa    1620
ggatgagctt tggtccttt caggccgccg gttgtttccg ttcccgagaa taaagacgag     1680
gatccgacca                                                          1690
```

<210> SEQ ID NO 3
<211> LENGTH: 311
<212> TYPE: PRT
<213> ORGANISM: Mus musculus

<400> SEQUENCE: 3

Met Arg Gly Ala Val Trp Ala Ala Arg Arg Ala Gly Gln Gln Trp
1               5                   10                  15

Pro Arg Ser Pro Gly Pro Gly Pro Gly Pro Pro Pro Pro Pro Leu
                20                  25                  30

Leu Leu Leu Leu Leu Leu Leu Leu Gly Gly Ala Ser Ala Gln Tyr Ser
                35                  40                  45

Ser Asp Leu Cys Ser Trp Lys Gly Ser Gly Leu Thr Arg Glu Ala Arg
        50                  55                  60

Ser Lys Glu Val Glu Gln Val Tyr Leu Arg Cys Ser Ala Gly Ser Val
65                  70                  75                  80

Glu Trp Met Tyr Pro Thr Gly Ala Leu Ile Val Asn Leu Arg Pro Asn
                    85                  90                  95

Thr Phe Ser Pro Ala Gln Asn Leu Thr Val Cys Ile Lys Pro Phe Arg
                100                 105                 110

Asp Ser Ser Gly Ala Asn Ile Tyr Leu Glu Lys Thr Gly Glu Leu Arg
            115                 120                 125

Leu Leu Val Arg Asp Ile Arg Gly Glu Pro Gly Gln Val Gln Cys Phe
130                 135                 140

Ser Leu Glu Gln Gly Gly Leu Phe Val Glu Ala Thr Pro Gln Asp
145                 150                 155                 160

Ile Ser Arg Arg Thr Thr Gly Phe Gln Tyr Glu Leu Met Ser Gly Gln
                    165                 170                 175

Arg Gly Leu Asp Leu His Val Leu Ser Ala Pro Cys Arg Pro Cys Ser
                180                 185                 190

Asp Thr Glu Val Leu Leu Ala Ile Cys Thr Ser Asp Phe Val Val Arg
            195                 200                 205

Gly Phe Ile Glu Asp Val Thr His Val Pro Glu Gln Gln Val Ser Val
210                 215                 220

Ile Tyr Leu Arg Val Asn Arg Leu His Arg Gln Lys Ser Arg Val Phe
225                 230                 235                 240

Gln Pro Ala Pro Glu Asp Ser Gly His Trp Leu Gly His Val Thr Thr
                245                 250                 255

Leu Leu Gln Cys Gly Val Arg Pro Gly His Gly Glu Phe Leu Phe Thr
            260                 265                 270

Gly His Val His Phe Gly Glu Ala Gln Leu Gly Cys Ala Pro Arg Phe
        275                 280                 285

Ser Asp Phe Gln Arg Met Tyr Arg Lys Ala Glu Glu Met Gly Ile Asn
    290                 295                 300

Pro Cys Glu Ile Asn Met Glu
305                 310

<210> SEQ ID NO 4
<211> LENGTH: 2468
<212> TYPE: DNA
<213> ORGANISM: Mus musculus

<400> SEQUENCE: 4
agaggttcta ggggcagccg gcgcgcttct ctagttgcag cttgggcggc tcctgtggtg    60
ggcggctagg ggcgagccgg gatgggctat agacgcgcga cgtgatcagt tcgcacgcgg   120

-continued

```
acccacgcct cccatcgctc tgcctcaaga gcctattctg tgggtgcagg cacgcaccgg      180
acgcagaccc ggccggagca tgcggggtgc ggtgtgggcg gcccggaggc gcgcggggca      240
gcagtggcct cggtccccgg gccctgggcc gggtccgccc ccgccgccac cgctgctgtt      300
gctgctacta ctgctgctgg gcggcgcgag cgctcagtac tccagcgacc tgtgcagctg      360
gaaggggagt gggctcaccc gagaggcacg cagcaaggag gtggagcagg tgtacctgcg      420
ctgctccgca ggctctgtgg agtggatgta cccaactggg gcgctcattg ttaacctacg      480
gcccaacacc ttctcacctg cccagaactt gactgtgtgc atcaagcctt caggactc        540 ctctggagcc aatatttatt tggaaaaaac tggagaacta agactgttgg tgcgggacat      600
cagaggtgag cctggccaag tgcagtgctt cagcctggag cagggaggct atttgtgga       660 ggcgacaccc caacaggaca tcagcagaag gaccacaggc ttccagtatg agctgatgag      720
tgggcagagg ggactggacc tgcacgtgct gtctgccccc tgtcggcctt gcagtgacac      780
tgaggtcctc cttgccatct gtaccagtga ctttgttgtc cgaggcttca ttgaggacgt      840
cacacatgta ccagaacagc aagtgtcagt catctacctg cgggtgaaca ggcttcacag      900
gcagaagagc agggtcttcc agccagctcc tgaggacagt ggccactggc tgggccatgt      960
cacaacactg ctgcagtgtg gagtacgacc agggcatggg gaattcctct tcactggaca     1020
tgtgcacttt ggggaggcac aacttggatg tgccccacgc tttagtgact ttcaaaggat     1080
gtacaggaaa gcagaagaaa tgggcataaa cccctgtgaa atcaatatgg agtgacttgc     1140
agggtgacac agtactgttg tccttcagat gagccatgtt ttgtgggctc agtcgctcta     1200
tcatatcctg atagagattg cagactggtg gcatgggccc agcctggtgc tagaactggg     1260
aaggtacatg ctgctctgac cccttaggtc ccagccaagg atgccctgac ccattggaac     1320
tgctgtaaaa tgcaaactaa gttattatat tttttttgta aaagatgcct tggtgtgcca     1380
tttaatagtg ttttacaaa gttattttca ggcattggat ttggcctggt atattggtgg      1440
gagctaggtt atggtgtgca gtgatggcta tggctcagcc ttgttattcc tgtgatggaa     1500
atgtatggag caaatacttt ctaatttccc cttcattta ttttctattt taaaagacca      1560
tctttgccgt tgagaacctt tccagactgt atggaggctg ctcccattcc agggagtaaa     1620
gaccaggatc tgagactagt attacatcca tcttaaccca tcagatgggt acctgcattg     1680
aaccttctct gctcagctat ggcctgctgt cccaaagacc ttttgctctc tggacagttc     1740
cagatggtgc tgcctggctt aagggacttg ttcctccctt gctcctacca ggccactgtt     1800
gctttctgca tctgtcccac tgaaccagtc ttgtcctttg accctgagtt tccccaaatg     1860
cacacatcaa atccctgaat accaagggac taacctactt aatggcccat tcttcagag      1920 ggtgtgggtt ttccctatag taagaaaatc tccacaagtt gaagcttaaa cagtaggctt     1980
tcgttcatac agtcctggaa gccagaatgg gtgtgagcag aatcacattt cctccggaga     2040
ctccaggagg gactttatag cttctggtga ctccaggaat ccttggcttg taacaatttc     2100
actctggcat tgctttccct gccatgtgac ttctgccttg tatgtgaggg cctgtatcaa     2160
atctctgtct tgggaggata cagatcattg acttagggcc cactccggtg acctcacctt     2220
cacctgaaat ttactcgatt tccatttagg tcagaggcaa aggctacaaa aaatatcaaa     2280
tccggagaaa gattcaatgg ttaggcactt gctactctta caaggacct gtgttcgatt      2340 cccatgttgg gaactcatgt taggtggctt aaaattgcct ataactacaa ttccaggga      2400 tctagcaacc tcttctcgcc acacacaagc acacacacac acacacacac acacacacaa     2460
``` ttaaaaac                                                                    2468

<210> SEQ ID NO 5
<211> LENGTH: 166
<212> TYPE: PRT
<213> ORGANISM: Homo sapiens

<400> SEQUENCE: 5

Met Lys Tyr Thr Ser Tyr Ile Leu Ala Phe Gln Leu Cys Ile Val Leu
1               5                   10                  15

Gly Ser Leu Gly Cys Tyr Cys Gln Asp Pro Tyr Val Lys Glu Ala Glu
            20                  25                  30

Asn Leu Lys Lys Tyr Phe Asn Ala Gly His Ser Asp Val Ala Asp Asn
        35                  40                  45

Gly Thr Leu Phe Leu Gly Ile Leu Lys Asn Trp Lys Glu Glu Ser Asp
    50                  55                  60

Arg Lys Ile Met Gln Ser Gln Ile Val Ser Phe Tyr Phe Lys Leu Phe
65                  70                  75                  80

Lys Asn Phe Lys Asp Asp Gln Ser Ile Gln Lys Ser Val Glu Thr Ile
                85                  90                  95

Lys Glu Asp Met Asn Val Lys Phe Phe Asn Ser Asn Lys Lys Lys Arg
            100                 105                 110

Asp Asp Phe Glu Lys Leu Thr Asn Tyr Ser Val Thr Asp Leu Asn Val
        115                 120                 125

Gln Arg Lys Ala Ile His Glu Leu Ile Gln Val Met Ala Glu Leu Ser
    130                 135                 140

Pro Ala Ala Lys Thr Gly Lys Arg Lys Arg Ser Gln Met Leu Phe Arg
145                 150                 155                 160

Gly Arg Arg Ala Ser Gln
                165

<210> SEQ ID NO 6
<211> LENGTH: 1211
<212> TYPE: DNA
<213> ORGANISM: Homo sapiens

<400> SEQUENCE: 6
acattgttct gatcatctga agatcagcta ttagaagaga aagatcagtt aagtcctttg     60
gacctgatca gcttgataca agaactactg atttcaactt ctttggctta attctctcgg    120
aaacgatgaa atatacaagt tatatcttgg cttttcagct ctgcatcgtt ttgggttctc    180
ttggctgtta ctgccaggac ccatatgtaa agaagcaga aaaccttaag aaatatttta    240
atgcaggtca ttcagatgta gcggataatg gaactctttt cttaggcatt ttgaagaatt    300
ggaaagagga gagtgacaga aaaataatgc agagccaaat tgtctccttt tacttcaaac    360 ttttttaaaaa ctttaaagat gaccagagca tccaaaagag tgtggagacc atcaaggaag    420
acatgaatgt caagtttttc aatagcaaca aaaagaaacg agatgacttc gaaaagctga    480
ctaattattc ggtaactgac ttgaatgtcc aacgcaaagc aatacatgaa ctcatccaag    540
tgatggctga actgtcgcca gcagctaaaa cagggaagcg aaaaaggagt cagatgctgt    600
ttcgaggtcg aagagcatcc cagtaatggt tgtcctgcct gcaatatttg aattttaaat    660
ctaaatctat ttattaatat ttaacattat ttatatgggg aatatatttt tagactcatc    720
aatcaaataa gtatttataa tagcaacttt tgtgtaatga aaatgaatat ctattaatat    780
atgtattatt tataattcct atatcctgtg actgtctcac ttaatccttt gttttctgac    840

```
taattaggca aggctatgtg attacaaggc tttatctcag gggccaacta ggcagccaac    900
ctaagcaaga tcccatgggt tgtgtgttta tttcacttga tgatacaatg aacacttata    960
agtgaagtga tactatccag ttactgccgg tttgaaaata tgcctgcaat ctgagccagt   1020
gctttaatgg catgtcagac agaacttgaa tgtgtcaggt gaccctgatg aaaacatagc   1080
atctcaggag atttcatgcc tggtgcttcc aaatattgtt gacaactgtg actgtaccca   1140
aatggaaagt aactcatttg ttaaaattat caatatctaa tatatatgaa taaagtgtaa   1200
gttcacaact a                                                        1211
```

<210> SEQ ID NO 7
<211> LENGTH: 155
<212> TYPE: PRT
<213> ORGANISM: Mus musculus

<400> SEQUENCE: 7

```
Met Asn Ala Thr His Cys Ile Leu Ala Leu Gln Leu Phe Leu Met Ala
1               5                   10                  15

Val Ser Gly Cys Tyr Cys His Gly Thr Val Ile Glu Ser Leu Glu Ser
            20                  25                  30

Leu Asn Asn Tyr Phe Asn Ser Ser Gly Ile Asp Val Glu Glu Lys Ser
        35                  40                  45

Leu Phe Leu Asp Ile Trp Arg Asn Trp Gln Lys Asp Gly Asp Met Lys
    50                  55                  60

Ile Leu Gln Ser Gln Ile Ile Ser Phe Tyr Leu Arg Leu Phe Glu Val
65                  70                  75                  80

Leu Lys Asp Asn Gln Ala Ile Ser Asn Asn Ile Ser Val Ile Glu Ser
                85                  90                  95

His Leu Ile Thr Thr Phe Phe Ser Asn Ser Lys Ala Lys Lys Asp Ala
            100                 105                 110

Phe Met Ser Ile Ala Lys Phe Glu Val Asn Asn Pro Gln Val Gln Arg
        115                 120                 125

Gln Ala Phe Asn Glu Leu Ile Arg Val Val His Gln Leu Leu Pro Glu
    130                 135                 140

Ser Ser Leu Arg Lys Arg Lys Arg Ser Arg Cys
145                 150                 155
```

<210> SEQ ID NO 8
<211> LENGTH: 1210
<212> TYPE: DNA
<213> ORGANISM: Mus musculus

<400> SEQUENCE: 8

```
tatagctgcc atcggctgac ctagagaaga cacatcagct gatcctttgg accctctgac     60
ttgagacaga agttctgggc ttctcctcct gcggcctagc tctgagacaa tgaacgctac    120
acactgcatc ttggctttgc agctcttcct catggctgtt tctggctgtt actgccacgg    180
cacagtcatt gaaagcctag aaagtctgaa taactatttt aactcaagtg gcatagatgt    240
ggaagaaaag agtctcttct tggatatctg gaggaactgg caaaaggatg gtgacatgaa    300
aatcctgcag agccagatta tctcttttcta cctcagactc tttgaagtct tgaaagacaa    360
tcaggccatc agcaacaaca taagcgtcat tgaatcacac ctgattacta ccttcttcag    420
caacagcaag gcgaaaaagg atgcattcat gagtattgcc aagtttgagg tcaacaaccc    480
acaggtccga cgccaagcat tcaatgagct catccgagtg gtccaccagc tgttgccgga    540
atccagcctc aggaagcgga aaaggagtcg ctgctgattc ggggtgggga agagattgtc    600
```

```
ccaataagaa taattctgcc agcactattt gaattttta  atctaaacct atttattaat      660
atttaaaact atttatatgg agaatctatt ttagatgcat caaccaaaga agtatttata      720
gtaacaactt atatgtgata agagtgaatt cctattaata tatgtgttat ttataatttc      780
tgtctcctca actatttctc tttgaccaat taattattct ttctgactaa ttagccaaga      840
ctgtgattgc ggggttgtat ctggggtgg  gggacagcca agcggctgac tgaactcaga      900
ttgtagcttg tacctttact tcactgacca ataagaaaca ttcagagctg cagtgacccc      960
gggaggtgct gctgatggga ggagatgtct acactccggg ccagcgcttt aacagcaggc     1020
cagacagcac tcgaatgtgt caggtagtaa caggctgtcc ctgaaagaaa gcagtgtctc     1080
aagagacttg acacctggtg cttccctata cagctgaaaa ctgtgactac acccgaatga     1140
caaataactc gctcatttat agtttatcac tgtctaattg catatgaata aagtatacct     1200
ttgcaaccaa                                                            1210
```

<210> SEQ ID NO 9
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 9

```
Gly Gly Gly Ser Gly Gly Gly Ser Gly Gly Gly Ser
1               5                   10
```

<210> SEQ ID NO 10
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence: Synthetic 6xHis tag"

<400> SEQUENCE: 10

```
His His His His His His
1               5
```

<210> SEQ ID NO 11
<211> LENGTH: 153
<212> TYPE: PRT
<213> ORGANISM: Homo sapiens

<400> SEQUENCE: 11

```
Met Gly Leu Thr Ser Gln Leu Leu Pro Pro Leu Phe Phe Leu Leu Ala
1               5                   10                  15

Cys Ala Gly Asn Phe Val His Gly His Lys Cys Asp Ile Thr Leu Gln
                20                  25                  30

Glu Ile Ile Lys Thr Leu Asn Ser Leu Thr Glu Gln Lys Thr Leu Cys
            35                  40                  45

Thr Glu Leu Thr Val Thr Asp Ile Phe Ala Ala Ser Lys Asn Thr Thr
        50                  55                  60

Glu Lys Glu Thr Phe Cys Arg Ala Ala Thr Val Leu Arg Gln Phe Tyr
65                  70                  75                  80

Ser His His Glu Lys Asp Thr Arg Cys Leu Gly Ala Thr Ala Gln Gln
                85                  90                  95
```

```
Phe His Arg His Lys Gln Leu Ile Arg Phe Leu Lys Arg Leu Asp Arg
            100                 105                 110

Asn Leu Trp Gly Leu Ala Gly Leu Asn Ser Cys Pro Val Lys Glu Ala
        115                 120                 125

Asn Gln Ser Thr Leu Glu Asn Phe Leu Glu Arg Leu Lys Thr Ile Met
    130                 135                 140

Arg Glu Lys Tyr Ser Lys Cys Ser Ser
145                 150
```

<210> SEQ ID NO 12
<211> LENGTH: 462
<212> TYPE: DNA
<213> ORGANISM: Homo sapiens

<400> SEQUENCE: 12

```
atgggtctca cctcccaact gcttccccct ctgttcttcc tgctagcatg tgccggcaac    60
tttgtccacg gacacaagtg cgatatcacc ttacaggaga tcatcaaaac tttgaacagc   120
ctcacagagc agaagactct gtgcaccgag ttgaccgtaa cagacatctt tgctgcctcc   180
aagaacacaa ctgagaagga aaccttctgc agggctgcga ctgtgctccg gcagttctac   240
agccaccatg agaaggacac tcgctgcctg ggtgcgactg cacagcagtt ccacaggcac   300
aagcagctga tccgattcct gaaacggctc gacaggaacc tctggggcct ggcgggcttg   360
aattcctgtc ctgtgaagga agccaaccag agtacgttgg aaaacttctt ggaaaggcta   420
aagacgatca tgagagagaa atattcaaag tgttcgagct ga                      462
```

<210> SEQ ID NO 13
<211> LENGTH: 140
<212> TYPE: PRT
<213> ORGANISM: Mus musculus

<400> SEQUENCE: 13

```
Met Gly Leu Asn Pro Gln Leu Val Val Ile Leu Leu Phe Phe Leu Glu
1               5                   10                  15

Cys Thr Arg Ser His Ile His Gly Cys Asp Lys Asn His Leu Arg Glu
            20                  25                  30

Ile Ile Gly Ile Leu Asn Glu Val Thr Gly Glu Gly Thr Pro Cys Thr
        35                  40                  45

Glu Met Asp Val Pro Asn Val Leu Thr Ala Thr Lys Asn Thr Thr Glu
    50                  55                  60

Ser Glu Leu Val Cys Arg Ala Ser Lys Val Leu Arg Ile Phe Tyr Leu
65                  70                  75                  80

Lys His Gly Lys Thr Pro Cys Leu Lys Lys Asn Ser Ser Val Leu Met
                85                  90                  95

Glu Leu Gln Arg Leu Phe Arg Ala Phe Arg Cys Leu Asp Ser Ser Ile
            100                 105                 110

Ser Cys Thr Met Asn Glu Ser Lys Ser Thr Ser Leu Lys Asp Phe Leu
        115                 120                 125

Glu Ser Leu Lys Ser Ile Met Gln Met Asp Tyr Ser
    130                 135                 140
```

<210> SEQ ID NO 14
<211> LENGTH: 423
<212> TYPE: DNA
<213> ORGANISM: Mus musculus

<400> SEQUENCE: 14

```
atgggtctca acccccagct agttgtcatc ctgctcttct ttctcgaatg taccaggagc      60
catatccacg gatgcgacaa aaatcacttg agagagatca tcggcatttt gaacgaggtc    120
acaggagaag ggacgccatg cacggagatg gatgtgccaa acgtcctcac agcaacgaag    180
aacaccacag agagtgagct cgtctgtagg gcttccaagg tgcttcgcat attttattta    240
aaacatggga aaactccatg cttgaagaag aactctagtg ttctcatgga gctgcagaga    300
ctctttcggg cttttcgatg cctggattca tcgataagct gcaccatgaa tgagtccaag    360
tccacatcac tgaaagactt cctggaaagc ctaaagagca tcatgcaaat ggattactcg    420
tag                                                                   423
```

<210> SEQ ID NO 15
<211> LENGTH: 178
<212> TYPE: PRT
<213> ORGANISM: Homo sapiens

<400> SEQUENCE: 15

```
Met His Ser Ser Ala Leu Leu Cys Cys Leu Val Leu Leu Thr Gly Val
1               5                   10                  15

Arg Ala Ser Pro Gly Gln Gly Thr Gln Ser Glu Asn Ser Cys Thr His
                20                  25                  30

Phe Pro Gly Asn Leu Pro Asn Met Leu Arg Asp Leu Arg Asp Ala Phe
            35                  40                  45

Ser Arg Val Lys Thr Phe Phe Gln Met Lys Asp Gln Leu Asp Asn Leu
        50                  55                  60

Leu Leu Lys Glu Ser Leu Leu Glu Asp Phe Lys Gly Tyr Leu Gly Cys
65                  70                  75                  80

Gln Ala Leu Ser Glu Met Ile Gln Phe Tyr Leu Glu Glu Val Met Pro
                85                  90                  95

Gln Ala Glu Asn Gln Asp Pro Asp Ile Lys Ala His Val Asn Ser Leu
            100                 105                 110

Gly Glu Asn Leu Lys Thr Leu Arg Leu Arg Leu Arg Arg Cys His Arg
        115                 120                 125

Phe Leu Pro Cys Glu Asn Lys Ser Lys Ala Val Glu Gln Val Lys Asn
    130                 135                 140

Ala Phe Asn Lys Leu Gln Glu Lys Gly Ile Tyr Lys Ala Met Ser Glu
145                 150                 155                 160

Phe Asp Ile Phe Ile Asn Tyr Ile Glu Ala Tyr Met Thr Met Lys Ile
                165                 170                 175

Arg Asn
```

<210> SEQ ID NO 16
<211> LENGTH: 537
<212> TYPE: DNA
<213> ORGANISM: Homo sapiens

<400> SEQUENCE: 16

```
atgcacagct cagcactgct ctgttgcctg gtcctcctga ctggggtgag ggccagccca      60
ggccagggca cccagtctga gaacagctgc acccacttcc caggcaacct gcctaacatg    120
cttcgagatc tccgagatgc cttcagcaga gtgaagactt tctttcaaat gaaggatcag    180
ctggacaact tgttgttaaa ggagtccttg ctggaggact taagggttta cctgggttgc    240
caagccttgt ctgagatgat ccagttttac ctggaggagg tgatgcccca agctgagaac    300
caagacccag acatcaaggc gcatgtgaac tccctggggg agaacctgaa gaccctcagg    360
```

```
ctgaggctac ggcgctgtca tcgatttctt ccctgtgaaa acaagagcaa ggccgtggag      420
caggtgaaga atgcctttaa taagctccaa gagaaaggca tctacaaagc catgagtgag      480
tttgacatct tcatcaacta catagaagcc tacatgacaa tgaagatacg aaactga        537
```

<210> SEQ ID NO 17
<211> LENGTH: 178
<212> TYPE: PRT
<213> ORGANISM: Mus musculus

<400> SEQUENCE: 17

```
Met Pro Gly Ser Ala Leu Leu Cys Cys Leu Leu Leu Thr Gly Met
1               5                   10                  15

Arg Ile Ser Arg Gly Gln Tyr Ser Arg Glu Asp Asn Asn Cys Thr His
                20                  25                  30

Phe Pro Val Gly Gln Ser His Met Leu Leu Glu Leu Arg Thr Ala Phe
                35                  40                  45

Ser Gln Val Lys Thr Phe Phe Gln Thr Lys Asp Gln Leu Asp Asn Ile
50                  55                  60

Leu Leu Thr Asp Ser Leu Met Gln Asp Phe Lys Gly Tyr Leu Gly Cys
65                  70                  75                  80

Gln Ala Leu Ser Glu Met Ile Gln Phe Tyr Leu Val Glu Val Met Pro
                85                  90                  95

Gln Ala Glu Lys His Gly Pro Glu Ile Lys Glu His Leu Asn Ser Leu
                100                 105                 110

Gly Glu Lys Leu Lys Thr Leu Arg Met Arg Leu Arg Arg Cys His Arg
                115                 120                 125

Phe Leu Pro Cys Glu Asn Lys Ser Lys Ala Val Glu Gln Val Lys Ser
130                 135                 140

Asp Phe Asn Lys Leu Gln Asp Gln Gly Val Tyr Lys Ala Met Asn Glu
145                 150                 155                 160

Phe Asp Ile Phe Ile Asn Cys Ile Glu Ala Tyr Met Met Ile Lys Met
                165                 170                 175

Lys Ser
```

<210> SEQ ID NO 18
<211> LENGTH: 537
<212> TYPE: DNA
<213> ORGANISM: Mus musculus

<400> SEQUENCE: 18

```
atgcctggct cagcactgct atgctgcctg ctcttactga ctggcatgag gatcagcagg       60
ggccagtaca gccgggaaga caataactgc acccacttcc cagtcggcca gagccacatg      120
ctcctagagc tgcggactgc cttcagccag gtgaagactt tctttcaaac aaaggaccag      180
ctggacaaca tactgctaac cgactcctta atgcaggact taagggtta cttgggttgc       240 caagccttat cggaaatgat ccagttttac ctggtagaag tgatgcccca ggcagagaag      300
catggcccag aaatcaagga gcatttgaat tccctgggtg agaagctgaa gaccctcagg      360
atgcggctga ggcgctgtca tcgatttctc ccctgtgaaa ataagagcaa ggcagtggag      420
caggtgaaga gtgattttaa taagctccaa gaccaaggtg tctacaaggc catgaatgaa      480
tttgacatct tcatcaactg catagaagca tacatgatga tcaaaatgaa aagctaa        537
```

<210> SEQ ID NO 19
<211> LENGTH: 390
<212> TYPE: PRT

-continued

<213> ORGANISM: Homo sapiens

<400> SEQUENCE: 19

Met Pro Pro Ser Gly Leu Arg Leu Leu Pro Leu Leu Leu Pro Leu Leu
1               5                   10                  15

Trp Leu Leu Val Leu Thr Pro Gly Arg Pro Ala Ala Gly Leu Ser Thr
            20                  25                  30

Cys Lys Thr Ile Asp Met Glu Leu Val Lys Arg Lys Arg Ile Glu Ala
        35                  40                  45

Ile Arg Gly Gln Ile Leu Ser Lys Leu Arg Leu Ala Ser Pro Pro Ser
    50                  55                  60

Gln Gly Glu Val Pro Pro Gly Pro Leu Pro Glu Ala Val Leu Ala Leu
65                  70                  75                  80

Tyr Asn Ser Thr Arg Asp Arg Val Ala Gly Glu Ser Ala Glu Pro Glu
                85                  90                  95

Pro Glu Pro Glu Ala Asp Tyr Tyr Ala Lys Glu Val Thr Arg Val Leu
            100                 105                 110

Met Val Glu Thr His Asn Glu Ile Tyr Asp Lys Phe Lys Gln Ser Thr
        115                 120                 125

His Ser Ile Tyr Met Phe Phe Asn Thr Ser Glu Leu Arg Glu Ala Val
    130                 135                 140

Pro Glu Pro Val Leu Leu Ser Arg Ala Glu Leu Arg Leu Leu Arg Leu
145                 150                 155                 160

Lys Leu Lys Val Glu Gln His Val Glu Leu Tyr Gln Lys Tyr Ser Asn
                165                 170                 175

Asn Ser Trp Arg Tyr Leu Ser Asn Arg Leu Leu Ala Pro Ser Asp Ser
            180                 185                 190

Pro Glu Trp Leu Ser Phe Asp Val Thr Gly Val Val Arg Gln Trp Leu
        195                 200                 205

Ser Arg Gly Gly Glu Ile Glu Gly Phe Arg Leu Ser Ala His Cys Ser
    210                 215                 220

Cys Asp Ser Arg Asp Asn Thr Leu Gln Val Asp Ile Asn Gly Phe Thr
225                 230                 235                 240

Thr Gly Arg Arg Gly Asp Leu Ala Thr Ile His Gly Met Asn Arg Pro
                245                 250                 255

Phe Leu Leu Leu Met Ala Thr Pro Leu Glu Arg Ala Gln His Leu Gln
            260                 265                 270

Ser Ser Arg His Arg Arg Ala Leu Asp Thr Asn Tyr Cys Phe Ser Ser
        275                 280                 285

Thr Glu Lys Asn Cys Cys Val Arg Gln Leu Tyr Ile Asp Phe Arg Lys
    290                 295                 300

Asp Leu Gly Trp Lys Trp Ile His Glu Pro Lys Gly Tyr His Ala Asn
305                 310                 315                 320

Phe Cys Leu Gly Pro Cys Pro Tyr Ile Trp Ser Leu Asp Thr Gln Tyr
                325                 330                 335

Ser Lys Val Leu Ala Leu Tyr Asn Gln His Asn Pro Gly Ala Ser Ala
            340                 345                 350

Ala Pro Cys Cys Val Pro Gln Ala Leu Glu Pro Leu Pro Ile Val Tyr
        355                 360                 365

Tyr Val Gly Arg Lys Pro Lys Val Glu Gln Leu Ser Asn Met Ile Val
    370                 375                 380

Arg Ser Cys Lys Cys Ser
385                 390

<210> SEQ ID NO 20
<211> LENGTH: 1173
<212> TYPE: DNA
<213> ORGANISM: Homo sapiens

<400> SEQUENCE: 20

```
atgccgccct ccgggctgcg gctgctgccg ctgctgctac cgctgctgtg gctactggtg      60
ctgacgcctg gccggccggc cgcgggacta tccacctgca agactatcga catggagctg     120
gtgaagcgga agcgcatcga ggccatccgc ggccagatcc tgtccaagct gcggctcgcc     180
agcccccga gccaggggga ggtgccgccc ggccgctgc cgaggccgt gctcgccctg        240
tacaacagca cccgcgaccg ggtggccggg gagagtgcag aaccggagcc cgagcctgag     300
gccgactact acgccaagga ggtcacccgc gtgctaatgg tggaaaccca caacgaaatc     360
tatgacaagt tcaagcagag tacacacagc atatatatgt tcttcaacac atcagagctc     420
cgagaagcgg tacctgaacc cgtgttgctc tcccgggcag agctgcgtct gctgaggctc     480
aagttaaaag tggagcagca cgtggagctg taccagaaat acagcaacaa ttcctggcga     540
tacctcagca accggctgct ggcacccagc gactcgccag agtggttatc ttttgatgtc     600
accggagttg tgcggcagtg gttgagccgt ggaggggaaa ttgagggctt cgccttagc      660
gcccactgct cctgtgacag cagggataac acactgcaag tggacatcaa cgggttcact     720
accgccgcc gaggtgacct ggccaccatt catggcatga accggccttt cctgcttctc      780
atggccaccc cgctggagag ggcccagcat ctgcaaagct cccggcaccg ccgagccctg     840
gacaccaact attgcttcag ctccacggag aagaactgct gcgtgcggca gctgtacatt     900
gacttccgca aggacctcgg ctggaagtgg atccacgagc ccaagggcta ccatgccaac     960
ttctgcctcg ggccctgccc ctacatttgg agcctggaca cgcagtacag caaggtcctg    1020
gccctgtaca accagcataa cccgggcgcc tcggcggcgc cgtgctgcgt gccgcaggcg    1080
ctggagccgc tgcccatcgt gtactacgtg ggccgcaagc ccaaggtgga gcagctgtcc    1140
aacatgatcg tgcgctcctg caagtgcagc tga                                 1173
```

<210> SEQ ID NO 21
<211> LENGTH: 390
<212> TYPE: PRT
<213> ORGANISM: Mus musculus

<400> SEQUENCE: 21

```
Met Pro Pro Ser Gly Leu Arg Leu Leu Pro Leu Leu Pro Leu Pro
1               5                   10                  15

Trp Leu Leu Val Leu Thr Pro Gly Arg Pro Ala Ala Gly Leu Ser Thr
            20                  25                  30

Cys Lys Thr Ile Asp Met Glu Leu Val Lys Arg Lys Arg Ile Glu Ala
                35                  40                  45

Ile Arg Gly Gln Ile Leu Ser Lys Leu Arg Leu Ala Ser Pro Pro Ser
        50                  55                  60

Gln Gly Glu Val Pro Pro Gly Pro Leu Pro Glu Ala Val Leu Ala Leu
65                  70                  75                  80

Tyr Asn Ser Thr Arg Asp Arg Val Ala Gly Glu Ser Ala Asp Pro Glu
                85                  90                  95

Pro Glu Pro Glu Ala Asp Tyr Tyr Ala Lys Glu Val Thr Arg Val Leu
            100                 105                 110

Met Val Asp Arg Asn Asn Ala Ile Tyr Glu Lys Thr Lys Asp Ile Ser
        115                 120                 125
```

His Ser Ile Tyr Met Phe Phe Asn Thr Ser Asp Ile Arg Glu Ala Val
     130                 135                 140

Pro Glu Pro Pro Leu Leu Ser Arg Ala Glu Leu Arg Leu Gln Arg Leu
145                 150                 155                 160

Lys Ser Ser Val Glu Gln His Val Glu Leu Tyr Gln Lys Tyr Ser Asn
             165                 170                 175

Asn Ser Trp Arg Tyr Leu Gly Asn Arg Leu Leu Thr Pro Thr Asp Thr
             180                 185                 190

Pro Glu Trp Leu Ser Phe Asp Val Thr Gly Val Val Arg Gln Trp Leu
             195                 200                 205

Asn Gln Gly Asp Gly Ile Gln Gly Phe Arg Phe Ser Ala His Cys Ser
     210                 215                 220

Cys Asp Ser Lys Asp Asn Lys Leu His Val Glu Ile Asn Gly Ile Ser
225                 230                 235                 240

Pro Lys Arg Arg Gly Asp Leu Gly Thr Ile His Asp Met Asn Arg Pro
                 245                 250                 255

Phe Leu Leu Leu Met Ala Thr Pro Leu Glu Arg Ala Gln His Leu His
             260                 265                 270

Ser Ser Arg His Arg Arg Ala Leu Asp Thr Asn Tyr Cys Phe Ser Ser
     275                 280                 285

Thr Glu Lys Asn Cys Cys Val Arg Gln Leu Tyr Ile Asp Phe Arg Lys
     290                 295                 300

Asp Leu Gly Trp Lys Trp Ile His Glu Pro Lys Gly Tyr His Ala Asn
305                 310                 315                 320

Phe Cys Leu Gly Pro Cys Pro Tyr Ile Trp Ser Leu Asp Thr Gln Tyr
                 325                 330                 335

Ser Lys Val Leu Ala Leu Tyr Asn Gln His Asn Pro Gly Ala Ser Ala
             340                 345                 350

Ser Pro Cys Cys Val Pro Gln Ala Leu Glu Pro Leu Pro Ile Val Tyr
         355                 360                 365

Tyr Val Gly Arg Lys Pro Lys Val Glu Gln Leu Ser Asn Met Ile Val
     370                 375                 380

Arg Ser Cys Lys Cys Ser
385                 390

<210> SEQ ID NO 22
<211> LENGTH: 1173
<212> TYPE: DNA
<213> ORGANISM: Mus musculus

<400> SEQUENCE: 22
atgccgccct cggggctgcg gctactgccg cttctgctcc cactcccgtg gcttctagtg      60
ctgacgcccg ggaggccagc cgcgggactc tccacctgca agaccatcga catggagctg     120
gtgaaacgga agcgcatcga agccatccgt ggccagatcc tgtccaaact aaggctcgcc     180 agtccccaa gccagggggga ggtaccgccc ggcccgctgc cgaggcggt gctcgctttg     240 tacaacagca cccgcgaccg ggtggcaggc gagagcgccg acccagagcc ggagcccgaa     300
gcggactact atgctaaaga ggtcacccgc gtgctaatgg tggaccgcaa caacgccatc     360
tatgagaaaa ccaaagacat ctcacacagt atatatatgt tcttcaatac gtcagacatt     420
cgggaagcag tgcccgaacc cccattgctg tcccgtgcag agctgcgctt gcagagatta     480
aaatcaagtg tggagcaaca tgtggaactc taccagaaat atagcaacaa ttcctggcgt     540
taccttggta accggctgct gaccccccact gatacgcctg agtggctgtc ttttgacgtc     600

```
actggagttg tacggcagtg gctgaaccaa ggagacggaa tacagggctt tcgattcagc    660
gctcactgct cttgtgacag caaagataac aaactccacg tggaaatcaa cgggatcagc    720
cccaaacgtc ggggcgacct gggcaccatc catgacatga accggcccct cctgctcctc    780
atggccaccc ccctggaaag ggcccagcac ctgcacagct cacggcaccg gagagccctg    840
gataccaact attgcttcag ctccacagag aagaactgct gtgtgcggca gctgtacatt    900
gactttagga aggacctggg ttggaagtgg atccacgagc ccaagggcta ccatgccaac    960
ttctgtctgg gaccctgccc ctatatttgg agcctggaca cacagtacag caaggtcctt   1020
gccctctaca accaacacaa cccgggcgct tcggcgtcac cgtgctgcgt gccgcaggct   1080
ttggagccac tgcccatcgt ctactacgtg ggtcgcaagc ccaaggtgga gcagttgtcc   1140
aacatgattg tgcgctcctg caagtgcagc tga                                1173
```

<210> SEQ ID NO 23
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 23

Asp Tyr Lys Asp Asp Asp Asp Lys Gly
1               5

<210> SEQ ID NO 24
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 24

Gly Lys Pro Ile Pro Asn Pro Leu Leu Gly Leu Asp Ser Thr
1               5                   10

<210> SEQ ID NO 25
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 25

Glu Gln Lys Leu Ile Ser Glu Glu Asp Leu
1               5                   10

<210> SEQ ID NO 26
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 26

Gln Pro Glu Leu Ala Pro Glu Asp Pro Glu Asp

```
<210> SEQ ID NO 27
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 27

Tyr Pro Tyr Asp Val Pro Asp Tyr Ala
1               5

<210> SEQ ID NO 28
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 28

Tyr Thr Asp Ile Glu Met Asn Arg Leu Gly Lys
1               5                   10

<210> SEQ ID NO 29
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
<220> FEATURE:
<221> NAME/KEY: MOD_RES
<222> LOCATION: (3)..(5)
<223> OTHER INFORMATION: Any amino acid
<220> FEATURE:
<221> NAME/KEY: SITE
<222> LOCATION: (3)..(5)
<223> OTHER INFORMATION: /note="This region may encompass 1-3 residues"

<400> SEQUENCE: 29

Cys Cys Xaa Xaa Xaa Cys Cys
1               5

<210> SEQ ID NO 30
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 30

Cys Cys Pro Gly Cys Cys
1               5
```

METHODS FOR DETECTING METEORIN-β ACTIVITY

RELATED PATENT APPLICATION(S)

This patent application is a continuation of PCT/US2020/016780, filed Feb. 5, 2020, which application claims the benefit of U.S. provisional patent application No. 62/803,047 filed on Feb. 8, 2019, entitled METHODS FOR DETECTING METEORIN-BETA ACTIVITY, naming Gerardo Arrevillaga BONI et al. as inventors. The entire content of the foregoing applications are incorporated herein by reference, including all text, tables, and drawings.

SEQUENCE LISTING

The instant application contains a Sequence Listing which has been submitted electronically in ASCII format and is hereby incorporated by reference in its entirety. Said ASCII copy, created on Feb. 24, 2020, is named BLD-2002-PC_SL.txt and is 39,046 bytes in size.

FIELD

The technology relates in part to methods for detecting the activity of meteorin-β and modified versions thereof.

BACKGROUND

Cytokines are small secreted proteins involved in immune responses, host defense, inflammation, and immune system development. Cytokines generally exert their effects by binding specific receptors on the membrane of target cells. Examples of cytokines include interleukins, chemokines, interferons, and members of the tumor necrosis factor superfamily. Certain cytokines are involved in autoimmune diseases, cancer, and other ailments; and may be useful for immunotherapy.

Meteorin-β is generally considered a macrophage-associated cytokine, and may be useful for certain research applications (e.g., studying the pathogenesis of certain diseases; studying immune cell activation and differentiation), diagnostics, and/or certain types of immunotherapy. Provided herein are methods for detecting the activity of meteorin-β (e.g., recombinant meteorin-β, and modified versions thereof).

SUMMARY

Provided herein, in some aspects, are methods for assessing activity of a meteorin-β polypeptide comprising a) contacting a cell with a first composition comprising a co-stimulant and a second composition comprising a meteorin-β polypeptide; b) measuring production by the cell of one or more cytokines and/or chemokines chosen from CCL2, CCL5, CXCL1, CXCL8, CXCL9, CXCL10, IL-6 and IL-1RA, thereby measuring cytokine production; and c) detecting the activity of the meteorin-β polypeptide in the second composition according to the cytokine production measured in (b).

Also provided herein, in some aspects, are methods for identifying whether a cell expresses, or is capable of expressing, a meteorin-β receptor comprising a) contacting a cell with a first composition comprising a stimulant; b) contacting the cell under binding conditions with a second composition comprising a meteorin-β polypeptide; c) detecting the presence, absence, and/or amount of meteorin-β polypeptide bound to the cell; and d) identifying whether the cell expresses, or is capable of expressing, the meteorin-β receptor according to the presence, absence, and/or amount of meteorin-β polypeptide detected in (c).

Also provided herein, in some aspects, are kits comprising a) a first composition comprising one or more co-stimulants chosen from IFN-γ, IL-4, IL-10, and TGFβ polypeptides; b) one or more components for measuring cytokine and/or chemokine production, where the cytokines and/or chemokines are chosen from one or more of CCL2, CCL5, CXCL1, CXCL8, CXCL9, CXCL10, IL-6 and IL-1RA; and c) instructions for use.

Certain embodiments are described further in the following description, examples, claims and drawings.

BRIEF DESCRIPTION OF THE DRAWINGS

The drawings illustrate certain embodiments of the technology and are not limiting. For clarity and ease of illustration, the drawings are not made to scale and, in some instances, various aspects may be shown exaggerated or enlarged to facilitate an understanding of particular embodiments.

FIG. 1 shows the production of CCL2 by THP-1 cells under meteorin-β stimulation (top panel) and IFN-γ and meteorin-β co-stimulation (bottom panel).

FIG. 3A shows comparative differences between control and meteorin-β treated cells. Relative comparative differences between control and meteorin-β treated cells for different cytokines are indicated in the first column and general activity is indicated in the second column. All samples were co-treated with 1 μg/ml of IFN-γ except for sample data shown in the third column (untreated vs. meteorin-β). The fourth column shows control vs. 6×His peptide (SEQ ID NO: 10) (used as an internal control) treatment comparison. The fifth, sixth and seventh columns compare cells co-stimulated with IFN-γ and IFN-γ plus 1 μg/ml, 2 μg/ml or 2.5 μg/ml of meteorin-β respectively. Data were obtained using LEGENDplex™ (BioLegend). (−) no differences, (+) less than 50% increase over control, (++) more than 50% increase over control, (+++) more than 100% increase over control.

FIG. 3B shows comparative differences between cells activated with cytokines (e.g., IFN-γ, TGFβ, IL-4, and IL-10) alone versus cells activated with cytokines and co-treated with meteorin-β. Relative comparative differences for several chemokines, listed in the first column, are indicated. Description of the general activity of each chemokine is indicated in the second column. Samples were untreated, treated with 2.5 μg/mL of meteorin-β alone, treated with 1 μg/mL of cytokine alone, or co-treated with 1 μg/mL of cytokine and 2.5 μg/mL of meteorin-β. Data were obtained using LEGENDplex™ (BioLegend). (=) denotes no difference, (−−) denotes less than 50% decrease over control, (+++) more than 100% increase over control.

DETAILED DESCRIPTION

Figure 2:
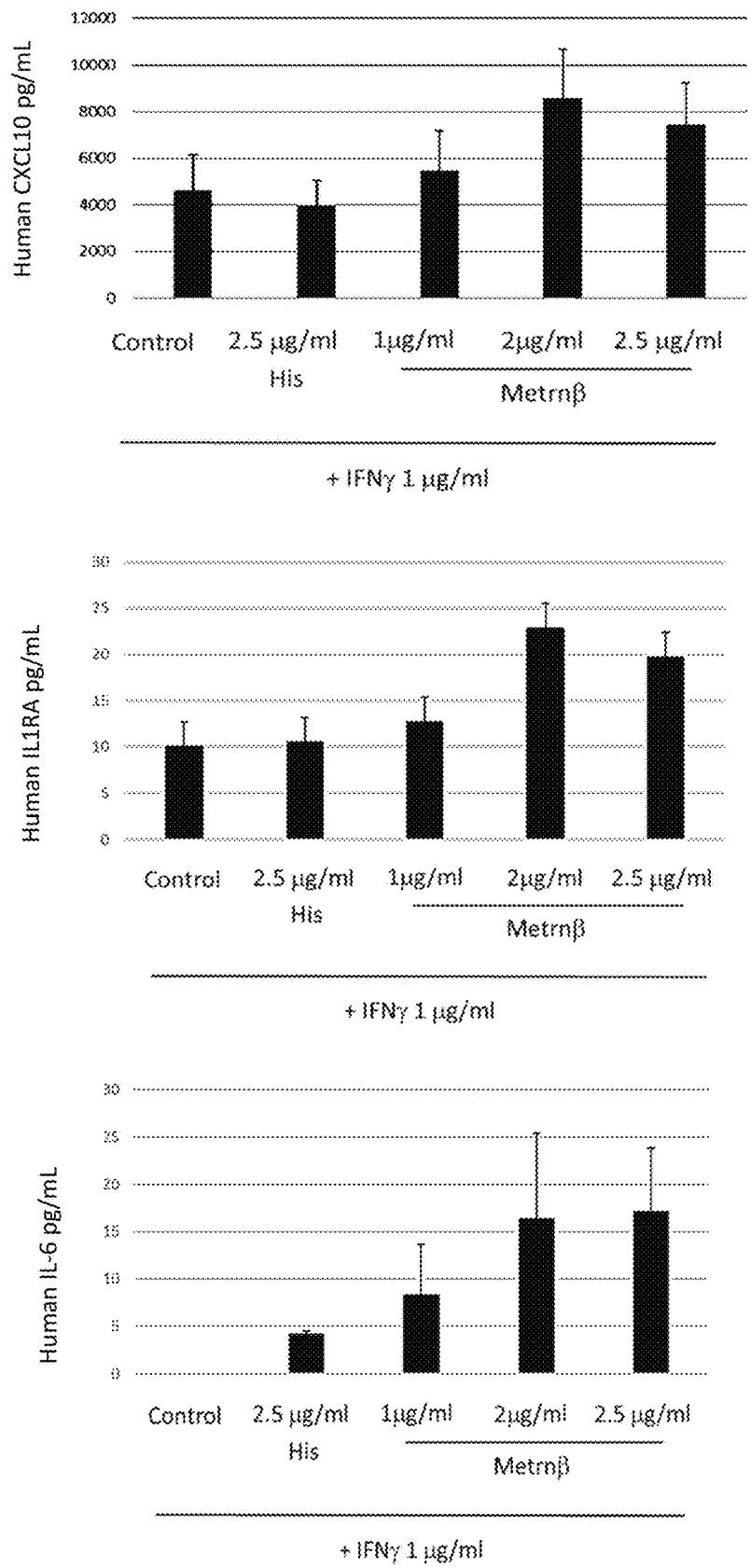
FIG. 2 shows the production of CXCL10 (top panel), IL1RA (middle panel), and IL-6 (bottom panel) by THP-1 cells under IFN-γ and meteorin-β co-stimulation.

Meteorin-β may useful for certain research applications, diagnostics, and/or immunotherapy. Accordingly, bioassays for assessing the activity of meteorin-β, recombinant meteorin-β, meteorin-β variants, meteorin-β fragments, and other modified versions of meteorin-β would be useful for developing practical applications for meteorin-β. Provided herein are methods for assessing the activity of meteorin-β. Also provided herein are methods identifying whether a cell expresses, or is capable of expressing, a meteorin-β receptor.
Meteorin-β

Provided herein are methods for assessing the activity of a meteorin-β polypeptide. Also provided herein are methods identifying whether a cell expresses, or is capable of expressing, a meteorin-β receptor. Meteorin-β, which may be referred to as meteorinβ, meteorin-beta, meteorin-b, Metrn-β, Metrnβ, meteorin like, meteorin-glial cell differentiation regulator-like, meteorin-like protein, METRNL, MGC99788, Subfatin, Cometin, interleukin 41 (IL-41), or interleukin 39 (IL-39), is a 311 amino acid (aa) protein that has 58% similarity with Meteorin (in human). Mature human meteorin-β shares 79% and 80% aa sequence identity with mouse and rat meteorin-β, respectively. Alternate splicing generates an additional isoform that lacks the N-terminal 82 amino acids including the signal peptide. Meteorin-β is expressed in certain adult mouse tissues with the highest expression in muscle tissue, adipose tissue, and activated monocytes. The expression of meteorin-β may be induced in muscle after exercise and in adipose tissue upon cold exposure. Meteorin-β may possess neurotrophic activity as it enhances neurite outgrowth and neuroblast migration in vivo. Meteorin-β also may be indirectly involved in the "browning" of white fat to a more thermogenic "beige fat."

An example human meteorin-β nucleic acid sequence is provided herein as SEQ ID NO: 2 (GENBANK Accession No. NM_001004431.3), and an example human meteorin-β amino acid sequence is provided herein as SEQ ID NO: 1 (GENBANK Accession No. NP_001004431.1). An example mouse meteorin-β nucleic acid sequence is provided herein as SEQ ID NO: 4 (GENBANK Accession No. NM_144797.3), and an example mouse meteorin-β amino acid sequence is provided herein as SEQ ID NO: 3 (GENBANK Accession No. NP_659046.1).

A meteorin-β polypeptide may refer to a precursor meteorin-β polypeptide (includes the signal peptide) or a mature meteorin-β polypeptide (excludes the signal peptide). In some embodiments, a meteorin-β polypeptide is a precursor meteorin-β polypeptide (e.g., a precursor human meteorin-β polypeptide comprising amino acids 1-311 of SEQ ID NO: 1; a precursor mouse meteorin-β polypeptide comprising amino acids 1-311 of SEQ ID NO: 3). In some embodiments, a meteorin-β polypeptide is a mature meteorin-β polypeptide (e.g., a mature human meteorin-β polypeptide comprising amino acids 46-311 of SEQ ID NO: 1; a mature mouse meteorin-β polypeptide comprising amino acids 46-311 of SEQ ID NO: 3).

In some embodiments, a meteorin-β polypeptide is a recombinant meteorin-β polypeptide. A recombinant meteorin-β polypeptide typically is a meteorin-β polypeptide encoded by DNA (i.e., meteorin-β nucleic acid sequence) that has been cloned in a vector or system that supports expression of the DNA and translation of messenger RNA. In some embodiments, a meteorin-β polypeptide is a recombinant human meteorin-β polypeptide (rh-meteorin-β). In some embodiments, a meteorin-β polypeptide is a recombinant mouse meteorin-β polypeptide (rm-meteorin-β).

A meteorin-β polypeptide herein may refer to an unmodified meteorin-β polypeptide. An unmodified polypeptide generally refers to a native or wild-type full-length (precursor or mature) polypeptide having no amino acid substitutions, no insertions, no deletions, no chemical modifications, no amino acid side-chain modifications, no tags, no detectable labels, no fusions, and the like.

A meteorin-β polypeptide herein may refer to a modified meteorin-β polypeptide. A modified polypeptide generally refers to a polypeptide comprising one or more amino acid substitutions, one or more insertions, one or more deletions, one or more chemical modifications, one or more amino acid side-chain modifications, one or more tags, one or more detectable labels, one or more fusions, and the like and combinations thereof. Modifications may include, for example, addition of one or more fluorophores, glycosylation, prenylation, PEGylation, attachment to a solid surface, biotinylation, antibody conjugation, conjugation to a therapeutic agent, chemical modifications at cysteine (e.g., aminoethylation, iodoacetamides, maleimides, Dha formation, disulfide formation, reaction of Dha with thiols, and desulfurization of disulfides), incorporation of one or more unnatural amino acids, and the like and combinations thereof.

In some embodiments, a meteorin-β polypeptide refers to a meteorin-β variant or mutant. Such variants include, for example, deletions from, and/or insertions into and/or substitutions of, residues within the amino acid sequences of a meteorin-β polypeptide. A meteorin-β variant may include any combination of deletion, insertion, and substitution. In some embodiments, a meteorin-β polypeptide comprises one or more amino acid substitutions. These variants have at least one amino acid residue removed from the meteorin-β polypeptide and a different residue inserted in its place. For example, a meteorin-β variant may comprise 1, 2, 3, 4, 5, 6, 7, 8, 9, 10 or more amino acid substitutions. A meteorin-β variant may include conservative substitutions and/or non-conservative substitutions, and the variants may be screened using one or more bioassays described herein for assessing meteorin-β activity. Examples of substitutions are listed below:

Example Amino Acid Residue Substitutions
    Ala (A) val; leu; ile; val
    Arg (R) lys; gln; asn; lys
    Asn (N) gln; his; asp, lys; gln; arg
    Asp (D) glu; asn
    Cys (C) ser; ala
    Gln (Q) asn; glu
    Glu (E) asp; gln
    Gly (G) ala
    His (H) asn; gln; lys; arg
    Ile (I) leu; val; met; ala; leu; phe; norleucine
    Leu (L) norleucine; ile; val; ile; met; ala; phe
    Lys (K) arg; gln; asn Met (M) leu; phe; ile
Phe (F) leu; val; ile; ala; tyr
Pro (P) ala
Ser (S) thr
Thr (T) ser
Trp (W) tyr; phe
Tyr (Y) trp; phe; thr; ser
Val (V) ile; leu; met; phe; ala; norleucine Substantial modifications in the biological properties of a meteorin-β polypeptide may be accomplished by selecting substitutions that differ significantly in their effect on maintaining (a) the structure of the polypeptide backbone in the area of the substitution, for example, as a sheet or helical conformation, (b) the charge or hydrophobicity of the molecule at the target site, and/or (c) the bulk of the side chain. Naturally occurring residues are divided into groups based on common side-chain properties:

(1) hydrophobic: norleucine, met, ala, val, leu, ile;
(2) neutral hydrophilic: cys, ser, thr;
(3) acidic: asp, glu;
(4) basic: asn, gln, his, lys, arg;
(5) residues that influence chain orientation: gly, pro; and
(6) aromatic: trp, tyr, phe.

Non-conservative substitutions typically entail exchanging a member of one of these classes for another class.

In some embodiments, a meteorin-β polypeptide comprises one or more insertions. In some embodiments, a meteorin-β polypeptide comprises one or more insertions, where each insertion comprises one or more amino acids. For example, each insertion may comprise 1, 2, 3, 4, 5, 6, 7, 8, 9, 10 or more inserted amino acids. In some embodiments, a meteorin-β polypeptide comprises one or more deletions. In some embodiments, a meteorin-β polypeptide comprises one or more deletions, where each deletion removes one or more amino acids from the full length amino acid sequence. For example, each deletion may remove 1, 2, 3, 4, 5, 6, 7, 8, 9, 10 or more amino acids.

In some embodiments, a meteorin-β polypeptide comprises a fused polypeptide. A fused polypeptide may be referred to as a fusion protein or chimeric protein. Fused polypeptides typically are created through the joining of two or more genes that code for separate proteins. Translation of this fusion construct may result in a single or multiple polypeptides with functional properties derived from each of the original proteins. Recombinant fusion proteins may be created artificially by recombinant DNA technology for use in biological research or therapeutics. Examples of fused polypeptides include meteorin-β fused with a fluorescent protein tag (e.g., green fluorescent protein (GFP)), therapeutic protein (e.g., antibody), or any protein tag described herein. In some embodiments a fused polypeptide comprises a linker (e.g., flexible linker, rigid linker, cleavable linker).

In some embodiments, a meteorin-β polypeptide comprises one or more tags (e.g., one or more amino acid or peptide tags; one or more affinity tags). Tags may facilitate detection, isolation and/or purification of a meteorin-β polypeptide. A tag sometimes specifically binds a molecule or moiety of a solid phase or a detectable label, for example, thereby having utility for isolating, purifying and/or detecting a meteorin-β polypeptide. In some embodiments, a tag comprises one or more of the following elements: Fc (derived from immunoglobulin Fc domain), FLAG (e.g., DYKDDDDKG (SEQ ID NO: 23)), V5 (e.g., GKPIPNPLLGLDST (SEQ ID NO: 24)), c-MYC (e.g., EQKLISEEDL (SEQ ID NO: 25)), HSV (e.g., QPELAPEDPED (SEQ ID NO: 26)), influenza hemagglutinin, HA (e.g., YPYDVPDYA (SEQ ID NO: 27), VSV-G (e.g., YTDIEMNRLGK (SEQ ID NO: 28)), bacterial glutathione-S-transferase, maltose binding protein, a streptavidin- or avidin-binding tag (e.g., pcDNA™6 BioEase™ Gateway® Biotinylation System (Invitrogen)), thioredoxin, β-galactosidase, VSV-glycoprotein, a fluorescent protein (e.g., green fluorescent protein or one of its many color variants (e.g., yellow, red, blue)), a polylysine or polyarginine sequence, a polyhistidine sequence (e.g., His6, 6×His (SEQ ID NO: 10)) or other sequence that chelates a metal (e.g., cobalt, zinc, copper), and/or a cysteine-rich sequence that binds to an arsenic-containing molecule. In certain embodiments, a cysteine-rich tag comprises the amino acid sequence CC-Xn-CC (SEQ ID NO: 29), where X is any amino acid and n is 1 to 3, and the cysteine-rich sequence sometimes is CCPGCC (SEQ ID NO: 30). In certain embodiments, the tag comprises a cysteine-rich element and a polyhistidine element (e.g., CCPGCC (SEQ ID NO: 30) and His6 (SEQ ID NO: 10)).

A tag may bind to a binding partner. For example, some tags bind to an antibody (e.g., FLAG) and sometimes specifically bind to a small molecule. For example, a polyhistidine tag specifically chelates a bivalent metal, such as copper, zinc and cobalt; a polylysine or polyarginine tag specifically binds to a zinc finger; a glutathione S-transferase tag binds to glutathione; and a cysteine-rich tag specifically binds to an arsenic-containing molecule. Arsenic-containing molecules include LUMIO™ agents (Invitrogen, California), such as FlAsH™ (EDT2[4',5'-bis(1,3,2-dithioarsolan-2-yl)fluorescein-(1,2-ethanedithiol)2]) and ReAsH reagents. Such antibodies and small molecules sometimes are linked to a solid phase for isolation of the target protein or target peptide.

In some embodiments, a meteorin-β polypeptide comprises one or more detectable markers or labels. In some embodiments, a meteorin-β polypeptide is conjugated to a detectable marker or label. For example, for research and diagnostic applications, a modified meteorin-β polypeptide may be labeled with a detectable moiety. Numerous labels are available which generally include radioisotopes (e.g., $^{35}S$, $^{14}C$, $^{125}I$, $^{3}H$, and $^{131}I$), fluorescent labels (e.g., rare earth chelates (europium chelates) or fluorescein and its derivatives, rhodamine and its derivatives, dansyl, Lissamine, phycoerythrin, Texas Red and Brilliant Violet™), and enzyme-substrate labels (e.g., described in U.S. Pat. No. 4,275,149, which is incorporated by reference herein, luciferases (e.g., firefly luciferase and bacterial luciferase; U.S. Pat. No. 4,737,456, which is incorporated by reference herein), luciferin, 2,3-dihydrophthalazinediones, malate dehydrogenase, urease, peroxidase such as horseradish peroxidase (HRP), alkaline phosphatase, beta-galactosidase, glucoamylase, lysozyme, saccharide oxidases (e.g., glucose oxidase, galactose oxidase, and glucose-6-phosphate dehydrogenase), heterocyclicoxidases (such as uricase and xanthine oxidase), lactoperoxidase, microperoxidase, and the like).

In certain instances, a label is indirectly conjugated to a meteorin-β polypeptide. For example, a meteorin-β polypeptide may be conjugated with biotin and any suitable label mentioned above may be conjugated with avidin, or vice versa. Biotin binds selectively to avidin and thus, the label can be conjugated with a meteorin-β polypeptide in this indirect manner. Alternatively, to achieve indirect conjugation of a label with a meteorin-β polypeptide, the meteorin-β polypeptide is conjugated with a small hapten (e.g., digoxin) and one of the types of labels mentioned above is conjugated with an anti-hapten antibody (e.g., anti-digoxin antibody).

In some embodiments, a meteorin-β polypeptide refers to a fragment of a meteorin-β polypeptide. Generally, a meteorin-β fragment contains fewer amino acids than a full-length mature meteorin-β. For example, a meteorin-β fragment may include a portion of the mature human meteorin-β polypeptide (i.e., a portion of amino acids 46-311 of SEQ ID NO: 1), or a portion of the mature mouse meteorin-β polypeptide (i.e. a portion of amino acids 46-311 of SEQ ID NO: 3). Full-length mature human meteorin-β is 266 amino acids in length. Accordingly, fragments of human meteorin-β may be 265 amino acids in length or shorter. Full-length mature mouse meteorin-β is 266 amino acids in length. Accordingly, fragments of mouse meteorin-β may be 265 amino acids in length or shorter.

In some embodiments, a meteorin-β polypeptide refers to a functional fragment of a meteorin-β polypeptide. Methods for assessing the activity of meteorin-β polypeptides and functional fragments of meteorin-β are provided herein. In some embodiments, a functional fragment of meteorin-β is a fragment that exhibits at least 50% of the activity of a full-length mature meteorin-β. For example, a functional fragment of meteorin-β is a fragment that exhibits at least 50%, at least 60%, at least 70%, at least 80%, at least 90%, at least 95%, or more of the activity of a full-length mature meteorin-β.

In some embodiments, a meteorin-β polypeptide is immobilized on a solid support or substrate. In some embodiments, a meteorin-β polypeptide is non-diffusively immobilized on a solid support (e.g., the meteorin-β polypeptide does not detach from the solid support). A solid support or substrate can be any physically separable solid to which a meteorin-β polypeptide can be directly or indirectly attached including, but not limited to, surfaces provided by microarrays and wells, and particles such as beads (e.g., paramagnetic beads, magnetic beads, microbeads, nanobeads), microparticles, and nanoparticles. Solid supports also can include, for example, chips, columns, optical fibers, wipes, filters (e.g., flat surface filters), one or more capillaries, glass and modified or functionalized glass (e.g., controlled-pore glass (CPG)), quartz, mica, diazotized membranes (paper or nylon), polyformaldehyde, cellulose, cellulose acetate, paper, ceramics, metals, metalloids, semiconductor materials, quantum dots, coated beads or particles, other chromatographic materials, magnetic particles; plastics (including acrylics, polystyrene, copolymers of styrene or other materials, polybutylene, polyurethanes, TEFLON™, polyethylene, polypropylene, polyamide, polyester, polyvinylidenedifluoride (PVDF), and the like), polysaccharides, nylon or nitrocellulose, resins, silica or silica-based materials including silicon, silica gel, and modified silicon, Sephadex®, Sepharose®, carbon, metals (e.g., steel, gold, silver, aluminum, silicon and copper), inorganic glasses, conducting polymers (including polymers such as polypyrrole and polyindole); micro or nanostructured surfaces such as nucleic acid tiling arrays, nanotube, nanowire, or nanoparticulate decorated surfaces; or porous surfaces or gels such as methacrylates, acrylamides, sugar polymers, cellulose, silicates, or other fibrous or stranded polymers. In some embodiments, the solid support or substrate may be coated using passive or chemically-derivatized coatings with any number of materials, including polymers, such as dextrans, acrylamides, gelatins or agarose. Beads and/or particles may be free or in connection with one another (e.g., sintered). In some embodiments, a solid support or substrate can be a collection of particles. In some embodiments, the particles can comprise silica, and the silica may comprise silica dioxide. In some embodiments the silica can be porous, and in certain embodiments the silica can be non-porous. In some embodiments, the particles further comprise an agent that confers a paramagnetic property to the particles. In certain embodiments, the agent comprises a metal, and in certain embodiments the agent is a metal oxide, (e.g., iron or iron oxides, where the iron oxide contains a mixture of $Fe^{2+}$ and $Fe^{3+}$). A meteorin-β polypeptide may be linked to a solid support by covalent bonds or by non-covalent interactions and may be linked to a solid support directly or indirectly (e.g., via an intermediary agent such as a spacer molecule or biotin).

Stimulants and Co-Stimulants

Certain methods provided herein include use of a stimulant or co-stimulant. Use of stimulants and co-stimulants may be included, for example, in methods for assessing the activity of a meteorin-β polypeptide, and/or in methods for identifying whether a cell expresses, or is capable of expressing, a meteorin-β receptor. A stimulant may be used in certain instances (e.g., to stimulate a cell prior to exposure to meteorin-β). A co-stimulant may be used in certain instances (e.g., to co-stimulate a cell during meteorin-β exposure). In some embodiments, a cell or population of cells is contacted with a stimulant/co-stimulant. In some embodiments, a cell or population of cells is simultaneously contacted with a stimulant/co-stimulant and a meteorin-β polypeptide. In some embodiments, a cell or population of cells is contacted with a stimulant/co-stimulant prior to being contacted with a meteorin-β polypeptide.

In certain instances, a stimulant/co-stimulant can strengthen or enhance the effect of meteorin-β on a cell or a population of cells. For example, a stimulant/co-stimulant can enhance production of certain cytokines and/or chemokines in response to meteorin-β stimulation. A stimulant/co-stimulant also can upregulate meteorin-β receptor expression. In certain instances, a stimulant/co-stimulant can provide a synergistic enhancement when combined with meteorin-β. For example, a stimulant/co-stimulant can synergistically enhance production of certain cytokines and/or chemokines in response to meteorin-β stimulation. An enhancement afforded by a stimulant or co-stimulant may be additive, multiplicative, or exponential.

Any suitable stimulant/co-stimulant may be used in conjunction with the methods provided herein. In some embodiments, a stimulant/co-stimulant comprises a soluble/secreted protein. In some embodiments, a stimulant/co-stimulant comprises a cytokine. In some embodiments, a stimulant/co-stimulant comprises a chemokine. Non-limiting examples of stimulants/co-stimulants include interferon-γ (IFN-γ), lipopolysaccharides (LPS), granulocyte-macrophage colony-stimulating factor (GM-CSF), interleukin 4 (IL-4), interleukin 13 (IL-13), macrophage colony-stimulating factor (M-CSF), infection (e.g., fungal infection, helminth infection), immune complexes, interleukin-1 receptor (IL-1R), interleukin 10 (IL-10), transforming growth factor beta (TGF-β), glucocorticoids, interleukin 6 (IL-6), leukemia inhibitory factor (LIF), adenosine, complement components, and interleukin 32 (IL-32). In some embodiments, a stimulant/co-stimulant comprises one or more of IFN-γ, IL-4, IL-10, and TGF-β.

IFN-γ

Certain methods provided herein include use of interferon-γ (IFN-γ) as a stimulant or co-stimulant. Interferon-γ (also referred to as IFN-γ, IFNγ, IFN-g, IFNg, IFN-gamma, interferon gamma, immune interferon, type II interferon) is a dimerized soluble cytokine and a type II class of interferon. IFN-γ generally is involved in innate and adaptive immunity against certain viral, bacterial, and protozoal infections. IFN-γ can function as an activator of macrophages and inducer of Class II major histocompatibility complex (MHC) molecule expression. IFN-γ can inhibit viral replication directly, and can provide immunostimulatory and immunomodulatory effects. Aberrant IFN-γ expression often is associated with a number of autoinflammatory and autoimmune diseases. IFN-γ typically is produced by natural killer (NK) and natural killer T (NKT) cells as part of the innate immune response; by CD4 Th1 and CD8 cytotoxic T lymphocyte (CTL) effector T cells once antigen-specific immunity develops; and by non-cytotoxic innate lymphoid cells (ILC).

Any suitable IFN-γ, or functional fragment, or modified version thereof, may be used in conjunction with the methods described herein (e.g., as a co-stimulant with meteorin-β; as a stimulant prior to meteorin-β exposure). In some embodiments, IFN-γ is a human IFN-γ. An example human IFN-γ nucleic acid sequence is provided herein as SEQ ID NO: 6 (GENBANK Accession No. NM_000619.3), and an example human IFN-γ amino acid sequence is provided herein as SEQ ID NO: 5 (GENBANK Accession No. NP_000610.2). In some embodiments, IFN-γ is a mouse IFN-γ. An example mouse IFN-γ nucleic acid sequence is provided herein as SEQ ID NO: 8 (GENBANK Accession No. NM_008337.4), and an example mouse IFN-γ amino acid sequence is provided herein as SEQ ID NO: 7 (GENBANK Accession No. NP_032363.1).

IFN-γ may refer to a precursor IFN-γ polypeptide (includes the signal peptide) or a mature IFN-γ polypeptide (excludes the signal peptide). In some embodiments, IFN-γ is a precursor IFN-γ polypeptide (e.g., a precursor human IFN-γ polypeptide comprising amino acids 1-166 of SEQ ID NO: 5; a precursor human IFN-γ polypeptide comprising amino acids 1-161 of SEQ ID NO: 5; a precursor mouse IFN-γ polypeptide comprising amino acids 1-155 of SEQ ID NO: 7). In some embodiments, an IFN-γ polypeptide is a mature IFN-γ polypeptide (e.g., a mature human IFN-γ polypeptide comprising amino acids 24-166 of SEQ ID NO: 5; a mature human IFN-γ polypeptide comprising amino acids 24-161 of SEQ ID NO: 5; a mature mouse IFN-γ polypeptide comprising amino acids 23-155 of SEQ ID NO: 7).

In some embodiments, IFN-γ is a recombinant IFN-γ polypeptide. A recombinant IFN-γ polypeptide typically is an IFN-γ polypeptide encoded by DNA (i.e., IFN-γ nucleic acid sequence) that has been cloned in a vector or system that supports expression of the DNA and translation of messenger RNA. In some embodiments, IFN-γ is a recombinant human IFN-γ polypeptide (rhIFN-γ). In some embodiments, IFN-γ is a recombinant mouse IFN-γ polypeptide (rmIFN-γ). In some embodiments, IFN-γ is a commercially available recombinant human IFN-γ (e.g., BioLegend cat #570202). In some embodiments, IFN-γ is a commercially available recombinant mouse IFN-γ (e.g., BioLegend cat #575302).

IFN-γ may refer to an unmodified IFN-γ polypeptide, a modified IFN-γ polypeptide, an IFN-γ variant, an IFN-γ mutant; or a fragment thereof or a functional fragment thereof. Unmodified polypeptides, modified polypeptides, mutants, variants, and fragments are described herein. In some embodiments, IFN-γ refers to a polypeptide comprising an amino acid sequence that is at least about 75% identical to SEQ ID NO: 5 or SEQ ID NO: 7. For example, IFN-γ may refer to a polypeptide comprising an amino acid sequence that is at least about 75%, 80%, 85%, 90%, 91%, 92%, 93%, 94%, 95%, 96%, 97%, 98%, or 99% identical to SEQ ID NO: 5 or SEQ ID NO: 7.

In some embodiments, IFN-γ refers to a fragment of an IFN-γ polypeptide. Generally, an IFN-γ fragment contains fewer amino acids than a full-length mature IFN-γ. For example, an IFN-γ fragment may include a portion of the mature human IFN-γ polypeptide (e.g., a portion of amino acids 24-166 of SEQ ID NO: 5; a portion of amino acids 24-161 of SEQ ID NO: 5), or a portion of the mature mouse IFN-γ polypeptide (i.e. a portion of amino acids 23-155 of SEQ ID NO: 7). One example full-length mature human IFN-γ is 143 amino acids in length. Accordingly, fragments of human IFN-γ may be 142 amino acids in length or shorter. Another example full-length mature human IFN-γ is 138 amino acids in length. Accordingly, fragments of human IFN-γ may be 137 amino acids in length or shorter. Full-length mature mouse IFN-γ is 133 amino acids in length. Accordingly, fragments of mouse IFN-γ may be 132 amino acids in length or shorter.

In some embodiments, IFN-γ refers to a functional fragment of an IFN-γ polypeptide. Any suitable method for assessing the activity of IFN-γ and functional fragments of IFN-γ may be used to determine whether an IFN-γ fragment is a functional fragment. For example, one assay for assessing IFN-γ activity is the induction of an antiviral state in target cells, sometimes referred to as a cytopathic protection effect (CPE) assay. An example CPE assay uses A549 human lung carcinoma cells challenged with encephalomyocarditis virus (EMCV) and the effects are compared to a standard for human IFN-γ (e.g., Gxg01-902-535, BEI Resources). In some embodiments, a functional fragment of IFN-γ is a fragment that exhibits at least 50% of the activity of an IFN-γ standard or a full-length mature IFN-γ. For example, a functional fragment of IFN-γ is a fragment that exhibits at least 50%, at least 60%, at least 70%, at least 80%, at least 90%, at least 95%, or more of the activity of an IFN-γ standard or a full-length mature IFN-γ.

IL-4

Certain methods provided herein include use of interleukin 4 (IL-4) as a stimulant or co-stimulant. Interleukin 4 (also referred to as IL-4, B cell growth factor 1 (BCGF-1), B-cell stimulatory factor 1 (BSF-1), interleukin-4, lymphocyte stimulatory factor 1, MGC79402) is the primary cytokine implicated in the development of Th2-mediated responses, which is associated with allergy and asthma. The Type I receptor comprises IL-4Rα and the common gamma-chain (γc), which is also shared by the cytokines IL-2, -7, -9, -15 and -21 and is present in hematopoietic cells. IL-4 can use the type II complex, comprising IL-4Rα and IL-13Rα1, which is present in non-hematopoietic cells. This second receptor complex is a functional receptor for IL-13, which shares approximately 25% homology with IL-4. The type I receptor complex can be formed only by IL-4 and is active in Th2 development. In contrast, the type II receptor complex formed by either IL-4 or IL-13 is more active during airway hypersensitivity and mucus secretion and is not found in T cells.

Any suitable IL-4, or functional fragment, or modified version thereof, may be used in conjunction with the methods described herein (e.g., as a co-stimulant with meteorin-β; as a stimulant prior to meteorin-β exposure). In some embodiments, IL-4 is a human IL-4. An example human IL-4 nucleic acid sequence is provided herein as SEQ ID NO: 12 (full mRNA sequence provided as GENBANK Accession No. NM_000589), and an example human IL-4 amino acid sequence is provided herein as SEQ ID NO: 11 (GENBANK Accession No. NP_000580.1). In some embodiments, IL-4 is a mouse IL-4. An example mouse IL-4 nucleic acid sequence is provided herein as SEQ ID NO: 14

(full mRNA sequence provided as GENBANK Accession No. NM_021283), and an example mouse IL-4 amino acid sequence is provided herein as SEQ ID NO: 13 (GENBANK Accession No. NP_067258.1).

IL-4 may refer to a precursor IL-4 polypeptide (includes the signal peptide) or a mature IL-4 polypeptide (excludes the signal peptide). In some embodiments, IL-4 is a precursor IL-4 polypeptide (e.g., a precursor human IL-4 polypeptide comprising amino acids 1-153 of SEQ ID NO: 11; a precursor mouse IL-4 polypeptide comprising amino acids 1-140 of SEQ ID NO: 13). In some embodiments, an IL-4 polypeptide is a mature IL-4 polypeptide (e.g., a mature human IL-4 polypeptide comprising amino acids 25-153 of SEQ ID NO: 11; a mature mouse IL-4 polypeptide comprising amino acids 21-140 of SEQ ID NO: 13; a mature mouse IL-4 polypeptide comprising amino acids 23-140 of SEQ ID NO: 13).

In some embodiments, IL-4 is a recombinant IL-4 polypeptide. A recombinant IL-4 polypeptide typically is an IL-4 polypeptide encoded by DNA (i.e., IL-4 nucleic acid sequence) that has been cloned in a vector or system that supports expression of the DNA and translation of messenger RNA. In some embodiments, IL-4 is a recombinant human IL-4 polypeptide (rhIL-4). In some embodiments, IL-4 is a recombinant mouse IL-4 polypeptide (rmIL-4). In some embodiments, IL-4 is a commercially available recombinant human IL-4 (e.g., BioLegend cat #574002). In some embodiments, IL-4 is a commercially available recombinant mouse IL-4 (e.g., BioLegend cat #574302).

IL-4 may refer to an unmodified IL-4 polypeptide, a modified IL-4 polypeptide, an IL-4 variant, an IL-4 mutant; or a fragment thereof or a functional fragment thereof. Unmodified polypeptides, modified polypeptides, mutants, variants, and fragments are described herein. In some embodiments, IL-4 refers to a polypeptide comprising an amino acid sequence that is at least about 75% identical to SEQ ID NO: 11 or SEQ ID NO: 13. For example, IL-4 may refer to a polypeptide comprising an amino acid sequence that is at least about 75%, 80%, 85%, 90%, 91%, 92%, 93%, 94%, 95%, 96%, 97%, 98%, or 99% identical to SEQ ID NO: 11 or SEQ ID NO: 13.

In some embodiments, IL-4 refers to a fragment of an IL-4 polypeptide. Generally, an IL-4 fragment contains fewer amino acids than a full-length mature IL-4. For example, an IL-4 fragment may include a portion of the mature human IL-4 polypeptide (i.e., a portion of amino acids 25-153 of SEQ ID NO: 11), or a portion of the mature mouse IL-4 polypeptide (i.e. a portion of amino acids 21-140 of SEQ ID NO: 13). An example full-length mature human IL-4 is 129 amino acids in length. Accordingly, fragments of human IL-4 may be 128 amino acids in length or shorter. An example full-length mature mouse IL-4 is 120 amino acids in length. Accordingly, fragments of mouse IL-4 may be 119 amino acids in length or shorter. Another example full-length mature mouse IL-4 is 118 amino acids in length. Accordingly, fragments of mouse IL-4 may be 117 amino acids in length or shorter.

In some embodiments, IL-4 refers to a functional fragment of an IL-4 polypeptide. Any suitable method for assessing the activity of IL-4 and functional fragments of IL-4 may be used to determine whether an IL-4 fragment is a functional fragment. For example, one assay for assessing IL-4 activity is a cell proliferation assay. An example cell proliferation assay measures $ED_{50}$ of IL-4 according to dose-dependent stimulation of TF-1 cell proliferation. Another example cell proliferation assay measures $ED_{50}$ of IL-4 according to dose-dependent stimulation of CTLL-2 cell proliferation. In some embodiments, a functional fragment of IL-4 is a fragment that exhibits at least 50% of the activity of an IL-4 standard (e.g., WHO International Standard for Human IL-4 (NIBSC code: 88/656)) or a full-length mature IL-4. For example, a functional fragment of IL-4 is a fragment that exhibits at least 50%, at least 60%, at least 70%, at least 80%, at least 90%, at least 95%, or more of the activity of an IL-4 standard or a full-length mature IL-4.

IL-10

Certain methods provided herein include use of interleukin 10 (IL-10) as a stimulant or co-stimulant. Interleukin 10 (also referred to as IL-10, B-TCGF, CSIF, TGIF) was first described as a cytokine that is produced by T helper 2 (Th2) cell clones. It inhibits interferon (IFN)-γ synthesis in Th1 cells, and therefore it was initially called cytokine synthesis inhibiting factor (CSIF). Macrophages are the main source of IL-10 and its secretion can be stimulated by endotoxin (via Toll-like receptor 4, NF-κB dependent), tumor necrosis factor TNF-α (via TNF receptor p55, NF-κB-dependent), catecholamines, and IL-1. IL-10 controls inflammatory processes by suppressing the expression of proinflammatory cytokines, chemokines, adhesion molecules, as well as antigen-presenting and costimulatory molecules in monocytes/macrophages, neutrophils, and T cells. IL-10 inhibits the production of proinflammatory mediators by monocytes and macrophages such as endotoxin- and IFN-γ-induced release of IL-1α, IL-6, IL-8, G-CSF, GM-CSF, and TNF-α. In addition, it enhances the production of anti-inflammatory mediators such as IL-1RA and soluble TNFα receptors. IL-10 inhibits the capacity of monocytes and macrophages to present antigen to T cells. This is realized by down-regulation of constitutive and IFNγ-induced cell surface levels of MHC class II, of costimulatory molecules such as CD86 and of some adhesion molecules such as CD58.

Any suitable IL-10, or functional fragment, or modified version thereof, may be used in conjunction with the methods described herein (e.g., as a co-stimulant with meteorin-β; as a stimulant prior to meteorin-β exposure). In some embodiments, IL-10 is a human IL-10. An example human IL-10 nucleic acid sequence is provided herein as SEQ ID NO: 16 (full mRNA sequence provided as GENBANK Accession No. NM_000572), and an example human IL-10 amino acid sequence is provided herein as SEQ ID NO: 15 (GENBANK Accession No. NP_000563.1). In some embodiments, IL-10 is a mouse IL-10. An example mouse IL-10 nucleic acid sequence is provided herein as SEQ ID NO: 18 (full mRNA sequence provided as GENBANK Accession No. NM_010548), and an example mouse IL-10 amino acid sequence is provided herein as SEQ ID NO: 17 (GENBANK Accession No. NP_034678.1).

IL-10 may refer to a precursor IL-10 polypeptide (includes the signal peptide) or a mature IL-10 polypeptide (excludes the signal peptide). In some embodiments, IL-10 is a precursor IL-10 polypeptide (e.g., a precursor human IL-10 polypeptide comprising amino acids 1-178 of SEQ ID NO: 15; a precursor mouse IL-10 polypeptide comprising amino acids 1-178 of SEQ ID NO: 17). In some embodiments, an IL-10 polypeptide is a mature IL-10 polypeptide (e.g., a mature human IL-10 polypeptide comprising amino acids 19-178 of SEQ ID NO: 15; a mature mouse IL-10 polypeptide comprising amino acids 19-178 of SEQ ID NO: 17).

In some embodiments, IL-10 is a recombinant IL-10 polypeptide. A recombinant IL-10 polypeptide typically is an IL-10 polypeptide encoded by DNA (i.e., IL-10 nucleic acid sequence) that has been cloned in a vector or system that supports expression of the DNA and translation of messenger RNA. In some embodiments, IL-10 is a recombinant human IL-10 polypeptide (rhIL-10). In some embodiments, IL-10 is a recombinant mouse IL-10 polypeptide (rmIL-10). In some embodiments, IL-10 is a commercially available recombinant human IL-10 (e.g., BioLegend cat #715602; BioLegend cat #571002). In some embodiments, IL-10 is a commercially available recombinant mouse IL-10 (e.g., BioLegend cat #575802).

IL-10 may refer to an unmodified IL-10 polypeptide, a modified IL-10 polypeptide, an IL-10 variant, an IL-10 mutant; or a fragment thereof or a functional fragment thereof. Unmodified polypeptides, modified polypeptides, mutants, variants, and fragments are described herein. In some embodiments, IL-10 refers to a polypeptide comprising an amino acid sequence that is at least about 75% identical to SEQ ID NO: 15 or SEQ ID NO: 17. For example, IL-10 may refer to a polypeptide comprising an amino acid sequence that is at least about 75%, 80%, 85%, 90%, 91%, 92%, 93%, 94%, 95%, 96%, 97%, 98%, or 99% identical to SEQ ID NO: 15 or SEQ ID NO: 17.

In some embodiments, IL-10 refers to a fragment of an IL-10 polypeptide. Generally, an IL-10 fragment contains fewer amino acids than a full-length mature IL-10. For example, an IL-10 fragment may include a portion of the mature human IL-10 polypeptide (i.e., a portion of amino acids 19-178 of SEQ ID NO: 15), or a portion of the mature mouse IL-10 polypeptide (i.e. a portion of amino acids 19-178 of SEQ ID NO: 17). An example full-length mature human IL-10 is 160 amino acids in length. Accordingly, fragments of human IL-10 may be 159 amino acids in length or shorter. An example full-length mature mouse IL-10 is 160 amino acids in length. Accordingly, fragments of mouse IL-10 may be 159 amino acids in length or shorter.

In some embodiments, IL-10 refers to a functional fragment of an IL-10 polypeptide. Any suitable method for assessing the activity of IL-10 and functional fragments of IL-10 may be used to determine whether an IL-10 fragment is a functional fragment. For example, one assay for assessing IL-10 activity is an IFN-γ inhibition assay. An example IFN-γ inhibition assay measures the extent to which IL-10 inhibits the induction of INF-γ in PHA activated human PBMC. Another assay for assessing IL-10 activity involves dose dependent stimulation MC/9 cell proliferation. In some embodiments, a functional fragment of IL-10 is a fragment that exhibits at least 50% of the activity of an IL-10 standard or a full-length mature IL-10. For example, a functional fragment of IL-10 is a fragment that exhibits at least 50%, at least 60%, at least 70%, at least 80%, at least 90%, at least 95%, or more of the activity of an IL-10 standard or a full-length mature IL-10.

TGF-β

Certain methods provided herein include use of transforming growth factor beta (TGF-β) as a stimulant or co-stimulant. Transforming growth factor beta (also referred to as TGF-β, TGF-β1, TGFB, DPD1, transforming growth factor, Transforming Growth Factor Beta 1, TGF-Beta-1) is synthesized in cells as a 390-amino acid polypeptide. Furin cleaves the protein at residue 278, yielding an N-terminal cleavage product which corresponds to the latency-associated peptide (LAP), and the 25-kD C-terminal portion of the precursor constitutes the mature TGF-β1. TGF-β activators can release TGF-β from LAP. These activators include proteases that degrade LAP, thrombospondin-1, reactive oxygen species, and integrins avb6 and avb8. Mouse TGF-β converts naïve T cells into regulatory T (Treg) cells that prevent autoimmunity. Although human TGF-β1 is widely used for inducing FOXP3+ in vitro, it might not be an essential factor for human Treg differentiation. Th17 murine can be induced from naïve CD4+ T cells by the combination of TGF-β1 and IL-6 or IL-21. Nevertheless, the regulation of human Th17 differentiation is distinct. TGF-β1 seems to have dual effects on human Th17 differentiation in a dose-dependent manner. While TGF-β1 is required for the expression of RORγt, in human naïve CD4+ T cells from cord blood, TGF-β1 can inhibit the function of RORγt at high doses. By using serum-free medium, it has been clarified that the optimum conditions for human Th17 differentiation are TGF-β1, IL-13, and IL-2 in combination with IL-6, IL-21 or IL-23.

Any suitable TGF-β, or functional fragment, or modified version thereof, may be used in conjunction with the methods described herein (e.g., as a co-stimulant with meteorin-β; as a stimulant prior to meteorin-β exposure). In some embodiments, TGF-β is a human TGF-β. An example human TGF-β nucleic acid sequence is provided herein as SEQ ID NO: 20 (full mRNA sequence provided as GENBANK Accession No. NM_000660.7), and an example human TGF-β amino acid sequence is provided herein as SEQ ID NO: 19 (GENBANK Accession No. NP_000651.3). Another example human TGF-β nucleic acid sequence is provided as GENBANK Accession No. BC000125.1, and another example human TGF-β amino acid sequence is provided GENBANK Accession No. P01137. In some embodiments, TGF-β is a mouse TGF-β. An example mouse TGF-β nucleic acid sequence is provided herein as SEQ ID NO: 22 (full mRNA sequence provided as GENBANK Accession No. NM_011577.2), and an example mouse TGF-β amino acid sequence is provided herein as SEQ ID NO: 21 (GENBANK Accession No. NP_035707).

TGF-β may refer to a precursor TGF-β polypeptide (includes the signal peptide) or a mature TGF-β polypeptide (excludes the signal peptide; or excludes the signal peptide and the latency-associated peptide). In some embodiments, TGF-β is a precursor TGF-β polypeptide (e.g., a precursor human TGF-β polypeptide comprising amino acids 1-390 of SEQ ID NO: 19; a precursor mouse TGF-β polypeptide comprising amino acids 1-390 of SEQ ID NO: 21). In some embodiments, a TGF-β polypeptide is a mature TGF-β polypeptide (e.g., a mature human TGF-β polypeptide comprising amino acids 30-390 of SEQ ID NO: 19; a mature human TGF-β polypeptide comprising amino acids 279-390 of SEQ ID NO: 19; a mature mouse TGF-β polypeptide comprising amino acids 29-390 of SEQ ID NO: 21; a mature mouse TGF-β polypeptide comprising amino acids 279-390 of SEQ ID NO: 21).

In some embodiments, TGF-β is a recombinant TGF-β polypeptide. A recombinant TGF-β polypeptide typically is a TGF-β polypeptide encoded by DNA (i.e., TGF-β nucleic acid sequence) that has been cloned in a vector or system that supports expression of the DNA and translation of messenger RNA. In some embodiments, TGF-β is a recombinant human TGF-β polypeptide (rhTGF-β). In some embodiments, TGF-β is a recombinant mouse TGF-β polypeptide (rmTGF-β). In some embodiments, TGF-β is a commercially available recombinant human TGF-β (e.g., BioLegend cat #580704; BioLegend cat #781802). In some embodiments, TGF-β is a commercially available recombinant mouse TGF-β (e.g., BioLegend cat #763102).

TGF-β may refer to an unmodified TGF-β polypeptide, a modified TGF-β polypeptide, a TGF-β variant, a TGF-β mutant; or a fragment thereof or a functional fragment thereof. Unmodified polypeptides, modified polypeptides, mutants, variants, and fragments are described herein. In some embodiments, TGF-β refers to a polypeptide comprising an amino acid sequence that is at least about 75% identical to SEQ ID NO: 19 or SEQ ID NO: 21. For example, TGF-β may refer to a polypeptide comprising an amino acid sequence that is at least about 75%, 80%, 85%, 90%, 91%, 92%, 93%, 94%, 95%, 96%, 97%, 98%, or 99% identical to SEQ ID NO: 19 or SEQ ID NO: 21.

In some embodiments, TGF-β refers to a fragment of a TGF-β polypeptide. Generally, a TGF-β fragment contains fewer amino acids than a full-length mature TGF-β. For example, a TGF-β fragment may include a portion of the mature human TGF-β polypeptide (e.g., a portion of amino acids 30-390 of SEQ ID NO: 19; a portion of amino acids 279-390 of SEQ ID NO: 19), or a portion of the mature mouse TGF-β polypeptide (e.g., a portion of amino acids 29-390 of SEQ ID NO: 21; a portion of amino acids 279-390 of SEQ ID NO: 21). An example full-length mature human TGF-β is 112 amino acids in length. Accordingly, fragments of human TGF-β may be 111 amino acids in length or shorter. An example full-length mature mouse TGF-β is 112 amino acids in length. Accordingly, fragments of mouse TGF-β may be 111 amino acids in length or shorter.

In some embodiments, TGF-β refers to a functional fragment of a TGF-β polypeptide. Any suitable method for assessing the activity of TGF-β and functional fragments of TGF-β may be used to determine whether a TGF-β fragment is a functional fragment. For example, one assay for assessing TGF-β activity is a cell proliferation inhibition assay. An example cell proliferation inhibition assay measures the extent to which TGF-β inhibits the proliferation of mouse HT-2 cells induced by recombinant mouse IL-4. In some embodiments, a functional fragment of TGF-β is a fragment that exhibits at least 50% of the activity of a TGF-β standard or a full-length mature TGF-β. For example, a functional fragment of TGF-β is a fragment that exhibits at least 50%, at least 60%, at least 70%, at least 80%, at least 90%, at least 95%, or more of the activity of a TGF-β standard or a full-length mature TGF-β.

Cells

Certain methods described herein include stimulating a cell or population of cells (e.g., with meteorin-β; with a stimulant; with meteorin-β+a co-stimulant). Cells may be obtained from a subject and/or a cellular source, or may be obtained as an established cell line. A cellular source may include a population of embryonic stem (ES) cells, induced pluripotent stem cells (iPSCs), and the like. Cells may be isolated from an embryo or a stem cell culture derived from an embryo. Cells may be isolated from an induced pluripotent stem cell (iPSC) culture. Cells may be obtained from a subject in a variety of manners (e.g., harvested from living tissue, such as a biopsy, plucked hair follicles, body fluids like urine or body-cavity fluids, or isolated from circulation). A subject may include any animal, including but not limited to any mammal, such as mouse, rat, canine, feline, bovine, equine, porcine, non-human primate and human. In certain embodiments, a subject is a human. In some embodiments, a subject is an animal or human that has gestated longer than an embryo in a uterine environment and often is a post-natal human or a post-natal animal (e.g., neonatal human, neonatal animal, adult human or adult animal). A subject sometimes is a juvenile animal, juvenile human, adult animal or adult human.

In some embodiments, cells are isolated from a sample from a subject. An isolated cell refers to a cell that has been separated from a component of its original environment (e.g., separated from a host and/or purified from a sample), and thus is altered by human intervention (e.g., "by the hand of man") from its original environment. A sample can include any specimen that is isolated or obtained from a subject or part thereof. Non-limiting examples of specimens include fluid or tissue from a subject, including, without limitation, blood or a blood product (e.g., serum, plasma, or the like), umbilical cord blood, bone marrow, chorionic villi, amniotic fluid, cerebrospinal fluid, spinal fluid, lavage fluid (e.g., bronchoalveolar, gastric, peritoneal, ductal, ear, arthroscopic), biopsy sample or tissue biopsy, buccal swab, celocentesis sample, washings of female reproductive tract, urine, feces, sputum, saliva, nasal mucous, prostate fluid, lavage, semen, lymphatic fluid, bile, tears, sweat, breast milk, breast fluid, hard tissues (e.g., liver, spleen, kidney, lung, or ovary), the like or combinations thereof. The term blood encompasses whole blood, blood product or any fraction of blood, such as serum, plasma, buffy coat, or the like as conventionally defined. Blood plasma refers to the fraction of whole blood resulting from centrifugation of blood treated with anticoagulants. Blood serum refers to the watery portion of fluid remaining after a blood sample has coagulated.

In some embodiments, cells comprise normal, healthy cells (e.g., cells that are not diseased). In some embodiments, cells comprise cells that are genetically altered. In some embodiments, cells comprise cells that are not genetically altered. In some embodiments, cells comprise diseased cells. Diseased cells may include cells from a subject carrying disease-causing mutation(s). Diseased cells may include cells from abnormal tissue, such as from a neoplasia, a hyperplasia, a malignant tumor or a benign tumor. In certain embodiments, diseased cells include cells that are not tumor cells. In certain embodiments, diseased cells may include cells isolated from circulation (e.g., circulating tumor cells (CTCs)) of a subject. In certain embodiments, diseased cells may include cells isolated from bodily samples such as, for example, urine, semen, stool (feces), and the like.

In some embodiments, cells comprise primary cells. Primary cells generally are taken directly from living tissue, such as a biopsy, plucked hair follicles, bodily samples such as a stool sample, body fluids like urine, semen or body-cavity fluids, or isolated from circulation. In certain instances, primary cells have not been passaged. In certain instances, primary cells have been passaged one time. Primary cells may be isolated from differentiated tissue. Typically, primary cells have been freshly isolated, for example, through tissue digestion and plated. Primary cells may or may not be frozen and then thawed at a later time. In addition, the tissue from which the primary cells are isolated may or may not have been frozen of preserved in some other manner immediately prior to processing. Typically, cells are no longer primary cells after the cells have been passaged more than once. Cells passaged once or more and immediately frozen after passaging are also not considered as primary cells when thawed. In certain embodiments, cells are initially primary cells and become non-primary cells after passaging. In some embodiments, cells are maintained or proliferated in cell culture after the cells are isolated from differentiated tissue and prior to use in methods described herein.

In some embodiments, cells comprise non-primary cells, such as cells from an established cell line, transformed cells, thawed cells from a previously frozen collection, and the like. Any suitable cell line may be used in conjunction with the methods described herein. Examples of established cell lines include, for example, THP-1 (acute myeloid leukemia), DU145 (prostate cancer), H295R (adrenocortical cancer), HeLa (cervical cancer), KBM-7 (chronic myelogenous leukemia), LNCaP (prostate cancer), MCF-7 (breast cancer), MDA-MB-468 (breast cancer), PC3 (prostate cancer), SaOS-2 (bone cancer), SH-SY5Y (neuroblastoma, cloned from a myeloma), T-47D (breast cancer), U87 (glioblastoma), Vero (African green monkey Chlorocebus kidney epithelial cell line), MC3T3 (embryonic calvarium), GH3 (pituitary tumor), PC12 (pheochromocytoma), CHO (Chinese hamster ovary), MDCK (kidney epithelial), A6 (kidney epithelial), and AB9. In some embodiments, cells comprise THP-1 cells.

In some embodiments, cells comprise immune cells. Immune cells may include, for example, lymphocytes, leukocytes, agranulocytes, monocytes, macrophages, B cells, dendritic cells, granulocytes, neutrophils, innate lymphoid cells (ILC), megakaryocytes, myeloid-derived suppressor cells (MDSC), natural killer cells (NK cells), platelets, red blood cells (RBC), T cells, mast cells, eosinophils, basophils, and thymocytes. In some embodiments, cells comprise, or are derived from, peripheral blood mononuclear cells (PBMCs) which may include, for example, T cells, B cells, natural killer cells, and monocytes.

In some embodiments, cells comprise monocytes. Monocytes are a type of leukocyte, or white blood cell, and can differentiate into macrophages and myeloid lineage dendritic cells. Monocytes are a part of the vertebrate innate immune system and can influence the process of adaptive immunity. There are at least three subclasses of monocytes in human blood, which may be characterized according to certain markers. For example, the classical monocyte is characterized by high level expression of the CD14 cell surface receptor (CD14++CD16-monocyte); the non-classical monocyte shows low level expression of CD14 and additional co-expression of the CD16 receptor (CD14+ CD16++ monocyte); and the intermediate monocyte is characterized by high level expression of CD14 and low level expression of CD16 (CD14++CD16+ monocytes).

In some embodiments, cells comprise macrophages. Macrophages are a type of white blood cell that engulfs and digests foreign proteins and other substances, cellular debris, microbes, and cancer cells. Macrophages may be referred to as phagocytes, histiocytes, Kupffer cells, alveolar macrophages, or microglia, and may be found in nearly all body tissues. Macrophages are involved in nonspecific defense (innate immunity) and can help initiate specific defense mechanisms (adaptive immunity) by recruiting other immune cells such as lymphocytes. Macrophages also have an anti-inflammatory role and can decrease immune reactions through the release of cytokines. Macrophages that encourage inflammation are often referred to as M1 macrophages, and macrophages that decrease inflammation and encourage tissue repair are often referred to as M2 macrophages. Macrophages are produced by the differentiation of monocytes. Macrophages may be identified by their specific expression of proteins such as CD14, CD40, CD11b, CD64, F4/80, EMR1, lysozyme M, MAC-1/MAC-3 and CD68 using flow cytometry and/or immunohistochemical staining. Dysfunctional macrophages may cause diseases such as chronic granulomatous disease that results in frequent infections.

In some embodiments, cells comprise non-immune cells. Non-immune cells may include, for example, epithelial cells (e.g., cells lining body cavities), cells derived from the central nervous system (e.g., nerve cells, neurons, neuroglial cells), stromal cells (e.g., connective tissue cells, fibroblasts, pericytes), stem cells (e.g., embryonic stem cells, adult stem cells), muscle cells (e.g., skeletal, cardiac, smooth), cartilage cells (e.g., chondrocytes), bone cells (e.g., osteoblasts, osteoclasts, osteocytes, lining cells), skin cells (e.g., keratinocytes, melanocytes, merkel cells, langerhans cells), endothelial cells (e.g., cells lining blood vessels), fat cells (e.g., white adipocytes, brown adipocytes), and sex cells (spermatozoa, ova).

In some embodiments, cells comprise epithelial cells. An epithelial cell, or epithelium, typically refers to a cell or cells that line hollow organs, as well as those that make up glands and the outer surface of the body. Epithelial cells can comprise squamous epithelial cells, columnar epithelial cells, adenomatous epithelial cells or transitional epithelial cells. Epithelial cells can be arranged in single layers or can be arranged in multiple layers, depending on the organ and location, and may comprise keratinocyte (KE) epithelial cells or non-keratinocyte (NKE) epithelial cells.

Keratinocytes form the squamous epithelium that is found at anatomic sites such as the skin, ocular surface, oral mucosa, esophagus and cervix. Keratinocytes terminally differentiate into flat, highly keratinized, non-viable cells that help protect against the environment and infection by forming a protective barrier. Examples of keratinocyte epithelial cells include, but are not limited to, dermal keratinocyte, ocular epithelial cells, corneal epithelial cells, oral mucosal epithelial cells, esophagus epithelial cells, and cervix epithelial cells.

Non-keratinocyte (NKE) epithelial cells form the epithelium of the body such as found in the breast, prostate, liver, respiratory tract, retina and gastrointestinal tract. NKE cells typically differentiate into functional, viable cells which function, for example, in absorption and/or secretion. These cells typically do not form highly keratinized structures characteristic of squamous epithelial cells. Examples of NKE cells include, but are not limited to, prostate cells, mammary cells, hepatocytes, liver epithelial cells, biliary epithelial cells, gall bladder cells, pancreatic islet cells, pancreatic beta cells, pancreatic ductal epithelial cells, pulmonary epithelial cells, airway epithelial cells, nasal epithelial cells, kidney cells, bladder cells, urethral epithelial cells, stomach epithelial cells, large intestinal epithelial cells, small intestinal epithelial cells, testicular epithelial cells, ovarian epithelial cells, fallopian tube epithelial cells, thyroid cells, parathyroid cells, adrenal cells, thymus cells, pituitary cells, glandular cells, amniotic epithelial cells, retinal pigmented epithelial cells, sweat gland epithelial cells, sebaceous epithelial cells and hair follicle cells.

Cytokine and Chemokine Production

Certain methods described herein include measuring production of one or more cytokines and/or chemokines. Cytokines generally refer to small proteins (generally about 5-20 kDa) that are involved in cell signaling, and a release of cytokines can have an effect on the behavior of cells nearby. Cytokines are often considered as immunomodulating agents and may be involved in autocrine signaling, paracrine signaling and endocrine signaling. Cytokines may include chemokines, interferons, interleukins, lymphokines, monokines, colony stimulating factors, and tumor necrosis factors. Cytokines may be produced by immune cells (e.g., monocytes, macrophages, B lymphocytes, T lymphocytes, and mast cells), endothelial cells, fibroblasts, and stromal cells.

In some embodiments, a method herein comprises measuring production by a cell of one or more cytokines. In some embodiments, a method herein comprises measuring production by a cell of one or more interleukins. In some embodiments, a method herein comprises measuring production by a cell of one or more IL-6 family cytokines. In some embodiments, a method herein comprises measuring production by a cell of one or more IL-1 family cytokines. A method herein may include measuring production of one or more cytokines provided in Table 1 below. Also provided in Table 1 are corresponding human genes and human receptors, however, cytokines, genes and receptors listed in Table 1 are not limited to human cytokines, genes and receptors. In some embodiments, a method herein comprises measuring production by a cell of a cytokine that binds to one or more receptors provided in Table 1.

TABLE 1

Examples of cytokines

| Cytokine | Human gene | Human receptor(s) |
|---|---|---|
| IL-6 family | | |
| IL-6 | Interleukin 6 | IL6R (CD126), GP130, sIL6R |
| IL-11 | Interleukin 11 | IL11R |
| Oncostatin M | Oncostatin M | LIPR/IL6ST/OSMR |
| Ciliary neurotrophic factor | Ciliary Neurotrophic Factor | CNTFR |
| NNT-1/BSF-3/CLC | Novel Neurotrophin-1/B-Cell Stimulating Factor-3 Cardiotrophin-Like Cytokine Factor 1 | CNTFR |
| Cardiotrophin-1 | Cardiotrophin 1 | GP130/LIFR |
| Leukemia inhibitory factor | Leukemia inhibitory factor | GP130/LIFR |
| IL-27 | Interleukin 27 | IL27RA/GP130 |
| IL-31 | Interleukin 31 | IL31RA/OSMR |
| IL-1 family | | |
| IL-1RA | Interleukin 1 Receptor Antagonist | IL1R |
| IL-1α | Interleukin 1 Alpha | IL1R |
| IL-1β | Interleukin 1 Beta | |
| IL-18 | Interleukin 18 | IL18RA/IL18RB |
| IL-33 | Interleukin 33 | ST2/IL-1 R4/IL-1 RAcP |
| IL-36α | Interleukin 36 alpha | IL-1 Rrp2/IL-1 RAcP |
| IL-36β | Interleukin 36 beta | IL-1 Rrp2/IL-1 RAcP |
| IL-36γ | Interleukin 36 gamma | IL-1 Rrp2/IL-1 RAcP |
| IL-36Ra | Interleukin 36 Receptor Antagonist | IL-1 Rrp2/IL-1 RAcP |
| IL-37 | Interleukin 37 | IL18RA |
| IL-38 | Interleukin 38 | IL-1 RI/IL1 Rrp2 |
| IL-10 family | | |
| IL-10 | Interleukin 10 | IL-10 R1/IL-10 R2 |
| IL-19 | Interleukin 19 | IL20RA |
| IL-20 | Interleukin 20 | IL20RA/IL20RB |
| IL-22 | Interleukin 22 | IL22RA2/IL22RA1 |
| IL-24 | Interleukin 24 | IL-20R1, IL-20R2, IL-22R1, IL-20R2 |
| IL-26 | Interleukin 26 | IL20RA/IL-10 R2 |
| IL-4 unique member | | |
| IL-4 | Interleukin 4 | IL-4RA/IL-2RG |
| TGF-β Family | | |
| TGF-β1 | transforming growth factor beta 1 | TGFBR2, TGFBR1, TGFBR3 |
| TGF-β2 | transforming growth factor beta 2 | TGFBR2, TGFBR1, TGFBR3 |
| TGF-β3 | transforming growth factor beta 3 | TGFBR2, TGFBR1, TGFBR3 |
| GDF-11 | growth differentiation factor 11 | ALK4, TGFBR1, ACVR1C |
| GDF-8 | growth differentiation factor 8/Myostatin | ACVR2B/ACVR2A |
| IFN Family | | |
| IFN type I | | |
| IFN-α | Interferon alpha | IFNAR1/IFNAR2 |
| IFN-β | Interferon beta | IFNAR1/IFNAR2 |

TABLE 1-continued

Examples of cytokines

| Cytokine | Human gene | Human receptor(s) |
|---|---|---|
| IFN-ε | Interferon epsilon | IFNAR1/IFNAR2 |
| IFN-κ | Interferon kappa | IFNAR1/IFNAR2 |
| IFN-ω | Interferon omega | IFNAR1/IFNAR2 |
| IFN type II | | |
| IFN-γ | Interferon gamma | IFNGR1/IFNGR2 |
| IFN type III | | |
| IFN-λ1 or IL-29 | Interferon lambda 1 or Interleukin 29 | IL-10 R2/IL-28R1 |
| IFN-λ2 or IL-28A | Interferon lambda 2 | IL-10 R2/IL-28R1 |
| IFN-λ3 or IL-28B | Interferon lambda 3 | IL-10 R2/IL-28R1 |

Chemokines generally refer to a sub-family of cytokines (signaling proteins secreted by cells). Chemokines can induce directed chemotaxis in nearby responsive cells, and may be referred to as chemotactic cytokines. Chemokines are small (generally about 8-10 kDa) and typically have four cysteine residues in conserved locations for forming their 3-dimensional shape. Certain chemokines are pro-inflammatory and can be induced during an immune response to recruit cells of the immune system to a site of infection, and certain chemokines are homeostatic and are involved in controlling the migration of cells during normal processes of tissue maintenance or development. Chemokines may be classified into subfamilies (i.e., C, CX3C, CC and CXC), and exert their biological effects by interacting with G protein-linked transmembrane receptors (chemokine receptors), that are found on the surface of target cells.

In some embodiments, a method herein comprises measuring production by a cell of one or more chemokines. In some embodiments, a method herein comprises measuring production by a cell of one or more C-family chemokines. In some embodiments, a method herein comprises measuring production by a cell of one or more CX3C-family chemokines. In some embodiments, a method herein comprises measuring production by a cell of one or more CC-family chemokines. In some embodiments, a method herein comprises measuring production by a cell of one or more CXC-family chemokines. A method herein may include measuring production of one or more chemokines provided in Table 2 below. Also provided in Table 2 are corresponding human genes and human receptors, however, chemokines, genes and receptors herein are not limited to human chemokines, genes and receptors. In some embodiments, a method herein comprises measuring production by a cell of a chemokine that binds to one or more receptors provided in Table 2.

TABLE 2

Examples of chemokines

| Chemokine | Human gene | Human receptor(s) |
|---|---|---|
| C Family | | |
| XCL1 | XCL1 | XCR1 |
| XCL2 | XCL2 | XCR1 |
| CX3C Family | | |
| CX3CL1 | CX3CL1 | CX3CR1 |
| CC Family | | |
| CCL1 | CCL1 | CCR8, DARC |
| CCL2 | CCL2 | CCR2, CCR4, CCR11, D6, DARC |

TABLE 2-continued

Examples of chemokines

| Chemokine | Human gene | Human receptor(s) |
|---|---|---|
| CCL3 | CCL3 | CCR1, CCR4, CCR5, D6 |
| CCL3L1 | CCL3L1 | CCR1, CCR3, CCR5, D6 |
| CCL3L3 | CCL3L3 | CCR1, CCR3, CCR5 |
| CCL4 | CCL4 | CCR1, CCR5, CCR8, D6 |
| CCL4L1 | CCL4L1 | CCR1, CCR5 |
| CCL4L2 | CCL4L2 | CCR1, CCR5 |
| CCL5 | CCL5 | CCR1, CCR3, CCR4, CCR5, D6, DARC |
| CCL6l | CCL23 | |
| CCL7 | CCL7 | CCR1, CCR2, CCR3, D6, DARC |
| CCL8 | CCL8 | CCR1, CCR2, CCR3, CCR5, CCR11, D6, DARC |
| CCL11 | CCL11 | CCR3, CCR5, D6, DARC |
| CCL12 | | |
| CCL13 | CCL13 | CCR1, CCR2, CCR3, CCR5, CCR11, D6, DARC |
| CCL14 | CCL14 | CCR1, CCR3, CCR5, D6, DARC |
| CCL15 | CCL15 | CCR1, CCR3 |
| CCL16 | CCL16 | CCR1, CCR2, CCR5, CCR8, DARC, H4 |
| CCL17 | CCL17 | CCR4, CCR8, D6, DARC |
| CCL18 | CCL18 | CCR8, PITPNM3, DARC |
| CCL19 | CCL19 | CCR7, CCR11, CCRL2/CRAM A/B |
| CCL20 | CCL20 | CCR6 |
| CCL21 | CCL21 | CCR7, CCR11 |
| CCL22 | CCL22 | CCR4, D6 |
| CCL23 | CCL23 | CCR1, FPRL-1 |
| CCL24 | CCL24 | CCR3 |
| CCL25 | CCL25 | CCR9, CCR11 |
| CCL26 | CCL26 | CCR3, CX3CR1 |
| CCL27 | CCL27 | CCR10 |
| CCL28 | CCL28 | CCR3, CCR10 |
| CXC Family | | |
| CXCL1 | CXCL1 | CXCR2, DARC |
| CXCL2 | CXCL2 | CXCR2, DARC |
| CXCL3 | CXCL3 | CXCR2, DARC |
| CXCL4 | PF4 | CXCR3, CXCR3B, DARC |
| CXCL4L1 | PF4V1 | CXCR3, CXCR3B |
| CXCL5 | CXCL5 | CXCR2, DARC |
| CXCL6 | CXCL6 | CXCR1, CXCR2, DARC |
| CXCL7 | PPBP | CXCR1, CXCR2 |
| CXCL8 | IL-8 | CXCR1, CXCR2, DARC |
| CXCL9 | CXCL9 | CXCR3, CXCR3B, DARC |
| CXCL10 | CXCL10 | CXCR3, CXCR3B, DARC |
| CXCL11 | CXCL11 | CXCR3, CXCR3B, CXCR7, DARC |
| CXCL12 | CXCL12 | CXCR4, CXCR7 |
| CXCL13 | CXCL13 | CXCR3, CXCR5, DARC |
| CXCL14 | CXCL14 | Unknown |
| CXCL15 | | |
| CXCL16 | CXCL16 | CXCR6 |
| CXCL17 | CXCL17 | Unknown |

In some embodiments, a method herein comprises measuring production by a cell of one or more cytokines and/or chemokines chosen from CCL2, CXCL10, IL-6 and IL-1 RA. In some embodiments, a method herein comprises measuring production by a cell of one or more cytokines and/or chemokines chosen from CCL2, CCL5, CXCL1, CXCL8, CXCL9, CXCL10, IL-6 and IL-1 RA. In some embodiments, a method herein comprises measuring production by a cell of CCL2. In some embodiments, a method herein comprises measuring production by a cell of CXCL10. In some embodiments, a method herein comprises measuring production by a cell of IL-6. In some embodiments, a method herein comprises measuring production by a cell of IL-1RA. In some embodiments, a method herein comprises measuring production by a cell of CCL5. In some embodiments, a method herein comprises measuring production by a cell of CXCL1. In some embodiments, a method herein comprises measuring production by a cell of CXCL8. In some embodiments, a method herein comprises measuring production by a cell of CXCL9.

Cytokine and/or chemokine production may be measured using any suitable method, apparatus or machine for measuring protein secretion and/or DNA expression (e.g., mRNA). For example, cytokine and/or chemokine production may be measured by immunoassay (e.g., enzyme-linked immunosorbent assay (ELISA), protein immunoprecipitation, immunoelectrophoresis, Western blot, protein immunostaining), spectrometry (e.g., high-performance liquid chromatography (HPLC), liquid chromatography-mass spectrometry (LC/MS)), flow cytometry, quantitative polymerase chain reaction (qPCR), gel electrophoresis, a luminometer, a fluorometer, a spectrophotometer, a suitable gene-chip or microarray analysis, mass spectrometry, chromatography, cytofluorimetric analysis, fluorescence microscopy, a suitable fluorescence or digital imaging method, confocal laser scanning microscopy, laser scanning cytometry, affinity chromatography, manual batch mode separation, electric field suspension, a suitable nucleic acid sequencing method and/or nucleic acid sequencing apparatus, the like and combinations thereof. Example immunoassays include LEGEND MAX™ ELISA kits with pre-coated plates (BioLegend), Macrophage/Microglia LEGENDplex™ panels (BioLegend), and Chemokine Inflammatory LEGENDplex™ panels (BioLegend).

Methods for Assessing Meteorin-β Activity

Provided herein are methods for assessing meteorin-β activity. Methods for assessing meteorin-β activity generally are performed ex vivo (i.e., outside of an organism) or in vitro (i.e., performed or taking place in a test tube, culture dish, or other vessel outside of an organism). The terms ex vivo and in vitro may be used interchangeably, and typically are used in conjunction with methods performed in an artificial environment or artificial system. Methods herein generally include contacting a cell with meteorin-β or meteorin-β and a co-stimulant, and such contacting is typically performed ex vivo/in vitro (e.g., in cell culture).

In some embodiments, a method comprises contacting a cell with meteorin-β, measuring production of one or more cytokines and/or chemokines described herein, and detecting the activity of meteorin-β according to the cytokine production. In some embodiments, detecting the activity of meteorin-β comprises comparing the cytokine/chemokine production under test conditions (meteorin-β stimulation) to cytokine/chemokine production under control conditions (no meteorin-β stimulation). In some embodiments, detecting the activity of meteorin-β comprises comparing cytokine/chemokine production under test conditions to cytokine/chemokine production in a standard curve (e.g., cytokine/chemokine production measured for a plurality of different amounts of active meteorin-β). An active meteorin-β may include a meteorin-β standard (e.g., an unmodified full-length mature meteorin-β; a full-length mature meteorin-β comprising activity-enhancing modifications). In some embodiments, detecting the activity of meteorin-β comprises comparing cytokine/chemokine production under test conditions to cytokine/chemokine production measured for a control, thereby providing a comparison. A control may include, for example, cytokine/chemokine production measured in the absence of meteorin-β. Typically, for a control, or for generating a standard curve, cytokine production is measured for the same cell (e.g., same cell-type, same cellular source, and/or same cell population) used for assessing meteorin-β activity (test conditions). Typically, for a control, or for generating a standard curve, cytokine/chemokine production can be a measured level of a cytokine/ chemokine, or measured levels of cytokines/chemokines in a combination of cytokines, chemokines, or cytokines and chemokines. Often, the level of the same cytokine/chemokine, or the levels of the same cytokines, chemokines, or cytokines and chemokines in the same cytokine/chemokine combination, is/are measured for test conditions and for control conditions or conditions for a standard curve.

In some embodiments, a method comprises contacting a cell with meteorin-β and a co-stimulant (e.g., IFN-γ, IL-4, IL-10, TGF-β), measuring production of one or more cytokines and/or chemokines described herein, and detecting the activity of meteorin-β according to the cytokine production. In some embodiments, detecting the activity of meteorin-β comprises comparing the cytokine/chemokine production under test conditions (meteorin-β+co-stimulant) to cytokine/chemokine production under control conditions (no meteorin-β, no co-stimulant, or no meteorin-β+co-stimulant). In some embodiments, detecting the activity of meteorin-β comprises comparing cytokine/chemokine production under test conditions to cytokine/chemokine production in a standard curve (e.g., cytokine/chemokine production measured for a plurality of different amounts of active meteorin-β or active meteorin-β+co-stimulant). An active meteorin-β may include a meteorin-β standard (e.g., an unmodified full-length mature meteorin-β; a full-length mature meteorin-β comprising activity-enhancing modifications). In some embodiments, detecting the activity of meteorin-β comprises comparing cytokine/chemokine production under test conditions to cytokine/chemokine production measured for a control, thereby providing a comparison. A control may include, for example, cytokine/chemokine production measured in the absence of meteorin-β; cytokine/chemokine production measured in the absence of a co-stimulant; cytokine/chemokine production measured in the absence of meteorin-β and a co-stimulant. Typically, for a control, or for generating a standard curve, cytokine production is measured for the same cell (e.g., same cell-type, same cellular source, and/or same cell population) used for assessing meteorin-β activity (test conditions). Typically, for a control, or for generating a standard curve, cytokine/chemokine production can be a measured level of a cytokine/chemokine, or measured levels of cytokines/chemokines in a combination of cytokines, chemokines, or cytokines and chemokines. Often, the level of the same cytokine/chemokine, or the levels of the same cytokines, chemokines, or cytokines and chemokines in the same cytokine/chemokine combination, is/are measured for test conditions and for control conditions or conditions for a standard curve.

In some embodiments, the production of one or more cytokines and/or chemokines under test conditions (i.e., under meteorin-β stimulation or under meteorin-β+co-stimulant stimulation) is increased compared to the production under control conditions (i.e., absence of meteorin-β or meteorin-β+co-stimulant). In some embodiments, production of one or more cytokines and/or chemokines under test conditions is increased by at least about 10% compared to the production under control conditions. For example, production of one or more cytokines and/or chemokines under test conditions may be increased by at least about 10%, 20%, 30%, 40%, 50%, 60%, 70%, 80%, 90%, 100%, 200%, 500%, 1000% or more compared to the production under control conditions. In some embodiments, production of one or more cytokines and/or chemokines under test conditions is increased by at least about 2-fold compared to the production under control conditions. For example, production of one or more cytokines and/or chemokines under test conditions may be increased by at least about 2-fold, 3-fold, 4-fold, 5-fold, 6-fold, 7-fold, 8-fold, 9-fold, 10-fold, 20-fold, 30-fold, 40-fold, 50-fold, 60-fold, 70-fold, 80-fold, 90-fold, 100-fold or more compared to the production under control conditions.

In some embodiments, the production of CCL2 under test conditions (i.e., under meteorin-β stimulation or under meteorin-β+co-stimulant stimulation) is increased compared to the production under control conditions (i.e., absence of meteorin-β or meteorin-β+co-stimulant). In some embodiments, the production of CCL2 under test conditions (e.g., meteorin-β+IFN-γ, or meteorin-β+IL-4) is increased compared to the production under control conditions (e.g., IFN-γ or IL-4, respectively, without meteorin-β).

In some embodiments, the production of CCL5 under test conditions (i.e., under meteorin-β stimulation or under meteorin-β+co-stimulant stimulation) is increased compared to the production under control conditions (i.e., absence of meteorin-β or meteorin-β+co-stimulant). In some embodiments, the production of CCL5 under test conditions (e.g., meteorin-β+IFN-γ, meteorin-β+IL-4, or meteorin-β+IL-10) is increased compared to the production under control conditions (e.g., IFN-γ, IL-4, or IL-10, respectively, without meteorin-β).

In some embodiments, the production of CXCL9 under test conditions (i.e., under meteorin-β stimulation or under meteorin-β+co-stimulant stimulation) is increased compared to the production under control conditions (i.e., absence of meteorin-β or meteorin-β+co-stimulant). In some embodiments, the production of CXCL9 under test conditions (e.g., meteorin-β+IFN-γ) is increased compared to the production under control conditions (e.g., IFN-γ without meteorin-β).

In some embodiments, the production of CXCL10 under test conditions (i.e., under meteorin-β stimulation or under meteorin-β+co-stimulant stimulation) is increased compared to the production under control conditions (i.e., absence of meteorin-β or meteorin-β+co-stimulant). In some embodiments, the production of CXCL10 under test conditions (e.g., meteorin-β+IFN-γ) is increased compared to the production under control conditions (e.g., IFN-γ without meteorin-β).

In some embodiments, the production of IL-6 under test conditions (i.e., under meteorin-β stimulation or under meteorin-β+co-stimulant stimulation) is increased compared to the production under control conditions (i.e., absence of meteorin-β or meteorin-β+co-stimulant). In some embodiments, the production of IL-6 under test conditions (e.g., meteorin-β+IFN-γ) is increased compared to the production under control conditions (e.g., IFN-γ without meteorin-β).

In some embodiments, the production of IL-1RA under test conditions (i.e., under meteorin-β stimulation or under meteorin-β+co-stimulant stimulation) is increased compared to the production under control conditions (i.e., absence of meteorin-β or meteorin-β+co-stimulant). In some embodiments, the production of IL-1RA under test conditions (e.g., meteorin-β+IFN-γ) is increased compared to the production under control conditions (e.g., IFN-γ without meteorin-β).

In some embodiments, the production of one or more cytokines and/or chemokines under test conditions (i.e., under meteorin-β stimulation or under meteorin-β+co-stimulant stimulation) is decreased compared to the production under control conditions (i.e., absence of meteorin-β or meteorin-β+co-stimulant). In some embodiments, production of one or more cytokines and/or chemokines under test conditions is decreased by at least about 10% compared to the production under control conditions. For example, production of one or more cytokines and/or chemokines under test conditions may be decreased by at least about 10%, 20%, 30%, 40%, 50%, 60%, 70%, 80%, 90%, 100%, 200%, 500%, 1000% or more compared to the production under control conditions. In some embodiments, production of one or more cytokines and/or chemokines under test conditions is decreased by at least about 2-fold compared to the production under control conditions. For example, production of one or more cytokines and/or chemokines under test conditions may be decreased by at least about 2-fold, 3-fold, 4-fold, 5-fold, 6-fold, 7-fold, 8-fold, 9-fold, 10-fold, 20-fold, 30-fold, 40-fold, 50-fold, 60-fold, 70-fold, 80-fold, 90-fold, 100-fold or more compared to the production under control conditions.

In some embodiments, the production of CXCL8 under test conditions (i.e., under meteorin-β stimulation or under meteorin-β+co-stimulant stimulation) is decreased compared to the production under control conditions (i.e., absence of meteorin-β or meteorin-β+co-stimulant). In some embodiments, the production of CXCL8 under test conditions (e.g., meteorin-β+IL-10) is decreased compared to the production under control conditions (e.g., IL-10 without meteorin-β).

In some embodiments, the production of CXCL1 under test conditions (i.e., under meteorin-β stimulation or under meteorin-β+co-stimulant stimulation) is decreased compared to the production under control conditions (i.e., absence of meteorin-β or meteorin-β+co-stimulant). In some embodiments, the production of CXCL1 under test conditions (e.g., meteorin-β+IFN-γ) is decreased compared to the production under control conditions (e.g., IFN-γ without meteorin-β).

Meteorin-β Receptor Expression

In some embodiments, a method herein comprises identifying whether a cell expresses, or is capable of expressing, a meteorin-β receptor. Such method may include contacting a cell or a population of cells (e.g., cells described herein) with a stimulant (e.g., a stimulant described herein (e.g., IFN-γ, IL-4, IL-10, TGF-β)). Typically, a cell or population of cells is contacted with a stimulant for a duration of time prior to exposure to meteorin-β. A duration of time for contact with a stimulant may comprise about 1 hour, 2 hours, 4 hours, 6 hours, 8 hours, 10 hours, 12 hours, 14 hours, 16 hours, 18 hours, 20 hours, 22 hours, 24 hours, 36 hours, 48 hours or more. In some embodiments, a cell is contacted with a stimulant for about 18 hours. Conditions for contacting a cell with a stimulant may include a temperature between about 35° C. and 40° C. In some embodiments, a cell is contacted with a stimulant at 37° C.

In some embodiments, a method may include contacting a cell or a population of cells under binding conditions with meteorin-β. Binding conditions typically include conditions (temperature, media components, pH) favorable to ligand-receptor binding (e.g., meteorin-β binding to a receptor). Ligand-receptor binding typically is non-covalent and occurs by intermolecular forces, such as ionic bonds, hydrogen bonds and Van der Waals forces. The rate of binding may be referred to as ligand-receptor binding affinity. Generally, high-affinity ligand binding results from greater intermolecular force between the ligand and its receptor, while low-affinity ligand binding involves less intermolecular force between the ligand and its receptor. High-affinity binding typically results in a higher degree of occupancy for the ligand at its receptor binding site than for low-affinity binding.

Typically, a cell or population of cells is contacted with meteorin-β after contacting the cell with a stimulant for a duration of time. A duration of time for contact with meteorin-β may comprise about 10 minutes, 20 minutes, 30 minutes, 45 minutes, 60 minutes, 90 minutes, 120 minutes or more. In some embodiments, a cell is contacted with meteorin-β for about 90 minutes. Conditions for contacting a cell with meteorin-β may include a temperature between about 1° C. and 20° C. Conditions for contacting a cells with meteorin-β may include a temperature between about 1° C. and 19° C., or about 1° C. and 18° C. In some embodiments, a cell is contacted with a stimulant at 4° C. Without being limited by theory, conditions for contacting a cell with meteorin-β may be performed at low temperatures to prevent activation and potential internalization of a meteorin-β receptor.

In some embodiments, a method may include detecting the presence, absence, and/or amount of meteorin-β polypeptide bound to a cell. Any suitable protein detection method may be used to detect the presence, absence, and/or amount of meteorin-β polypeptide bound to a cell, such as a protein detection method described herein (e.g., immunoassay, flow cytometry). In some embodiments, meteorin-β comprises a tag, such as a tag described herein, and a method comprises contacting tagged meteorin-β with an agent capable of binding to the tag. In some embodiments, the agent is an antibody, an antibody comprising a detectable label, or a fragment thereof. In some embodiments, meteorin-β comprises a member of a binding pair, and a method comprises contacting meteorin-β with a second member of the binding pair. Any suitable binding pair may be used, and examples of binding pairs are described herein. In some embodiments, meteorin-β, or an agent that binds meteorin-β, comprises a detectable label, such as a detectable label described herein, and a method comprises detecting the detectable label (e.g., by flow cytometry).

In some embodiments, a cell assessed for expression of a meteorin-β is from a subject having a disease, disorder, syndrome, condition, infection or illness, or suspected of having a disease, disorder, syndrome, condition, infection or illness. Cells from a subject having a disease, disorder, syndrome, condition, infection or illness may be referred to as affected cells. In some embodiments, the disease, disorder, syndrome, condition, infection or illness is characterized by altered expression of meteorin-β and/or a meteorin-β receptor. In some embodiments, the disease, disorder, syndrome, condition, infection or illness is characterized by increased expression of meteorin-β and/or a meteorin-β receptor. In some embodiments, the disease, disorder, syndrome, condition, infection or illness is characterized by decreased expression of meteorin-β and/or a meteorin-β receptor. Altered, increased or decreased expression of meteorin-β and/or a meteorin-β receptor may be relative to a cell or cells from a subject not having the disease, disorder, syndrome, condition, infection or illness. The subject not having the disease, disorder, syndrome, condition, infection or illness may be a different subject; or may be the same subject prior to developing the disease, disorder, syndrome, condition, infection or illness, or the same subject after recovery from the disease, disorder, syndrome, condition, infection or illness. Cells from a subject not having the disease, disorder, syndrome, condition, infection or illness may be referred to as a control cells.

In some embodiments, expression of meteorin-β and/or a meteorin-β receptor in affected cells is increased by at least about 10% compared to expression in control cells. For example, expression of meteorin-β and/or a meteorin-β receptor in affected cells may be increased by at least about 10%, 20%, 30%, 40%, 50%, 60%, 70%, 80%, 90%, 100%, 200%, 500%, 1000% or more compared to expression in control cells. In some embodiments, expression of meteorin-β and/or a meteorin-β receptor in affected cells is increased by at least about 2-fold compared to expression in control cells. For example, expression of meteorin-β and/or a meteorin-β receptor in affected cells may be increased by at least about 2-fold, 3-fold, 4-fold, 5-fold, 6-fold, 7-fold, 8-fold, 9-fold, 10-fold, 20-fold, 30-fold, 40-fold, 50-fold, 60-fold, 70-fold, 80-fold, 90-fold, 100-fold or more compared to expression in control cells.

Kits

Provided in certain embodiments are kits. The kits may include any components and compositions described herein (e.g., IFN-γ, IL-4, IL-10, and/or TGF-β; one or more components for measuring cytokine and/or chemokine production; a cell or population of cells) useful for performing any of the methods described herein, in any suitable combination. In some embodiments, a kit further includes meteorin-β (e.g., for use as a standard/control and/or for the user to generate a standard curve). Meteorin-β for testing may be provided by the user/purchaser of the kit. Kits may further include any reagents, buffers, or other components useful for carrying out any of the methods described herein. For example, a kit may include one or more binding molecules that immunospecifically bind to one or more cytokines and/or chemokines under binding conditions.

Components of a kit may be present in separate containers, or multiple components may be present in a single container. Suitable containers include a single tube (e.g., vial), a cell culture plate, one or more wells of a plate (e.g., a 6-well plate, a 12-well plate, a 24-well plate, a 96-well plate, a 384-well plate, and the like), and the like.

Kits may also comprise instructions for performing one or more methods described herein and/or a description of one or more components described herein. Instructions and/or descriptions may be in printed form and may be included in a kit insert. In some embodiments, instructions and/or descriptions are provided as an electronic storage data file present on a suitable computer readable storage medium, e.g., portable flash drive, DVD, CD-ROM, diskette, and the like. A kit also may include a written description of an internet location that provides such instructions or descriptions.

EXAMPLES

The examples set forth below illustrate certain embodiments and do not limit the technology.

Example 1: Production of Cytokines and Chemokines by THP-1 Cells Under IFN-γ and Meteorin-β Stimulation In this Example, the production of certain cytokines and chemokines by THP-1 cells under meteorin-β stimulation and IFN-γ+meteorin-β co-stimulation was measured. A 6xHis-tagged meteorin-β ("6xHis" disclosed as SEQ ID NO: 10) (R & D Systems, cat #9339-MN-050) and human recombinant IFN-γ (BioLegend, cat #752802) were used for the assays described below. The meteorin-β product included the following components: N-terminus-human meteorin-β (Gln46-Asp311; accession #Q641Q3); HP; linker peptide (GGGSGGGSGGGS (SEQ ID NO: 9)); and 6xHis (HHHHHH (SEQ ID NO: 10))—C-terminus. The meteorin-β activity may be measured by its ability to induce STAT3 phosphorylation in E16E18 embryonic rat cortical neurons.

The production of CCL2 by THP-1 cells under IFN-γ and meteorin-β co-stimulation was measured. THP-1 cells ($5 \times 10^4$) were incubated on 96-well culture plates with RPMI 1% FBS and p/s 1x at 37° C. (200 µl), with or without 1 µg/ml of rhIFN-γ (BioLegend, cat #570202) and with or without different concentrations (1 µg/ml, 2 µg/ml or 2.5 µg/ml) of meteorin-β (R & D Systems, cat #9339-MN-050) or its control peptide (6xHis (SEQ ID NO: 10) 2.5 µg/ml; BioLegend) for 24 hrs. For cytokine measurements, samples were analyzed using human CCL2 ELISA (BioLegend), and the results are shown in FIG. 1.

The production of CXCL10, IL1RA, and IL-6 by THP-1 cells under IFN-γ and meteorin-β co-stimulation was measured. THP-1 cells ($5 \times 10^4$) were incubated on 96-well culture plates with RPMI 1% FBS and p/s 1x at 37° C. (200 µl), with or without 1 µg/ml of rhIFN-γ (BioLegend, cat #570202) and with or without different concentrations (1 µg/ml, 2 µg/ml or 2.5 µg/ml) of meteorin-β (R & D Systems, cat #9339-MN-050) or its control peptide (6xHis (SEQ ID NO: 10) 2.5 µg/ml; BioLegend) for 24 hrs. For cytokine measurements, samples were analyzed using LEGENDplex™ (BioLegend), and the results are shown in FIG. 2 (CXCL10 (top panel), IL1RA (middle panel), and IL-6 (bottom panel)).

The production of other cytokines (i.e., ARGINASE, IL12p70, TNFa, IL-4, IL-10, IL-1b, CCL17 (also referred to as TARC), IL12p40, and IL-23) by THP-1 cells under IFN-γ and meteorin-β co-stimulation was measured, and the comparative results are provided in FIG. 3A.

Similarly, the production of chemokines by THP-1 cells under meteorin-β plus IFN-γ, TGFβ, IL-4, or IL-10 co-stimulation was measured, and comparative results are provided in FIG. 3B.

Example 2: Identification of Meteorin-β Receptor Expression in THP-1 Cells

Figure 4A:
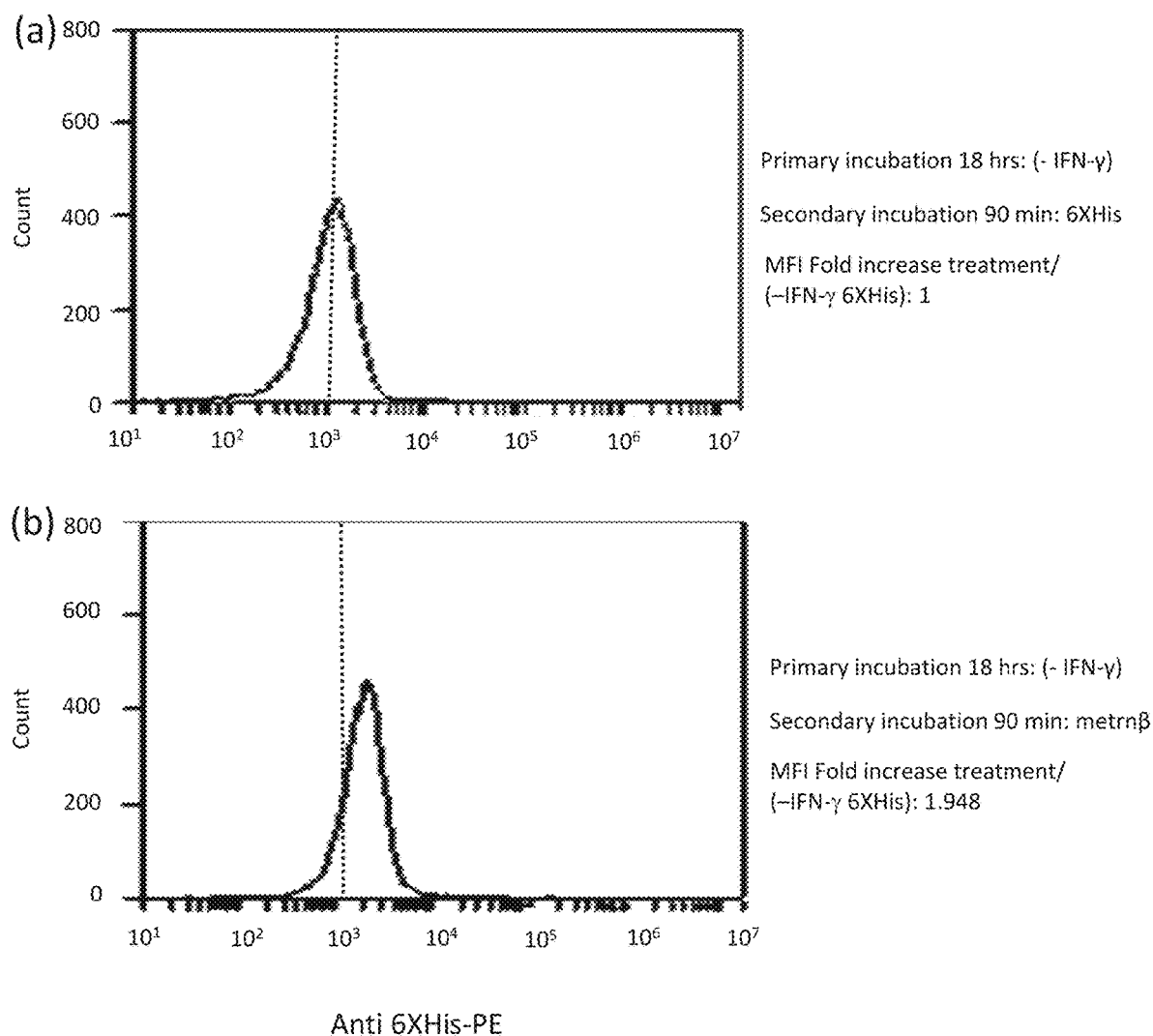
FIG. 4A shows the induction of meteorin-β receptor by IFN-γ measured by the capacity of human recombinant meteorin-β-6×His (hrMetrnβ-6×His) to bind meteorin-β receptor in THP-1 cells previously treated with IFN-γ (250 ng) ("6×His" disclosed as SEQ ID NO: 10). An anti-6×His antibody was used to quantify ligand-receptor interaction ("6×His" disclosed as SEQ ID NO: 10). Data were obtained through flow cytometry.
Figure 4A:
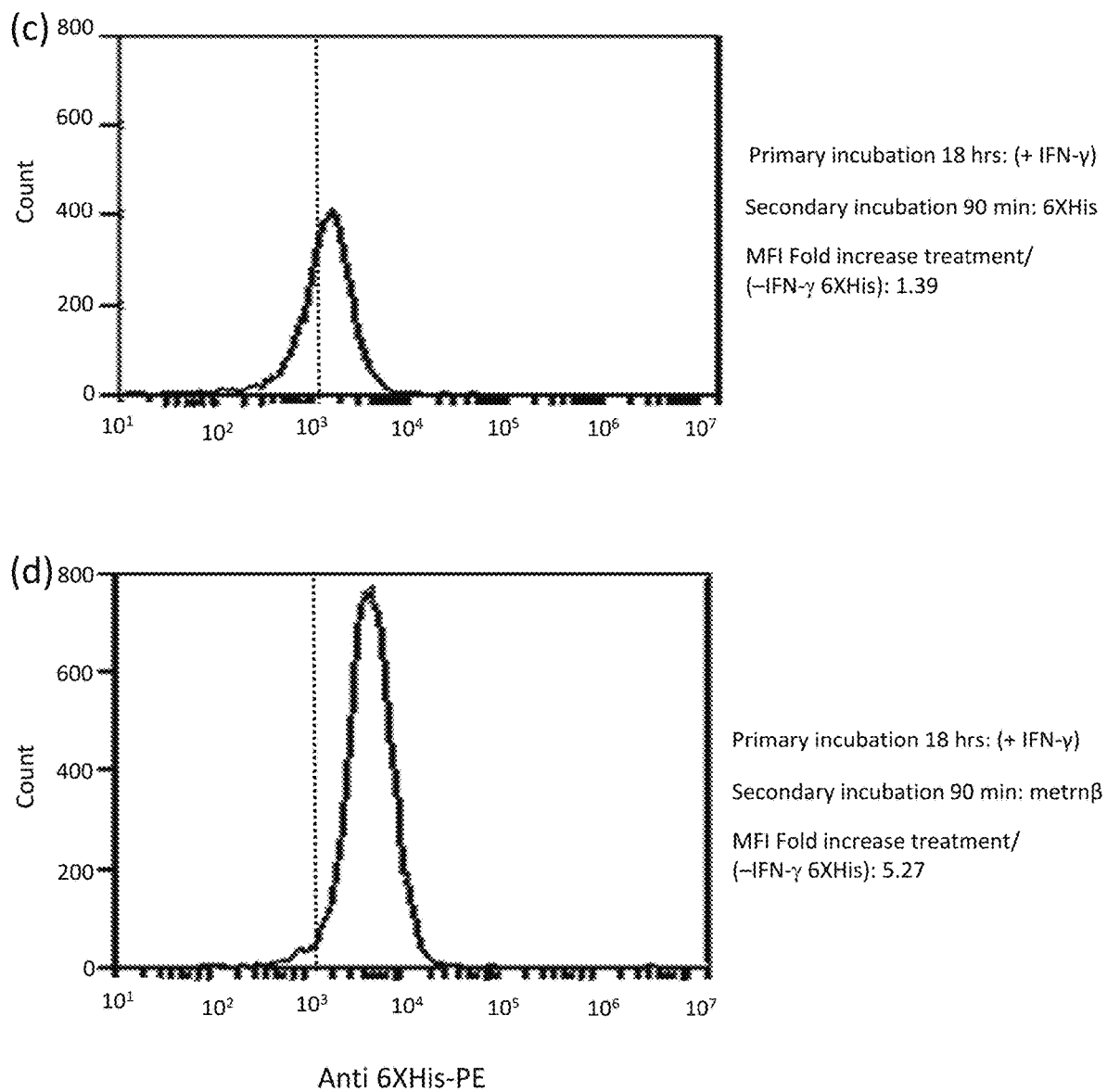
Figure 4B:
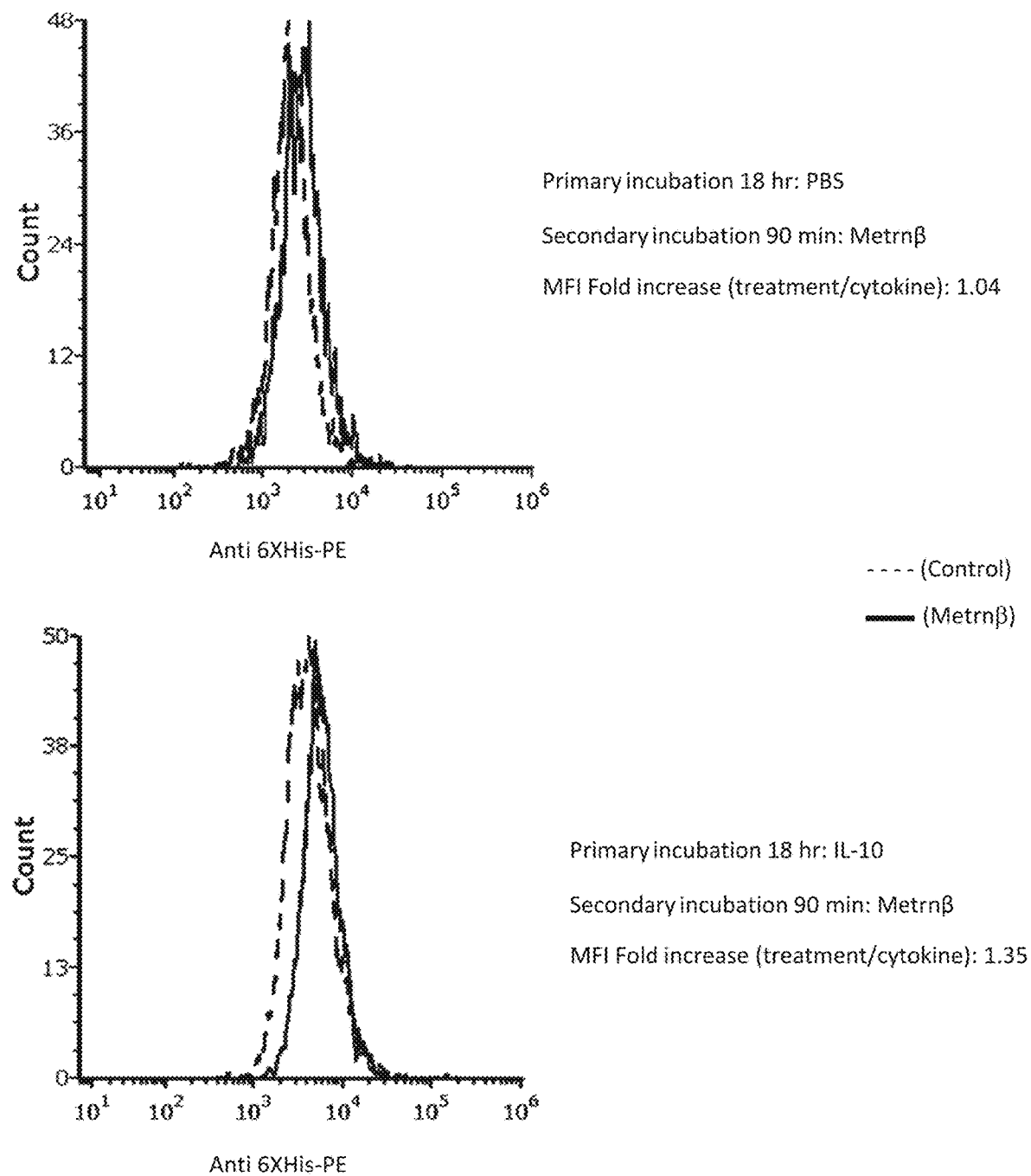
FIGS. 4B and 4C show the induction of meteorin-β receptor by IL-10, IL-4, and TGFβ measured by the capacity of human recombinant meteorin-β-6×His (hrMetrnβ-6×His) to bind meteorin-β receptor in THP-1 cells previously treated with different cytokines (250 ng) ("6×His" disclosed as SEQ ID NO: 10). An anti-6×His antibody was used to quantify ligand-receptor interaction ("6×His" disclosed as SEQ ID NO: 10). Data were obtained through flow cytometry.
Figure 4C:
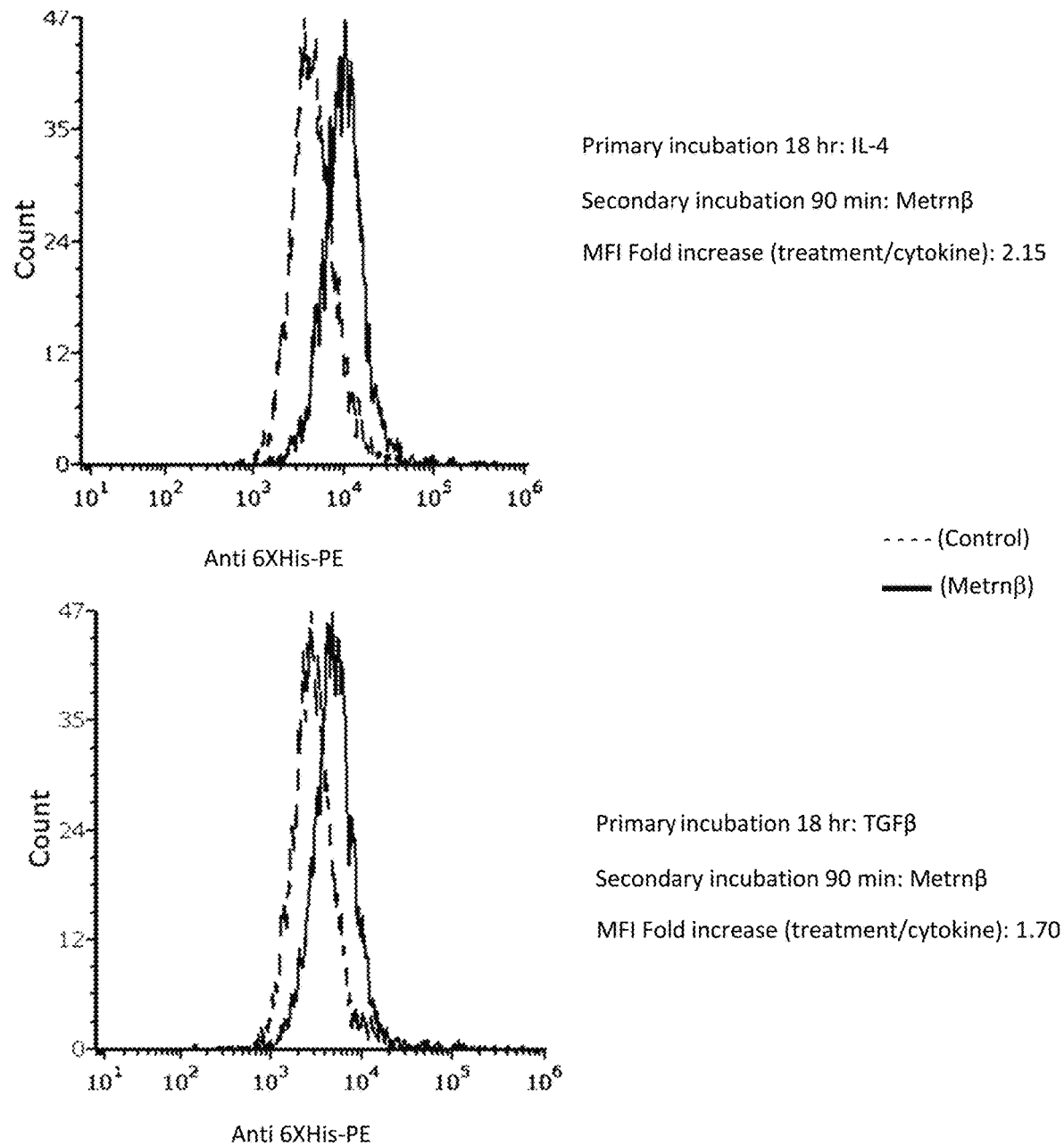
Figure 5:
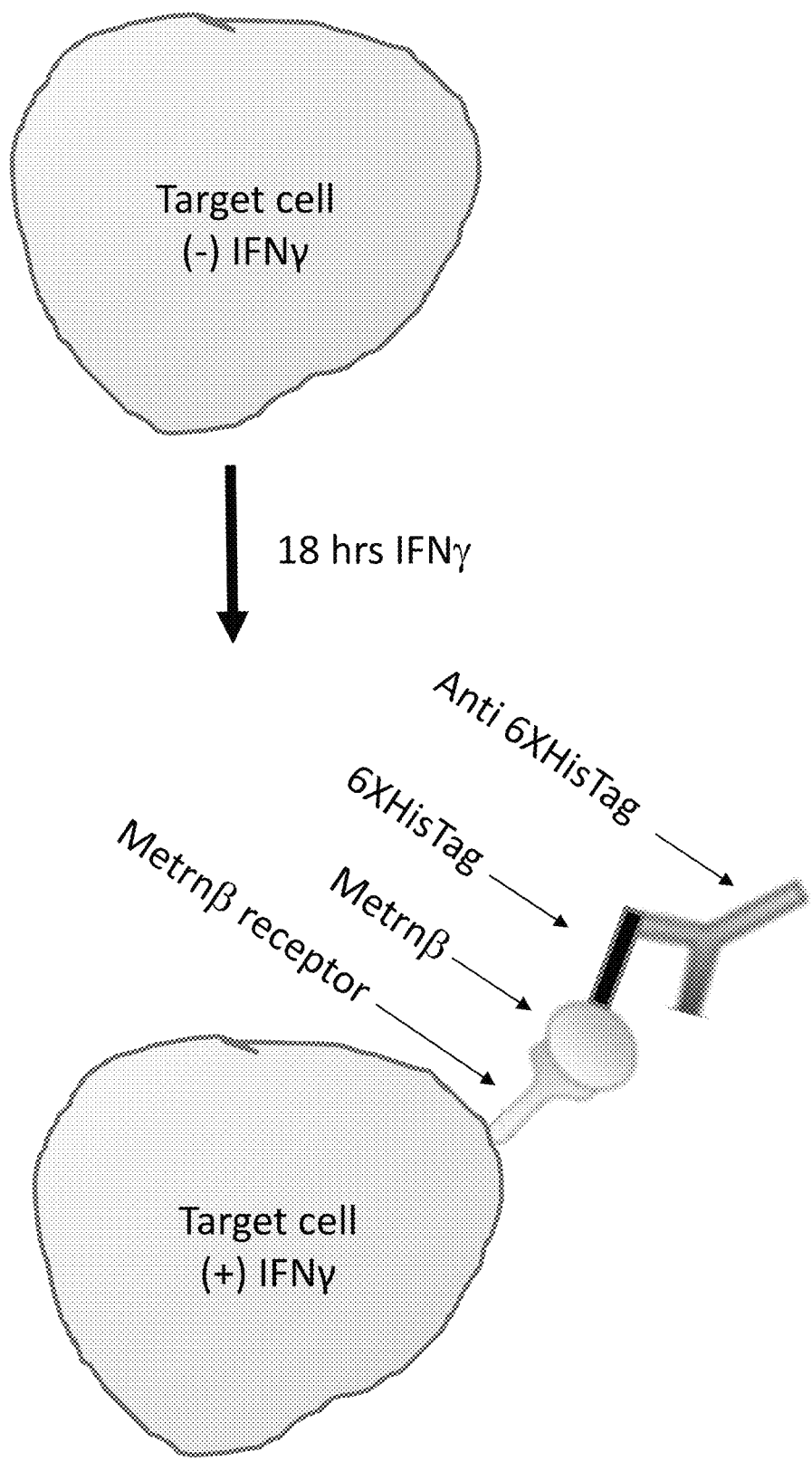
FIG. 5 shows a schematic of the general strategy to detect meteorin-β receptor in a target cell ("6×His" disclosed as SEQ ID NO: 10).

In this Example, identification of meteorin-β receptor expression in THP-1 cells is shown (see FIG. 5 for a schematic of the general detection strategy). Specifically, THP-1 cells ($3 \times 10^5$) were incubated on 24-well culture plates with RPMI 1% FBS and p/s 1x at 37° C. (400 µl), with or without 250 ng of rhIFN-γ (BioLegend, cat #570202), IL-10 (BioLegend, cat #715602), IL-4 (BioLegend, cat #574002), or TGFβ (BioLegend, cat #580704) overnight (18 hrs). Then cells were transferred and washed with 2 ml of staining buffer (ST) in 2 ml Eppendorf tubes. Cells were pre-incubated with 5 µl of Fc receptor blocking solution (Human TruStain FcX™ (BioLegend)) per 100 µl of cell suspension for 10 minutes at room temperature (RT). Cells were then incubated with meteorin-β for 90 minutes at 4° C. After cells were washed 1x with 2 ml of PBS and vortexed, cells were incubated in a PBS/Zombie NIR™ (BioLegend) solution at 1:300 for 10 minutes at RT in the dark. Cells were washed once with 2 ml of ST. Next anti 6xHis antibody ("6xHis" disclosed as SEQ ID NO: 10) coupled to phycoerythrin (BioLegend, Inc. cat #J095G46) was added to 100 ml of suspended cells for 30 minutes at 4° C. in the dark. Finally, cells were washed 2x with ST and read by flow cytometry (FIGS. 4A, 4B, 4C).

Example 3: Examples of Amino Acid and Nucleic Acid Sequences

TABLE 3 amino acid sequences and nucleic acid sequences

| Type | SEQ ID NO | Sequence |
|---|---|---|
| Human Meteorin-β amino acid sequence | 1 | MRGAARAAWGRAGQPWPRPPAPGPPPPPLPLLLLLLAGLLGGAGAQYSSDRCSWKGSG LTHEAHRKEVEQVYLRCAAGAVEVVMYPTGALIVNLRPNTFSPARHLTVCIRSFTDSS GANIYLEKTGELRLLVPDGDGRPGRVQCFGLEQGGLFVEATPQQDIGRRTTGFQYELV RRHRASDLHELSAPCRPCSDTEVLLAVCTSDFAVRGSIQQVTHEPERQDSAIHLRVSR LYRQKSRVFEPVPEGDGHWQGRVRTLLECGVRPGHGDFLFTGHMHFGEARLGCAPRFK DFQRMYRDAQERGLNPCEVGTD |
| Human Meteorin-β nucleic acid sequence (coding region underlined) | 2 | AGAGGCTCGGCGGCGGCGGCGGGCGCGGAGCTCTGCGCGCGGCTCCAGCGGGCCGGGA TGGGCGGGCGGCCGCCGGAGGACGCGGGGGGCGCGCGACGTGACCACCCGGACTCGA AGCCCGCCCCGCCCCCGCCCGGCTCGCCGGCTCCGGGGTCTGCTCCGGGGGTCGCGGA CGCGGGGCCGGCGGCGGAGCCGGCGCCAGAGCATGCGGGGCGCGGCGCGGGCGGCCT GGGGGCGCGCGGGGCAGCCGTGGCCGCGACCCCCGCCCCGGGCCCGCCCCCGCCGCC GCTCCCGCTGCTGCTCCTGCTCCTGGCCGGGCTGCTGGGCGGCGCGGGCGCGCAGTAC TCCAGCGACCGGTGCAGCTGGAAGGGGAGCGGGCTGACGCACGAGGCACACAGGAAGG AGGTGGAGCAGGTGTATCTGCGCTGTGCGGCGGGTGCCGTGGAGTGGATGTACCCAAC AGGTGCTCTCATCGTTAACCTGCGGCCCAACACCTTCTCGCCTGCCCGGCACCTGACC GTGTGCATCAGGTCCTTCACGGACTCCTCGGGGGCCAATATTTATTTGGAAAAAACTG GAGAACTGAGACTGCTGGTACCAGACGGGGACGGCAGGCCCGGCCGGGTGCAGTGTTT GTTTTGGCCTGGAGCAGGGCGGCCTGTTCGTGGAGGCCACGCCGCAGCAGGATATCGG CCGGAGGACCACAGGCTTCCAGTACGAGCTGGTTAGGAGGCACAGGGCGTCGGACCTG CACGAGCTGTCTGCGCCGTGCCGTCCCTGCAGTGACACCGAGGTGCTCCTAGCCGTCT GCACCAGCGACTTCGCCGTTCGAGGCTCCATCCAGCAAGTTACCCACGAGCCTGAGCG GCAGGACTCAGCCATCCACCTGCGCGTGAGCAGACTCTATCGGCAGAAAAGCAGGGTC TTCGAGCCGGTGCCCGAGGGTGACGGCCACTGGCAGGGGCGCGTCAGGACGCTGCTGG AGTGTGGCGTGCGGCCGGGGCATGGCGACTTCCTCTTCACTGGCCACATGCACTTCGG GGAGGCGCGGCTCGGCTGTGCCCCACGCTTCAAGGACTTCCAGAGGATGTACAGGGAT GCCCAGGAGAGGGGGCTGAACCCTTGTGAGGTTGGCACGGACTGACTCCGTGGGCCGC TGCCCTTCCTCTCCTGATGAGTCACAGGCTGCGGTGGGCGCTGCGGTCCTGGTGGGGC CGTGCGGTGAGGGCCGCGCGCTGGGAGCCGCATGCCCTGGGCCCAGGCCTGACCCTGG TACCGAAGCTGTGGACGTTCTCGCCACACTCAACCCCATGAGCTTCCAGCCAAGGATG CCCTGGCCGATTGGAAATGCTGTAAAATGCAAACTAAGTTATTATATTTTTTTTTGGT AAAAAAGAAATGTCCATAGGAAACAAATTCCCGTGTCTTAAAACGCCTTGGTGTGCCG TCTGATACTGTTCTCTAAAGACGTTAGGAGTCACGGCATCTGGCCTGCGGTTGGGTGA AGCACTGGCCGTTGGGCACAGTGGATGTGTGAAAAGGTGCCATTCAGAGTTGTTATTC TCATGACGGAAGTTTTGGAGCCAAATAATACGTTTTTTATTTTCATTTTATTTTTAAA GGATGAGCTTTGGTCCTTTTCAGGCCGCCGGTTGTTTCCGTTCCCGAGAATAAAGACG AGGATCCGACCA |
| Mouse Meteorin-β amino acid sequence | 3 | MRGAVWAARRRAGQQWPRSPGPGPGPPPPPPLLLLLLLLLGGASAQYSSDLCSWKGSG LTREARSKEVEQVYLRCSAGSVEVVMYPTGALIVNLRPNTFSPAQNLTVCIKPFRDSS GANIYLEKTGELRLLVRDIRGEPGQVQCFSLEQGGLFVEATPQQDISRRTTGFQYELM SGQRGLDLHVLSAPCRPCSDTEVLAICTSDFVVRGFIEDVTHVPEQQVSVIYLRVNR LHRQKSRVFQPAPEDSGHWLGHVTTLLQCGVRPGHGEFLFTGHVHFGEAQLGCAPRFS DFQRMYRKAEEMGINPCEINME |
| Mouse Meteorin-β nucleic acid sequence (coding region underlined) | 4 | AGAGGTTCTAGGGGCAGCCGGCGCGCTTCTCTAGTTGCAGCTTGGGCGGCTCCTGTGG TGGGCGGCTAGGGGCGAGCCGGGATGGGCTATAGACGCGCGACGTGATCAGTTCGCAC GCGGACCCACGCCTCCCATCGCTCTGCCTCAAGAGCCTATTCTGTGGGTGCAGGCACG CACCGGACGCAGACCCGGCCGGAGCATGCGGGGTGCGGTGTGGGCGGCCCGGAGGCGC GCGGGGCAGCAGTGGCCTCGGTCCCGGGCCCTGGGCCGGGTCCGCCCCCGCCGCCAC CGCTGCTGTTGCTGCTACTACTGCTGCTGGGCGGCGCGAGCGCTCAGTACTCCAGCGA CCTGTGCAGCTGGAAGGGGAGTGGGCTCACCCGAGAGGCACGCAGCAAGGAGGTGGAG CAGGTGTACCTGCGCTGCTCCGCAGGCTCTGTGGAGTGGATGTACCAACTGGGGCGCG TCATTGTTAACCTACGGCCCAACACCTTCTCACCTGCCCAGAACTTGACTGTGTGCAT CAAGCCTTTCAGGGACTCCTCTGGAGCCAATATTTATTTGGAAAAAACTGGAGAACTA AGACTGTTGGTGCGGGACATCAGAGGTGAGCCTGGCCAAGTGCAGTGCTTCAGCCTGG AGCAGGGAGGCTTATTTGTGGAGGCGACACCCCAACAGGACATCAGCAGAAGGACCAC AGGCTTCCAGTATGAGCTGATGAGTGGGCAGAGGGGACTGGACCTGCACGTGCTGTCT GCCCCCTGTCGGCCTTGCAGTGACACTGAGGTCCTCCTTGCCATCTGTACCAGTGACT TTGTTGTCCGAGGCTTCATTGAGGACGTCACACATGTACCAGAACAGCAAGTGTCAGT CATCTACCTGCGGGTGAACAGGCTTCACAGGCAGAAGAGCAGGGTCTTCCAGCCAGCT CCTGAGGACAGTGGCCACTGGCTGGGCCATGTCACAACACTGCTGCAGTGTGGAGTAC GACCAGGGCATGGGGAATTCCTCTTCACTGGACATGTGCACTTTGGGGAGGCACAACT TGGATGTGCCCACGCTTTAGTGACTTTCAAAGGATGTACAGGAAAGCAGAAGAAATG GGCATAAACCCTGTGAAATCAATATGGAGTGACTTGCAGGGTGACACAGTACTGTTG TCCTTCAGATGAGCCATGTTTTGTGGGCTCAGTCGCTCTATCATATCCTGATAGAGAT TGCAGACTGGTGGCATGGGCCCAGCCTGGTGCTAGAACTGGGAAGGTACATGCTGCTC TGACCCCTTAGGTCCCAGCCAAGGATGCCCTGACCCATTGGAACTGCTGTAAAATGCA AACTAAGTTATTATATTTTTTTGTAAAAGATGCCTTGGTGTGCCATTTAATAGTGTT TTTACAAAGTTATTTTCAGGCATTGGATTTGGCCTGGTATATTGGTGGGAGCTAGGTT ATGGTGTGCAGTGATGGCTATGGCTCAGCCTTTGTTATTCCTGTGATGGAAATGTATGG |

TABLE 3-continued amino acid sequences and nucleic acid sequences

| Type | SEQ ID NO | Sequence |
|---|---|---|
| | | AGCAAATACTTTCTAATTTCCCCTTCATTTTATTTTCTATTTTAAAAGACCATCTTTG |
| | | CCGTTGAGAACCTTTCCAGACTGTATGGAGGCTGCTCCCATTCCAGGGAGTAAAGACC |
| | | AGGATCTGAGACTAGTATTACATCCATCTTAACCCATCAGATGGGTACCTGCATTGAA |
| | | CCTTCTCTGCTCAGCTATGGCCTGCTGTCCCAAAGACCTTTTGCTCTCTGGACAGTTC |
| | | CAGATGGTGCTGCCTGGCTTAAGGGACTTGTTCCTCCCTTGCTCCTACCAGGCCACTG |
| | | TTGCTTTCTGCATCTGTCCCACTGAACCAGTCTTGTCCTTTGACCCTGAGTTTCCCCA |
| | | AATGCACACATCAAATCCCTGAATACCAAGGGACTAACCTACTTAATGGCCCATTTCT |
| | | TCAGAGGGTGTGGGTTTTCCCTATAGTAAGAAAATCTCCACAAGTTGAAGCTTAAACA |
| | | GTAGGCTTTCGTTCATACAGTCCTGGAAGCCAGAATGGGTGTGAGCAGAATCACATTT |
| | | CCTCCGGAGACTCCAGGAGGGACTTTATAGCTTCTGGTGACTCCAGGAATCCTTGGCT |
| | | TGTAACAATTTCACTCTGGCATTGCTTTCCCTGCCATGTGACTTCTGCCTTGTATGTG |
| | | AGGGCCTGTATCAAATCTCTGTCTTGGGAGGATACAGATCATTGACTTAGGGCCCACT |
| | | CCGGTGACCTCACCTTCACCTGAAATTTACTCGATTTCCATTTAGGTCAGAGGCAAAG |
| | | GCTACAAAAAATATCAAATCCGGAGAAAGATTCAATGGTTAGGCACTTGCTACTCTTA |
| | | CAAAGGACCTGTGTTCGATTCCCATGTTGGGAACTCATGTTAGGTGGCTTAAAATTGC |
| | | CTATAACTACAATTCCAGGGGATCTAGCAACCTCTTCTCGCCACACACAAGCACACAC |
| | | ACACACACACACACACACAATTAAAAAC |
| Human IFN-γ amino acid sequence | 5 | MKYTSYILAFQLCIVLGSLGCYCQDPYVKEAENLKKYFNAGHSDVADNGTLFLGILKN WKEESDRKIMQSQIVSFYFKLFKNFKDDQSIQKSVETIKEDMNVKFFNSNKKKRDDFE KLTNYSVTDLNVQRKAIHELIQVMAELSPAAKTGKRKRSQMLFRGRRASQ |
| Human IFN-γ nucleic acid sequence (coding region underlined) | 6 | ACATTGTTCTGATCATCTGAAGATCAGCTATTAGAAGAGAAAGATCAGTTAAGTCCTT TGGACCTGATCAGCTTGATACAAGAACTACTGATTTCAACTTCTTTGGCTTAATTCTC TCGGAAACGATGAAATATACAAGTTATATCTTGGCTTTTCAGCTCTGCATCGTTTTGG GTTCTCTTGGCTGTTACTGCCAGGACCCATATGTAAAAGAAGCAGAAAACCTTAAGAA ATATTTTAATGCAGGTCATTCAGATGTAGCGGATAATGGAACTCTTTTCTTAGGCATT TTGAAGAATTGGAAAGAGGAGAGTGACAGAAAAATAATGCAGAGCCAAATTGTCTCCT TTTACTTCAAACTTTTTAAAAACTTTAAAGATGACCAGAGCATCCAAAAGAGTGTGGA GACCATCAAGGAAGACATGAATGTCAAGTTTTTCAATAGCAACAAAAAGAAACGAGAT GACTTCGAAAAGCTGACTAATTATTCGGTAACTGACTTGAATGTCCAACGCAAAGCAA TACATGAACTCATCCAAGTGATGGCTGAACTGTCGCCAGCAGCTAAAACAGGGAAGCG AAAAAGGAGTCAGATGCTGTTTCGAGGTCGAAGAGCATCCCAGTAATGGTTGTCCTGC CTGCAATATTTGAATTTTAAATCTAAATCTATTTATTAATATTTAACATTATTTATAT GGGGAATATATTTTTAGACTCATCAATCAAATAAGTATTTATAATAGCAACTTTTGTG TAATGAAAATGAATATCTATTAATATATGTATTATTTATAATTCCTATATCCTGTGAC TGTCTCACTTAATCCTTTGTTTTCTGACTAATTAGGCAAGGCTATGTGATTACAAGGC TTTATCTCAGGGGCCAACTAGGCAGCCAACCTAAGCAAGATCCCATGGGTTGTGTGTT TATTTCACTTGATGATACAATGAACACTTATAAGTGAAGTGATACTATCCAGTTACTG CCGGTTTGAAAATATGCCTGCAATCTGAGCCAGTGCTTTAATGGCATGTCAGACAGAA CTTGAATGTGTCAGGTGACCCTGATGAAAACATAGCATCTCAGGAGATTTCATGCCTG GTGCTTCCAAATATTGTTGACAACTGTGACTGTACCCAAATGGAAAGTAACTCATTTG TTAAAATTATCAATATCTAATATATATGAATAAAGTGTAAGTTCACAACTA |
| Mouse IFN-γ amino acid sequence | 7 | MNATHCILALQLFLMAVSGCYCHGTVIESLESLNNYFNSSGIDVEEKSLFLDIVVRNW QKDGDMKILQSQIISFYLRLFEVLKDNQAISNNISVIESHLITTFFSNSKAKKDAFMS IAKFEVNNPQVQRQAFNELIRVVHQLLPESSLRKRKRSRC |
| Mouse IFN-γ nucleic acid sequence (coding region underlined) | 8 | TATAGCTGCCATCGGCTGACCTAGAGAAGACACATCAGCTGATCCTTTGGACCCTCTG ACTTGAGACAGAAGTTCTGGGCTTCTCCTCCTGCGGCCTAGCTCTGAGACAATGAACG CTACACACTGCATCTTGGCTTTGCAGCTCTTCCTCATGGCTGTTTCTGGCTGTTACTG CCACGGCACAGTCATTGAAAGCCTAGAAAGTCTGAATAACTATTTTAACTCAAGTGGC ATAGATGTGGAAGAAAAGAGTCTCTTCTTGGATATCTGGAGGAACTGGCAAAAGGATG GTGACATGAAAATCCTGCAGAGCCAGATTATCTCTTTCTACCTCAGACTCTTTGAAGT CTTGAAAGACAATCAGGCCATCAGCAACAACATAAGCGTCATTGAATCACACCTGATT ACTACCTTCTTCAGCAACAGCAAGGCGAAAAAGGATGCATTCATGAGTATTGCCAAGT TTGAGGTCAACAACCCACAGGTCCAGCGCCAAGCATTCAATGAGCTCATCCGAGTGGT CCACCAGCTGTTGCCGGAATCAGCCTCAGGAAGCGGAAAAGGAGTCGCTGCTGATTC GGGGTGGGAAGAGATTGTCCCAATAAGAATAATTCTGCCAGCACTATTTGAATTTTT AAATCTAAACCTATTTATTAATATTTAAAACTATTTATATGGAGAATCTATTTTAGAT GCATCAACCAAAGAAGTATTTATAGTAACAACTTATATGTGATAAGAGTGAATTCCTA TTAATATATGTGTTATTTATAATTTCTGTCTCCTCAACTATTTCTCTTTGACCAATTA ATTATTCTTTCTGACTAATTAGCCAAGACTGTGATTGCGGGGTTGTATCTGGGGGTGG GGGACAGCCAAGCGGCTGACTGAACTCAGATTGTAGCTTGTACCTTTACTTCACTGAC CAATAAGAAACATTCAGAGCTGCAGTGACCCCGGGAGGTGCTGCTGATGGGAGGAGAT GTCTACACTCCGGGCCAGCGCTTTAACAGCAGGCCAGACAGCACTCGAATGTGTCAGG TAGTAACAGGCTGTCCCTGAAAGAAAGCAGTGTCTCAAGAGACTTGACACCTGGTGCT TCCCTATACAGCTGAAAACTGTGACTACACCCGAATGACAAATAACTCGCTCATTTAT AGTTTATCACTGTCTAATTGCATATGAATAAAGTATACCTTTGCAACCAA |
| linker peptide | 9 | GGGSGGGSGGGS |
| 6XHis peptide | 10 | HHHHHH |

TABLE 3-continued amino acid sequences and nucleic acid sequences

| Type | SEQ ID NO | Sequence |
|---|---|---|
| Human IL-4 amino acid sequence | 11 | MGLTSQLLPPLFFLLACAGNFVHGHKCDITLQEIIKTLNSLTEQKTLCTELTVTDIFA<br>ASKNTTEKETFCRAATVLRQFYSHHEKDTRCLGATAQQFHRHKQLIRFLKRLDRNLWG<br>LAGLNSCPVKEANQSTLENFLERLKTIMREKYSKCSS |
| Human IL-4 nucleic acid sequence | 12 | ATGGGTCTCACCTCCCAACTGCTTCCCCCTCTGTTCTTCCTGCTAGCATGTGCCGGCA<br>ACTTTGTCCACGGACACAAGTGCGATATCACCTTACAGGAGATCATCAAAACTTTGAA<br>CAGCCTCACAGAGCAGAAGACTCTGTGCACCGAGTTGACCGTAACAGACATCTTTGCT<br>GCCTCCAAGAACACAACTGAGAAGGAAACCTTCTGCAGGGCTGCGACTGTGCTCCGGC<br>AGTTCTACAGCCACCATGAGAAGGACACTCGCTGCCTGGGTGCGACTGCACAGCAGTT<br>CCACAGGCACAAGCAGCTGATCCGATTCCTGAAACGGCTCGACAGGAACCTCTGGGGC<br>CTGGCGGGCTTGAATTCCTGTCCTGTGAAGGAAGCCAACCAGAGTACGTTGGAAAACT<br>TCTTGGAAAGGCTAAAGACGATCATGAGAGAGAAATATTCAAAGTGTTCGAGCTGA |
| Mouse IL-4 amino acid sequence | 13 | MGLNPQLVVILLFFLECTRSHIHGCDKNHLREIIGILNEVTGEGTPCTEMDVPNVLTA<br>TKNTTESELVCRASKVLRIFYLKHGKTPCLKKNSSVLMELQRLFRAFRCLDSSISCTM<br>NESKSTSLKDFLESLKSIMQMDYS |
| Mouse IL-4 nucleic acid sequence | 14 | ATGGGTCTCAACCCCCAGCTAGTTGTCATCCTGCTCTTCTTTCTCGAATGTACCAGGA<br>GCCATATCCACGGATGCGACAAAAATCACTTGAGAGAGATCATCGGCATTTTGAACGA<br>GGTCACAGGAGAAGGGACGCCATGCACGGAGATGGATGTGCCAAACGTCCTCACAGCA<br>ACGAAGAACACCACAGAGAGTGAGCTCGTCGTGTAGGGCTTCCAAGGTGCTTCGCATAT<br>TTTATTTAAAACATGGGAAAACTCCATGCTTGAAGAAGAACTCTAGTGTTCTCATGGA<br>GCTGCAGAGACTCTTTCGGGCTTTTCGATGCCTGGATTCATCGATAAGCTGCACCATG<br>AATGAGTCCAAGTCCACATCACTGAAAGACTTCCTGGAAAGCCTAAAGAGCATCATGC<br>AAATGGATTACTCGTAG |
| Human IL-10 amino acid sequence | 15 | MHSSALLCCLVLLTGVRASPGQGTQSENSCTHFPGNLPNMLRDLRDAFSRVKTFFQMK<br>DQLDNLLLKESLLEDFKGYLGCQALSEMIQFYLEEVMPQAENQDPDIKAHVNSLGENL<br>KTLRLRLRRCHRFLPCENKSKAVEQVKNAFNKLQEKGIYKAMSEFDIFINYIEAYMTM<br>KIRN |
| Human IL-10 nucleic acid sequence | 16 | ATGCACAGCTCAGCACTGCTCTGTTGCCTGGTCCTCCTGACTGGGGTGAGGGCCAGCC<br>CAGGCCAGGGCACCCAGTCTGAGAACAGCTGCACCCACTTCCCAGGCAACCTGCCTAA<br>CATGCTTCGAGATCTCCGAGATGCCTTCAGCAGAGTGAAGACTTTCTTTCAAATGAAG<br>GATCAGCTGGACAACTTGTTGTTAAAGGAGTCCTTGCTGGAGGACTTTAAGGGTTACC<br>TGGGTTGCCAAGCCTTGTCTGAGATGATCCAGTTTTACCTGGAGGAGGTGATGCCCCA<br>AGCTGAGAACCAAGACCCAGACATCAAGGCGCATGTGAACTCCCTGGGGGAGAACCTG<br>AAGACCCTCAGGCTGAGGCTACGGCGCTGTCATCGATTTCTTCCCTGTGAAAACAAGA<br>GCAAGGCCGTGGAGCAGGTGAAGAATGCCTTTAATAAGCTCCAAGAGAAAGGCATCTA<br>CAAAGCCATGAGTGAGTTTGACATCTTCATCAACTACATAGAAGCCTACATGACAATG<br>AAGATACGAAACTGA |
| Mouse IL-10 amino acid sequence | 17 | MPGSALLCCLLLLTGMRISRGQYSREDNNCTHFPVGQSHMLLELRTAFSQVKTFFQTK<br>DQLDNILLTDSLMQDFKGYLGCQALSEMIQFYLVEVMPQAEKHGPEIKEHLNSLGEKL<br>KTLRMRLRRCHRFLPCENKSKAVEQVKSDFNKLQDQGVYKAMNEFDIFINCIEAYMMI<br>KMKS |
| Mouse IL-10 nucleic acid sequence | 18 | ATGCCTGGCTCAGCACTGCTATGCTGCCTGCTCTTACTGACTGGCATGAGGATCAGCA<br>GGGGCCAGTACAGCCGGGAAGACAATAACTGCACCCACTTCCCAGTCGGCCAGAGCCA<br>CATGCTCCTAGAGCTGCGGACTGCCTTCAGCCAGGTGAAGACTTTCTTTCAAACAAAG<br>GACCAGCTGGACAACATACTGCTAACCGACTCCTTAATGCAGGACTTTAAGGGTTACT<br>TGGGTTGCCAAGCCTTATCGGAAATGATCCAGTTTTACCTGGTAGAAGTGATGCCCCA<br>GGCAGAGAAGCATGGCCCAGAAATCAAGGAGCATTTGAATTCCCTGGGTGAGAAGCTG<br>AAGACCCTCAGGATGCGGCTGAGGCGCTGTCATCGATTTCTCCCCTGTGAAAATAAGA<br>GCAAGGCAGTGGAGCAGGTGAAGAGTGATTTTAATAAGCTCCAAGACCAAGGTGTCTA<br>CAAGGCCATGAATGAATTTGACATCTTCATCAACTGCATAGAAGCATACATGATGATC<br>AAAATGAAAAGCTAA |
| Human TGF-β amino acid sequence | 19 | MPPSGLRLLPLLLPLLWLLVLTPGRPAAGLSTCKTIDMELVKRKRIEAIRGQILSKLR<br>LASPPSQGEVPPGPLPEAVLALYNSTRDRVAGESAEPEPEPEADYYAKEVTRVLMVET<br>HNEIYDKFKQSTHSIYMFFNTSELREAVPEPVLLSRAELRLLRLKLKVEQHVELYQKY<br>SNNSWRYLSNRLLAPSDSPEVVLSFDVTGVVRQVVLSRGGEIEGFRLSAHCSCDSRDN<br>TLQVDINGFTTGRRGDLATIHGMNRPFLLLMATPLERAQHLQSSRHRRALDTNYCFSS<br>TEKNCCVRQLYIDFRKDLGVVKWIHEPKGYHANFCLGPCPYIWSLDTQYSKVLALYNQ<br>HNPGASAAPCCVPQALEPLPIVYYVGRKPKVEQLSNMIVRSCKCS |
| Human TGF-β nucleic acid sequence | 20 | ATGCCGCCCTCCGGGCTGCGGCTGCTGCCGCTGCTGCTACCGCTGCTGTGGCTACTGG<br>TGCTGACGCCTGGCCGGCCGGCCGCGGGACTATCCACCTGCAAGACTATCGACATGGA<br>GCTGGTGAAGCGGAAGCGCATCGAGGCCATCCGCGGCCAGATCCTGTCCAAGCTGCGG<br>CTCGCCAGCCCCCCGAGCCAGGGGGAGGTGCCGCCCGGCCCGCTGCCCGAGGCCGTGC<br>TCGCCCTGTACAACAGCACCCGCGACCGGGTGGCCGGGGAGAGTGCAGAACCGGAGCC<br>CGAGCCTGAGGCCGACTACTACGCCAAGGAGGTCACCCGCGTGCTAATGGTGGAAACC<br>CACAACGAAATCTATGACAAGTTCAAGCAGAGTACACACAGCATATATATGTTCTTCA<br>ACACATCAGAGCTCCGAGAAGCGGTACCTGAACCCGTGTTGCTCTCCCGGGCAGAGCT<br>GCGTCTGCTGAGGCTCAAGTTAAAAGTGGAGCAGCACGTGGAGCTGTACCAGAAATAC<br>AGCAACAATTCCTGGCGATACCTCAGCAACCGGCTGCTGGCACCCAGCGACTCGCCAG |

TABLE 3-continued amino acid sequences and nucleic acid sequences

| Type | SEQ ID NO | Sequence |
|---|---|---|
| | | AGTGGTTATCTTTTGATGTCACCGGAGTTGTGCGGCAGTGGTTGAGCCGTGGAGGGGA<br>AATTGAGGGCTTTCGCCTTAGCGCCCACTGCTCCTGTGACAGCAGGGATAACACACTG<br>CAAGTGGACATCAACGGGTTCACTACCGGCCGCCGAGGTGACCTGGCCACCATTCATG<br>GCATGAACCGGCCTTTCCTGCTTCTCATGGCCACCCCGCTGGAGAGGGCCCAGCATCT<br>GCAAAGCTCCCGGCACCGCCGAGCCCTGGACACCAACTATTGCTTCAGCTCCACGGAG<br>AAGAACTGCTGCGTGCGGCAGCTGTACATTGACTTCCGCAAGGACCTCGGCTGGAAGT<br>GGATCCACGAGCCCAAGGGCTACCATGCCAACTTCTGCCTCGGGCCCTGCCCCTACAT<br>TTGGAGCCTGGACACGCAGTACAGCAAGGTCCTGGCCCTGTACAACCAGCATAACCCG<br>GGCGCCTCGGCGGCGCCGTGCTGCGTGCCGCAGGCGCTGGAGCCGCTGCCCATCGTGT<br>ACTACGTGGGCCGCAAGCCCAAGGTGGAGCAGCTGTCCAACATGATCGTGCGCTCCTG<br>CAAGTGCAGCTGA |
| Mouse TGF-β<br>amino acid<br>sequence | 21 | MPPSGLRLLPLLLPLPVVLLVLTPGRPAAGLSTCKTIDMELVKRKRIEAIRGQILSKL<br>RLASPPSQGEVPPGPLPEAVLALYNSTRDRVAGESADPEPEPEADYYAKEVTRVLMVD<br>RNNAIYEKTKDISHSIYMFFNTSDIREAVPEPPLLSRAELRLQRLKSSVEQHVELYQK<br>YSNNSWRYLGNRLLTPTDTPEWLSFDVTGVVRQVVLNQGDGIQGFRFSAHCSCDSKDN<br>KLHVEINGISPKRRGDLGTIHDMNRPFLLLMATPLERAQHLHSSRHRRALDTNYCFSS<br>TEKNCCVRQLYIDFRKDLGVVKWIHEPKGYHANFCLGPCPYIWSLDTQYSKVLALYNQ<br>HNPGASASPCCVPQALEPLPIVYYVGRKPKVEQLSNMIVRSCKCS |
| Mouse TGF-β<br>nucleic acid<br>sequence | 22 | ATGCCGCCCTCGGGGCTGCGGCTACTGCCGCTTCTGCTCCCACTCCCGTGGCTTCTAG<br>TGCTGACGCCCGGGAGGCCAGCCGCGGGACTCTCCACCTGCAAGACCATCGACATGGA<br>GCTGGTGAAACGGAAGCGCATCGAAGCCATCCGTGGCCAGATCCTGTCCAAACTAAGG<br>CTCGCCAGTCCCCCAAGCCAGGGGGAGGTACCGCCCGGCCCGCTGCCCGAGGCGGTGC<br>TCGCTTTGTACAACAGCACCCGCGACCGGGTGGCAGGCGAGAGCGCCGACCCAGAGCC<br>GGAGCCCGAAGCGGACTACTATGCTAAAGAGGTCACCCGCGTGCTAATGGTGGACCGC<br>AACAACGCCATCTATGAGAAAACCAAAGACATCTCACACAGTATATATATGTTCTTCA<br>ATACGTCAGACATTCGGGAAGCAGTGCCCGAACCCCCATTGCTGTCCCGTGCAGAGCT<br>GCGCTTGCAGAGATTAAAATCAAGTGTGGAGCAACATGTGGAACTCTACCAGAAATAT<br>AGCAACAATTCCTGGCGTTACCTTGGTAACCGGCTGCTGACCCCCACTGATACGCCTG<br>AGTGGCTGTCTTTTGACGTCACTGGAGTTGTACGGCAGTGGCTGAACCAAGGAGACGG<br>AATACAGGGCTTTCGATTCAGCGCTCACTGCTCTTGTGACAGCAAAGATAACAAACTC<br>CACGTGGAAATCAACGGGATCAGCCCCAAACGTCGGGGCGACCTGGGCACCATCCATG<br>ACATGAACCGGCCCTTCCTGCTCCTCATGGCCACCCCCCTGGAAAGGGCCCAGCACCT<br>GCACAGCTCACGGCACCGGAGAGCCCTGGATACCAACTATTGCTTCAGCTCCACAGAG<br>AAGAACTGCTGTGTGCGGCAGCTGTACATTGACTTTAGGAAGGACCTGGGTTGGAAGT<br>GGATCCACGAGCCCAAGGGCTACCATGCCAACTTCTGTCTGGGACCCTGCCCCTATAT<br>TTGGAGCCTGGACACACAGTACAGCAAGGTCCTTGCCCTCTACAACCAACACAACCCG<br>GGCGCTTCGGCGTCACCGTGCTGCGTGCCGCAGGCTTTGGAGCCACTGCCCATCGTCT<br>ACTACGTGGGTCGCAAGCCCAAGGTGGAGCAGTTGTCCAACATGATTGTGCGCTCCTG<br>CAAGTGCAGCTGA |

Example 4: Examples of Embodiments

The examples set forth below illustrate certain embodiments and do not limit the technology.

A1. A method for assessing activity of a meteorin-β polypeptide comprising:
  a) contacting a cell with a first composition comprising a co-stimulant and a second composition comprising a meteorin-β polypeptide;
  b) measuring production by the cell of one or more cytokines and/or chemokines chosen from CCL2, CCL5, CXCL1, CXCL8, CXCL9, CXCL10, IL-6 and IL-1RA, thereby measuring cytokine production; and
  c) detecting the activity of the meteorin-β polypeptide in the second composition according to the cytokine production measured in (b).

A2. The method of embodiment A1, wherein the production of the one or more cytokines and/or chemokines is increased compared to the production by a cell not contacted with the first composition and the second composition.

A3. The method of embodiment A1, wherein the production of the one or more cytokines and/or chemokines is increased compared to the production by a cell contacted with the first composition and not contacted with the second composition.

A3.1 The method of embodiment A1, wherein the production of the one or more cytokines and/or chemokines is decreased compared to the production by a cell contacted with the first composition and not contacted with the second composition.

A4. The method of embodiment A3, wherein the production of the one or more cytokines and/or chemokines is increased by at least about 10% compared to the production by a cell contacted with the first composition and not contacted with the second composition.

A4.1 The method of embodiment A3.1, wherein the production of the one or more cytokines and/or chemokines is decreased by at least about 10% compared to the production by a cell contacted with the first composition and not contacted with the second composition.

A5. The method of any one of embodiments A1 to A4.1, wherein the cell is simultaneously contacted with the first composition and the second composition.

A6. The method of any one of embodiments A1 to A4.1, comprising contacting the cell with the first composition prior to contacting the cell with the second composition.

A7. The method of any one of embodiments A1 to A6, wherein the co-stimulant comprises IFN-γ.

A7.1 The method of any one of embodiments A1 to A6, wherein the co-stimulant comprises one or more polypeptides chosen from IFN-γ, IL-4, IL-10, and TGFβ polypeptides.

A8. The method of any one of embodiments A1 to A7.1, wherein the cell is from a subject.

A9. The method of any one of embodiments A1 to A7.1, wherein the cell is from a cell line.

A10. The method of any one of embodiments A1 to A9, wherein the cell is an isolated cell.

A11. The method of any one of embodiments A1 to A10, wherein the cell is an immune cell.

A12. The method of embodiment A6, wherein the cell is a monocyte.

A13. The method of embodiment A6, wherein the cell is a macrophage.

A14. The method of any one of embodiments A1 to A10, wherein the cell is a non-immune cell.

A15. The method of embodiment A14, wherein the cell is a stromal cell or a cell derived from the central nervous system.

A16. The method of any one of embodiments A1 to A15, wherein the cell is contacted with the first composition and the second composition ex vivo or in vitro.

A17. The method of any one of embodiments A1 to A16, wherein the meteorin-β polypeptide is a recombinant meteorin-β polypeptide.

A18. The method of any one of embodiments A1 to A16, wherein the meteorin-β polypeptide is a human meteorin-β polypeptide.

A19. The method of embodiment A18, wherein the meteorin-β polypeptide is a recombinant human meteorin-β polypeptide.

A20. The method of embodiment A18 or A19, wherein the meteorin-β polypeptide comprises the amino acid sequence of SEQ ID NO: 1.

A21. The method of embodiment A18 or A19, wherein the meteorin-β polypeptide comprises amino acids 46-311 of SEQ ID NO: 1.

A22. The method of embodiment A18 or A19, wherein the meteorin-β polypeptide comprises a fragment of the amino acid sequence of SEQ ID NO: 1.

A23. The method of embodiment A18 or A19, wherein the meteorin-β polypeptide comprises one or more amino acid substitutions in the amino acid sequence of SEQ ID NO: 1.

A24. The method of embodiment A18 or A19, wherein the meteorin-β polypeptide comprises a fragment comprising one or more amino acid substitutions in the amino acid sequence of SEQ ID NO: 1.

A25. The method of any one of embodiments A1 to A16, wherein the meteorin-β polypeptide is a mouse meteorin-β polypeptide.

A26. The method of embodiment A25, wherein the meteorin-β polypeptide is a recombinant mouse meteorin-β polypeptide.

A27. The method of embodiment A25 or A26, wherein the meteorin-β polypeptide comprises the amino acid sequence of SEQ ID NO: 3.

A28. The method of embodiment A25 or A26, wherein the meteorin-β polypeptide comprises amino acids 46-311 of SEQ ID NO: 3.

A29. The method of embodiment A25 or A26, wherein the meteorin-β polypeptide comprises a fragment of the amino acid sequence of SEQ ID NO: 3.

A30. The method of embodiment A25 or A26, wherein the meteorin-β polypeptide comprises one or more amino acid substitutions in the amino acid sequence of SEQ ID NO: 3.

A31. The method of embodiment A25 or A26, wherein the meteorin-β polypeptide comprises a fragment comprising one or more amino acid substitutions in the amino acid sequence of SEQ ID NO: 3.

A32. The method of any one of embodiments A1 to A31, wherein the meteorin-β polypeptide comprises one or more chemical modifications.

A33. The method of any one of embodiments A1 to A32, wherein the meteorin-β polypeptide comprises a tag.

A34. The method of any one of embodiments A1 to A33, wherein the meteorin-β polypeptide comprises a detectable label.

A35. The method of any one of embodiments A1 to A34, wherein the meteorin-β polypeptide comprises a fused polypeptide.

B1. A kit, comprising:
a) a first composition comprising an IFN-γ polypeptide;
b) one or more components for measuring cytokine and/or chemokine production, wherein the cytokines and/or chemokines are chosen from one or more of CCL2, CXCL10, IL-6 and IL-1RA; and
c) instructions for use.

B1.1 A kit, comprising:
a) a first composition comprising one or more co-stimulants chosen from IFN-γ, IL-4, IL-10, and TGFβ polypeptides;
b) one or more components for measuring cytokine and/or chemokine production, wherein the cytokines and/or chemokines are chosen from one or more of CCL2, CCL5, CXCL1, CXCL8, CXCL9, CXCL10, IL-6 and IL-1RA; and
c) instructions for use.

B2. The kit of embodiment 1 or 1.1, further comprising a second composition comprising a meteorin-β polypeptide.

B3. The kit of embodiment B2, wherein the meteorin-β polypeptide is a recombinant meteorin-β polypeptide.

B4. The kit of embodiment B2, wherein the meteorin-β polypeptide is a human meteorin-β polypeptide.

B5. The kit of embodiment B4, wherein the meteorin-β polypeptide is a recombinant human meteorin-β polypeptide.

B6. The kit of embodiment B4 or B5, wherein the meteorin-β polypeptide comprises the amino acid sequence of SEQ ID NO: 1.

B7. The kit of embodiment B4 or B5, wherein the meteorin-β polypeptide comprises amino acids 46-311 of SEQ ID NO: 1.

B8. The kit of embodiment B4 or B5, wherein the meteorin-β polypeptide comprises a fragment of the amino acid sequence of SEQ ID NO: 1.

B9. The kit of embodiment B4 or B5, wherein the meteorin-β polypeptide comprises one or more amino acid substitutions in the amino acid sequence of SEQ ID NO: 1.

B10. The kit of embodiment B4 or B5, wherein the meteorin-β polypeptide comprises a fragment comprising one or more amino acid substitutions in the amino acid sequence of SEQ ID NO: 1.

B11. The kit of embodiment B2, wherein the meteorin-β polypeptide is a mouse meteorin-β polypeptide.

B12. The kit of embodiment B10, wherein the meteorin-β polypeptide is a recombinant mouse meteorin-β polypeptide.

B13. The kit of embodiment B11 or B12, wherein the meteorin-β polypeptide comprises the amino acid sequence of SEQ ID NO: 3.

B14. The kit of embodiment B11 or B12, wherein the meteorin-β polypeptide comprises amino acids 46-311 of SEQ ID NO: 3.

B15. The kit of embodiment B11 or B12, wherein the meteorin-β polypeptide comprises a fragment of the amino acid sequence of SEQ ID NO: 3.

B16. The kit of embodiment E11 or B12, wherein the meteorin-β polypeptide comprises one or more amino acid substitutions in the amino acid sequence of SEQ ID NO: 3.

B17. The kit of embodiment E11 or B12, wherein the meteorin-β polypeptide comprises a fragment comprising one or more amino acid substitutions in the amino acid sequence of SEQ ID NO: 3.

B18. The kit of any one of embodiments B2 to B17, wherein the meteorin-β polypeptide comprises one or more chemical modifications.

B19. The kit of any one of embodiments B2 to B18, wherein the meteorin-β polypeptide comprises a tag.

B20. The kit of any one of embodiments B2 to B19, wherein the meteorin-β polypeptide comprises a detectable label.

B21. The kit of any one of embodiments B2 to B20, wherein the meteorin-β polypeptide comprises a fused polypeptide.

B22. The kit of any one of embodiments 1 to B21, wherein each of the one or more components for measuring cytokine production comprises a binding molecule that immunospecifically binds to one of the cytokines under binding conditions.

B23. The kit of any one of embodiments 1 to B22, further comprising a cell or a population of cells.

C1. A method for identifying whether a cell expresses, or is capable of expressing, a meteorin-β receptor comprising:
  a) contacting a cell with a first composition comprising a stimulant;
  b) contacting the cell under binding conditions with a second composition comprising a meteorin-β polypeptide;
  c) detecting the presence, absence, and/or amount of meteorin-β polypeptide bound to the cell; and
  d) identifying whether the cell expresses, or is capable of expressing, the meteorin-β receptor according to the presence, absence, and/or amount of meteorin-β polypeptide detected in (c).

C2. The method of embodiment C1, wherein the stimulant comprises a soluble protein.

C2.1 The method of embodiment C1 or C2, wherein the stimulant comprises a cytokine or a chemokine.

C2.2 The method of any one of embodiments C1 to C2.1, wherein the stimulant comprises IFN-γ.

C2.3 The method of any one of embodiments C1 to C2.1, wherein the stimulant comprises one or more polypeptides chosen from IFN-γ, IL-4, IL-10, and TGFβ.

C3. The method of any one of embodiments C1 to C2.3, wherein the cell is from a subject.

C4. The method of embodiment C3, wherein the subject has a disease, disorder, syndrome, condition, infection or illness, or is suspected of having a disease, disorder, syndrome, condition, infection or illness.

C5. The method of embodiment C4, wherein the disease, disorder, syndrome, condition, infection or illness is characterized by altered expression of meteorin-β and/or a meteorin-β receptor.

C5.1 The method of embodiment C4, wherein the disease, disorder, syndrome, condition, infection or illness is characterized by increased expression of meteorin-β and/or a meteorin-β receptor.

C5.2 The method of embodiment C4, wherein the disease, disorder, syndrome, condition, infection or illness is characterized by decreased expression of meteorin-β and/or a meteorin-β receptor.

C6. The method of any one of embodiments C1 to C2.2, wherein the cell is from a cell line.

C7. The method of any one of embodiments C1 to C6, wherein the cell is an isolated cell.

C8. The method of any one of embodiments C1 to C7, wherein the cell is an immune cell.

C9. The method of embodiment C8, wherein the cell is a monocyte.

C10. The method of embodiment C8, wherein the cell is a macrophage.

C11. The method of any one of embodiments C1 to C7, wherein the cell is a non-immune cell.

C12. The method of embodiment C11, wherein the cell is a stromal cell or a cell derived from the central nervous system.

C13. The method of any one of embodiments C1 to C12, wherein the method is performed ex vivo or in vitro.

C14. The method of any one of embodiments C1 to C13, wherein the meteorin-β polypeptide is a recombinant meteorin-β polypeptide.

C15. The method of any one of embodiments C1 to C13, wherein the meteorin-β polypeptide is a human meteorin-β polypeptide.

C16. The method of embodiment C15, wherein the meteorin-β polypeptide is a recombinant human meteorin-β polypeptide.

C17. The method of any one of embodiments C1 to C13, wherein the meteorin-β polypeptide is a mouse meteorin-β polypeptide.

C18. The method of embodiment C17, wherein the meteorin-β polypeptide is a recombinant mouse meteorin-β polypeptide.

C19. The method of any one of embodiments C1 to C18, wherein the meteorin-β polypeptide comprises a tag.

C20. The method of embodiment C19, wherein (c) comprises contacting the meteorin-β polypeptide with an agent capable of binding to the tag.

C21. The method of embodiment C20, wherein the agent is an antibody.

C22. The method of any one of embodiments C1 to C18, wherein the meteorin-β polypeptide comprises a first member of a binding pair.

C23. The method of embodiment C22, wherein (c) comprises contacting the meteorin-β polypeptide with a second member of the binding pair.

C24. The method of any one of embodiments C1 to C18, wherein the meteorin-β polypeptide comprises a detectable label.

C25. The method of embodiment C24, wherein (c) comprises detecting the detectable label.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Their citation is not an indication of a search for relevant disclosures. All statements regarding the date(s) or contents of the documents is based on available information and is not an admission as to their accuracy or correctness.

Modifications may be made to the foregoing without departing from the basic aspects of the technology. Although the technology has been described in substantial detail with reference to one or more specific embodiments, those of ordinary skill in the art will recognize that changes may be made to the embodiments specifically disclosed in this application, yet these modifications and improvements are within the scope and spirit of the technology.

The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. Further, when a listing of values is described herein (e.g., about 50%, 60%, 70%, 80%, 85% or 86%) the listing includes all intermediate and fractional values thereof (e.g., 54%, 85.4%). Thus, it should be understood that although the present technology has been specifically disclosed by representative embodiments and optional features, modification and variation of the concepts herein disclosed may be resorted to by those skilled in the art, and such modifications and variations are considered within the scope of this technology.

Certain embodiments of the technology are set forth in the claim(s) that follow(s).

What is claimed is:

1. A method for assessing activity of a meteorin-β polypeptide comprising:
   a) contacting a meteorin-β receptor expressing cell with a first composition comprising a co-stimulant, and a second composition comprising a meteorin-β polypeptide;
   b) measuring production by the meteorin-β receptor expressing cell of one or more cytokines chosen from chemokine (C-X-C motif) ligand 8 (CXCL8) and interleukin-1 receptor antagonist (IL-1RA), thereby measuring cytokine production; and
   c) detecting the activity of the meteorin-β polypeptide in the second composition according to the cytokine production measured in (b).

2. The method of claim 1, wherein the co-stimulant comprises one or more polypeptides selected from Interferon-gamma (IFN-γ), Interleukin-4 (IL-4), Interleukin-10 (IL-10), and Transforming growth factor beta (TGFB).

3. The method of claim 1, wherein the production of the one or more cytokines is increased compared to the production by a meteorin-β receptor expressing cell not contacted with the first composition and the second composition.

4. The method of claim 1, wherein the production of the one or more cytokines is increased or decreased compared to the production by a meteorin-β receptor expressing cell contacted with the first composition and not contacted with the second composition.

5. The method of claim 1, wherein the meteorin-β receptor expressing cell is an isolated cell.

6. The method of claim 1, wherein the meteorin-β receptor expressing cell is an immune cell.

7. The method of claim 1, wherein the meteorin-β receptor expressing cell is a non-immune cell.

8. The method of claim 1, wherein the contacting is done ex vivo or in vitro.

9. The method of claim 1, wherein the meteorin-β polypeptide is a recombinant human meteorin-β polypeptide.

10. The method of claim 9, wherein the meteorin-β polypeptide comprises all or a portion of the amino acid sequence set forth in SEQ ID NO: 1.

11. The method of claim 1, wherein the meteorin-β polypeptide is a recombinant mouse meteorin-β polypeptide.

12. The method of claim 11, wherein the meteorin-β polypeptide comprises all or a portion of the amino acid sequence set forth in SEQ ID NO: 3.

13. The method of claim 1, wherein the method further comprises measuring production by the meteorin-β receptor expressing cell of one or more cytokines chosen from C-C motif chemokine ligand 2 (CCL2), C-C motif chemokine ligand 5 (CCL5), chemokine (C-X-C motif) ligand 1 (CXCL1), chemokine (C-X-C motif) ligand 9 (CXCL9), chemokine (C-X-C motif) ligand 10 (CXCL10), and Interleukin 6 (IL-6).

14. The method of claim 1, wherein the method comprises measuring production by the meteorin-β receptor expressing cell of chemokine (C-X-C motif) ligand 8 (CXCL8), C-C motif chemokine ligand 2 (CCL2), C-C motif chemokine ligand 5 (CCL5), chemokine (C-X-C motif) ligand 1 (CXCL1), chemokine (C-X-C motif) ligand 9 (CXCL9), and chemokine (C-X-C motif) ligand 10 (CXCL10).

15. The method of claim 1, wherein the method comprises measuring production by the meteorin-β receptor expressing cell of interleukin-1 receptor antagonist (IL-1RA), chemokine (C-X-C motif) ligand 10 (CXCL10), and Interleukin 6 (IL-6).

* * * * *